US012761093B2

(12) United States Patent
Uzun et al.

(10) Patent No.: US 12,761,093 B2
(45) Date of Patent: Oct. 13, 2026

(54) MXENE BASED SENSOR DEVICES

(71) Applicants: Drexel University, Philadelphia, PA (US); Deakin University, Victoria (AU)

(72) Inventors: Simge Uzun, Philadelphia, PA (US); Yury Gogotsi, Warminser, PA (US); Genevieve Dion, Philadelphia, PA (US); Amy Stoltzfus, Philadelphia, PA (US); Shayan Seyedin, Victoria (AU)

(73) Assignees: Drexel University, Philadelphia, PA (US); Deakin University (AU)

( * ) Notice: Subject to any disclaimer, the term of this patent is extended or adjusted under 35 U.S.C. 154(b) by 0 days.

(21) Appl. No.: 18/953,434

(22) Filed: Nov. 20, 2024

(65) Prior Publication Data

US 2025/0146892 A1 May 8, 2025

Related U.S. Application Data

(63) Continuation of application No. 18/588,226, filed on Feb. 27, 2024, now abandoned, which is a (Continued)

(51) Int. Cl.

| | |
|---|---|
| ***G01L 1/22*** | (2006.01) |
| ***D02G 3/36*** | (2006.01) |
| ***D02G 3/44*** | (2006.01) |
| ***D06M 11/58*** | (2006.01) |
| ***D06M 11/74*** | (2006.01) |

(Continued)

(52) U.S. Cl.
CPC .............. *G01L 1/2287* (2013.01); *D02G 3/36* (2013.01); *D02G 3/441* (2013.01); *D06M 11/58* (2013.01); *D06M 11/74* (2013.01); *D10B 2401/16* (2013.01); *D10B 2401/18* (2013.01); *D10B 2403/02431* (2013.01); *G01L 2019/0053* (2013.01); *G01L 19/147* (2013.01)

(58) Field of Classification Search
CPC ........ G01L 1/2287; D02G 3/36; D02G 3/441; D06M 11/58; D06M 11/74; D06M 23/08; D10B 2401/16; D10B 2401/18; D10B 2403/02431; C08J 5/06; C08K 9/02; H01G 11/26; H01G 11/30; H01B 1/22
See application file for complete search history.

(56) References Cited

U.S. PATENT DOCUMENTS

| | | | |
|---|---|---|---|
| 4,801,368 | A | 1/1989 | Yamashita et al. |
| 6,180,049 | B1 | 1/2001 | Jang et al. |

(Continued)

FOREIGN PATENT DOCUMENTS

| | | | |
|---|---|---|---|
| CH | 630745 | A5 | 6/1982 |
| CN | 1726608 | A | 1/2006 |

(Continued)

OTHER PUBLICATIONS

Abbasi et al., "Preparation of Silver Nanowires and Their Application in Conducting Polymer Nanocomposites", Materials Chemistry and Physics, 2015, 166, 1-15.

(Continued)

*Primary Examiner* — David Z Huang
(74) *Attorney, Agent, or Firm* — BakerHostetler

(57) ABSTRACT

Provided are sensors comprising one or both of MXene-coated fibers and MXene-coated yarns.

14 Claims, 19 Drawing Sheets

Related U.S. Application Data continuation of application No. 17/292,031, filed as application No. PCT/US2019/060549 on Nov. 8, 2019, now abandoned.

(60) Provisional application No. 62/767,092, filed on Nov. 14, 2018, provisional application No. 62/757,321, filed on Nov. 8, 2018.

(51) Int. Cl.

| | |
|---|---|
| *G01L 19/00* | (2006.01) |
| *G01L 19/14* | (2006.01) |

(56) References Cited

U.S. PATENT DOCUMENTS

| | | | |
|---|---|---|---|
| 6,555,268 | B1 | 4/2003 | Inoue et al. |
| 6,645,612 | B2 | 11/2003 | Pujari et al. |
| 7,446,190 | B2 | 11/2008 | Sadelain et al. |
| 7,527,859 | B2 | 5/2009 | Zhong et al. |
| 7,964,938 | B2 | 6/2011 | Yoon et al. |
| 7,976,941 | B2 | 7/2011 | Lodyga et al. |
| 8,226,801 | B2 | 7/2012 | Zhamu et al. |
| 9,193,595 | B2 | 11/2015 | Barsoum et al. |
| 10,573,768 | B2 | 2/2020 | Ghidiu et al. |
| 10,720,644 | B2 | 7/2020 | Barsoum et al. |
| 11,411,218 | B2 | 8/2022 | Barsoum et al. |
| 2002/0068488 | A1 | 6/2002 | Tuller et al. |
| 2003/0073769 | A1 | 4/2003 | Pujari et al. |
| 2003/0148184 | A1 | 8/2003 | Omaru et al. |
| 2003/0224168 | A1 | 12/2003 | Mack et al. |
| 2004/0048157 | A1 | 3/2004 | Neudecker et al. |
| 2004/0076856 | A1 | 4/2004 | Hugosson |
| 2004/0229028 | A1 | 11/2004 | Sasaki et al. |
| 2006/0140839 | A1 | 6/2006 | Maniccia et al. |
| 2007/0065725 | A1 | 3/2007 | Inoue et al. |
| 2007/0066503 | A1 | 3/2007 | Basaly |
| 2009/0017332 | A1 | 1/2009 | Kisi et al. |
| 2010/0236937 | A1 | 9/2010 | Rosvall et al. |
| 2010/0322909 | A1 | 12/2010 | Okada et al. |
| 2011/0017585 | A1 | 1/2011 | Zhamu et al. |
| 2011/0045223 | A1 | 2/2011 | Lin et al. |
| 2011/0104464 | A1 | 5/2011 | Pyzik et al. |
| 2012/0021224 | A1 | 1/2012 | Everett et al. |
| 2012/0247800 | A1 | 10/2012 | Shah et al. |
| 2013/0048339 | A1 | 2/2013 | Tour et al. |
| 2013/0092428 | A1 | 4/2013 | Kawaguchi et al. |
| 2013/0210218 | A1 | 8/2013 | Accardi et al. |
| 2014/0092375 | A1* | 4/2014 | Raghavan ............... G01L 1/246 356/32 |
| 2014/0162130 | A1 | 6/2014 | Barsoum et al. |
| 2015/0210044 | A1 | 7/2015 | Barsoum et al. |
| 2015/0305212 | A1 | 10/2015 | Sarto et al. |
| 2015/0306570 | A1 | 10/2015 | Mayes et al. |
| 2015/0321147 | A1 | 11/2015 | Fleming et al. |
| 2016/0336088 | A1 | 11/2016 | Barsoum et al. |
| 2017/0190925 | A1 | 7/2017 | Wu et al. |
| 2018/0108910 | A1 | 4/2018 | Barsoum et al. |
| 2018/0190439 | A1* | 7/2018 | Zhamu .................. H01G 11/34 |
| 2018/0309125 | A1 | 10/2018 | Beidaghi et al. |
| 2019/0060536 | A1 | 2/2019 | Pratt et al. |
| 2021/0155766 | A1 | 5/2021 | Zhang et al. |
| 2021/0323006 | A1 | 10/2021 | Singer et al. |
| 2022/0085224 | A1 | 3/2022 | Nabet et al. |
| 2022/0363916 | A1 | 11/2022 | Gogotsi et al. |
| 2024/0365522 | A1 | 10/2024 | Gogotsi et al. |
| 2024/0402389 | A1 | 12/2024 | Gogotsi et al. |
| 2024/0417581 | A1 | 12/2024 | Kim et al. |
| 2025/0004341 | A1 | 1/2025 | Gogotsi et al. |
| 2025/0011244 | A1 | 1/2025 | Gogotsi et al. |

FOREIGN PATENT DOCUMENTS

| | | | |
|---|---|---|---|
| CN | 101891141 | A | 11/2010 |
| CN | 101916859 | A | 12/2010 |
| CN | 104733712 | A | 6/2015 |
| CN | 106024416 | A | 10/2016 |
| CN | 106986316 | A | 7/2017 |
| CN | 107934908 | A | 4/2018 |
| CN | 108489644 | A | 9/2018 |
| CN | 111900355 | A | 11/2020 |
| EP | 0948067 | A1 | 10/1999 |
| EP | 1381099 | A1 | 1/2004 |
| JP | 08-078018 | A | 3/1996 |
| JP | 10-112316 | A | 4/1998 |
| JP | 2005-158725 | A | 6/2005 |
| JP | 2007-214137 | A | 8/2007 |
| JP | 2008-078115 | A | 4/2008 |
| JP | 2013-142109 | A | 7/2013 |
| WO | 02/39468 | A2 | 5/2002 |
| WO | 02/81372 | A2 | 10/2002 |
| WO | 02/96799 | A2 | 12/2002 |
| WO | 2005/007566 | A2 | 1/2005 |
| WO | 2006/112869 | A2 | 10/2006 |
| WO | 2007/093011 | A1 | 8/2007 |
| WO | 2007/121931 | A2 | 11/2007 |
| WO | 2008/073529 | A2 | 6/2008 |
| WO | 2009/063031 | A2 | 5/2009 |
| WO | 2009/091826 | A2 | 7/2009 |
| WO | 2010/093598 | A2 | 8/2010 |
| WO | 2010/128492 | A1 | 11/2010 |
| WO | 2011/086391 | A1 | 7/2011 |
| WO | 2012/120264 | A1 | 9/2012 |
| WO | 2012/177712 | A1 | 12/2012 |
| WO | 2014/088995 | A1 | 6/2014 |
| WO | 2015/132764 | A1 | 9/2015 |
| WO | 2016/049109 | A2 | 3/2016 |
| WO | 2016/126596 | A2 | 8/2016 |
| WO | 2017/011044 | A2 | 1/2017 |
| WO | 2018/039298 | A1 | 3/2018 |
| WO | 2018/109486 | A1 | 6/2018 |
| WO | 2018/160135 | A1 | 9/2018 |

OTHER PUBLICATIONS

Agulhon et al., Structural Regime Identification in lonotropic Alginate Gels: Influence of the Cation Nature and Alginate Structure, Biomacromolecules 2012, 13, 215-220.

Agulhon et al., Structure of Alginate Gels: Interaction of Diuronate Units with Divalent Cations from Density Functional Calculations, Biomacromolecules 2012, 13, 1899-1907.

Al-Ghamdi et al., "New Electromagnetic Wave Shielding Effectiveness at Microwave Frequency of Polyvinyl Chloride Reinforced Graphite/Copper Nanoparticles", Composites Part A: Applied Science and Manufacturing, 2010, 41, 1693-1701.

Al-Saleh et al., "Copper Nanowire/Polystyrene Nanocomposites: Lower Percolation Threshold and Higher EMI Shielding", Composites Part A: Applied Science and Manufacturing, 2011, 42, 92-97.

Alhabeb et al., MXene films and composites for EMI shielding, stealth planes/boats, metamaterials, invisibility cloaks and other related applications, A.J. Drexel Nanomaterials Institute and Department of Materials Science & Engineering, Drexel University, Philadelphia, PA 19104, USA.

Ameli et al., "Electrical Properties and Electromagnetic Interference Shielding Effectiveness of Polypropylene/Carbon Fiber Composite Foams", Carbon, 2013, 60, 379-391.

Ameli et al., "Lightweight Polypropylene/Stainless-Steel Fiber Composite Foams with Low Percolation for Efficient Electromagnetic Interference Shielding", ACS Applied Materials & Interfaces, 2014, 6, 11091-11100.

Arjmand et al., "Outstanding Electromagnetic Interference Shielding of Silver Nanowires: Comparison with Carbon Nanotubes", RSC Advances, 2015, 5, 56590-56598.

Augustyn, V., et al., "High-rate electrochemical energy storage through Li+ intercalation pseudocapacitance," Nature Materials, vol. 12, No. 6, Apr. 14, 2013, pp. 518-522.

B.-W. Li, Y. Shen, Z.-X. Yue and C.-W. Nan, Applied Physics Letters, 2006, 89, 132504.

(56) References Cited

OTHER PUBLICATIONS

Barsoum et al, "Room-Temperature Deintercalation and Self-Extrusion of Ga from Cr2GaN", Science, May 7, 1999, 284(5416), 937-939.
Barsoum et al, "The Topotactic Transformation of Ti3SiC2 into a Partially Ordered Cubic Ti(C0.67Si0.06) Phase by the Diffusion of Si into Molten Cryolite", Journal of The Electrochemical Society, 1999, 146(10), 3919-3923.
Barsoum, "Physical Properties of the MAX phases", Encyclopedia of Materials: Science and Technology, 2006, 11 pages.
Barsoum, et al., "Synthesis and Characterization of a Remarkable Ceramic: Ti3SiC2," J Amer. Chem. Soc., 1996 79(7), 1953-1956.
Barsoum, M. and El-Raghy, T., "The MAX Phases: Unique New Carbide and Nitride Materials", American Scientist, Jul.-Aug. 2001, 89:334-343.
Barsoum, M. W., "MAX phases: Properties of machinable ternary carbides and nitrides," Properties of Materials, John Wiley & Sons, Sep. 2013, pp. 1-436.
Barsoum, M., "The MN+1AXN phases: New Class of Solids", Progress In Solid State Chemistry, Jan. 1, 2000, 28(1-4), 201-281.
Bayat et al., "Electromagnetic Interference Shielding Effectiveness of Hybrid Multifunctional Fe3O4/carbon Nanofiber Composite", Polymer, 2014, 55, 936-943.
Chang et al., "Synthesis of a new graphene-like transition metal carbide by de-intercalating Ti3AlC2", Mater. Lett., Oct. 2013, 109, 295-298.
Chaudhary et al., "Lightweight and Easily Foldable MCMB-MWCNTs Composite Paper With Exceptional Electromagnetic Interference Shielding", ACS Applied Materials & Interfaces, 2016, 8, 16, 10600-10608.
Chen et al, "Microstructure and Phase Transformation of Ti 3 AC 2 (A= Al, Si) In Hydrofluoric Acid Solution", Crystal Research and Technology, Oct. 27, 2014, 49(10), 813-819.
Chen et al., "In-situ synthesis of Ti3AlC2/TiC—Al20O3 composite from TiO2—Al—C system", Journal of Materials Science & Technology, 2006, 22, 455-458.
Chen et al., "High-Performance Epoxy Nanocomposites Reinforced with Three-Dimensional Carbon Nanotube Sponge for Electromagnetic Interference Shielding", Advanced Functional Materials, 2016, 26, 447-455.
Chen et al., "Lightweight and Flexible Graphene Foam Composites for High-Performance Electromagnetic Interference Shielding", Advanced Materials, 2013, 25, 1296-1300.
Coleman et al, "Two-Dimensional Nanosheets Produced by Liquid Exfoliation of Layered Materials", Science, Feb. 4, 2011, 331, 568-571.
Conway, B. E., "Electrochemical supercapacitors: Scientific fundamentals and technological applications," Kluwer Academic/plenum Publishers, 1999, pp. 1-698.
Cover et al., "A comprehensive survey of M2AX phase elastic properties", Journal Of Physics: Condensed MatterInstitute of physics publishing, bristol, GB, vol. 21, No. 30, Jul. 29, 2009, p. 305403.
Crespo et al., "Synergistic Effect of Magnetite Nanoparticles and Carbon Nanofibers in Electromagnetic Absorbing Composites", Carbon, 2014, 74, 63-72.
Dall'Agnese et al. High capacitance of surface-modified 2D titanium carbide in acidic electrolyte. Electrochemistry Communications vol. 48, pp. 118-122. Available Online Sep. 16, 2014 [retrieved on Nov. 9, 2015]. Retrived from internet: <URL: http://nano.materials.drexel.edu/wp-content/uploads/2013/02/1-s2.0-S1388248114002896-main. pdf>.
De Bellis et al., "Electromagnetic Properties of Composites Containing Graphite Nanoplatelets at Radio Frequency", Carbon, 2011, 49, 4291-4300.
Eis, PS et al., Accumulation of miR-155 and BIC RNA in Human B Cell Lymphomas. Proceedings of the National Academy of Sciences of the United States of America, Mar. 8, 2005, 102(10), 3627-3632, Abstract.
Eklund et al., "The Mn+1AXn Phases: Materials Science and Thin-Film Processing", Thin Solid Films, 2010, 518, 1851-1878.
El-Tantawy et al., "New Functional Conductive Polymer Composities Containing Nickel Coated Carbon Black Reinforced Phenolic Resin", Macromolecular Research, 2005, 13, 194-205.
Enyashin, A. N., et al., "Two-dimensional titanium carbonitrides and their hydroxylated derivatives: Structural, electronic properties and stability of MXenes Ti3C2-xNx(OH)2 from DFTB calculations," Journal of Solid State Chemistry, vol. 207, Nov. 2013, pp. 42-48.
Ettmayer et al., "Crystal structure of Cr3(C,N)2 and CrVC2", Monatshefte fur Chemie und Verwandte Teile Anderer Wissenschaften, Jul. 1966, vol. 97, Issue 4, 1258-1262.
European Patent Application No. 12803351.1: Supplementary European Search Report dated Jan. 30, 2015, 13 pages.
Fang et al., "Layer-Structured Silver Nanowire/Polyaniline Composite Film as a High Performance X-band EMI Shielding Material", Journal of Materials Chemistry C, 2016, 4, 4193-4203.
Finkel et al., "Magnetotransport properties of the ternary carbide Ti3SiC2: Hall effect, magnetoresistance, and magnetic susceptibility", Physical Review B, Jan. 15, 2002, vol. 65, Issue 3, 4 pages.
Fugetsu et al., "Electrical conductivity and electromagnetic interference shielding efficiency of carbon nanotube/cellulose composite paper", Carbon 46, 2008, 1253-1269.
Gargama et al., "Polyvinylidene Fluoride/Nickel Composite Materials for Change Storing, Electromagnetic Interference Absorption, and Shielding Applications", Journal of Applied Physics, 2015, 117, 224903.
Ghaffari, M., et al. High-volumetric performance aligned nanoporous microwave exfoliated graphite oxide-based electrochemical capacitors, Adv. Mater, vol. 25, Issue 35, Sep. 20, 2013, pp. 4879-4885.
Gogotsi, Y., et al., "True performance metrics in electrochemical energy storage," Science, vol. 334, Issue 6058, Nov. 18, 2011, pp. 917-918.
H. S. S. Ramakrishna Matte et al: "MoS2 and WS2 Analogues of Graphene", Angewandte Chemie International Edition, vol. 49, No. 24, Apr. 28, 2010 pp. 4059-4062.
Halim et al., "Transparent Conductive Two-Dimensional Titanium Carbide Epitaxial Thin Films", Chem. Mater., 2014, vol. 26, No. 7, 2374-2381, Abstract; p. 2376, Scheme 1, p. 2379, col. 1, para. 2; p. 2379, col. 2, para. 2.
Halim, J., et al. "Transparent conductive two-dimensional titanium carbide epitaxial thin films," Chemistry of Materials, vol. 26, Issue 7, Feb. 28, 2014, pp. 2374-2381.
Henadaoui et al., "Ti—Al—C Max Phases by Aluminothermic Reduction process", International Journal of Self-Propagating High-Temperature Synthesis, 2008, 17, 125-128.
Hensen, E. J. et al., "Why clays swell?," J. Phys. Chem. B, vol. 106, Issue 49, Nov. 14, 2002, pp. 12664-12667.
Hsiao et L., "Lightweight and flexible reduced graphene oxide/water-borne polyurethane composites with high electrical conductivity and excellent electromagnetic interference shielding performance", ACS Applied Materials & Interfaces, 2014, 6, 13, 10667-10678.
Hu et al. "Two-dimensional Sc.sub.2C: A reversible and high-capacity hydrogen storage material predicted by first principles calculations", International Journal of Hydrogen Energy, Jul. 2014, 39, 20, 10606-10612.
Hu et al., "Mo 2 Ga 2 C: a new ternary nanolaminated carbide", Chemical Communications, vol. 51, No. 30, Mar. 4, 2015,pp. 6560-6563.
Hu et al., "MXene: A New Family of Promising Hydrogen Storage Medium", J. Phys. Chem A, 2013, 117, 14523-14260.
Hu et al., "Supplementary Information for Mo2Ga2C: a new ternary nanolaminated carbide", Chemical Communications, Mar. 4, 2015, pp. 1-5.
Hu, C., "Low Temperature Thermal Expansion, High Temperature Electrical Conductivity, and Mechanical Properties of Nb4AlC3 Ceramic Synthesized by Spark Plasma Sintering", Journal of Alloys and Compounds, Nov. 13, 2009, 487 (1-2), 675-681.
Huang et al., "The Influence of Single-Walled Carbon Nanotube Structure on the Electromagnetic Interference Shielding Efficiency of its Epoxy Composites", Carbon, 2007, 45, 1614-1621.

(56) References Cited

OTHER PUBLICATIONS

International Patent Application No. PCT/US13/072733: The International Search Report and The Written Opinion dated Mar. 28, 2014, pp. 1-12.
International Patent Application No. PCT/US13/64503: The International Search Report and The Written Opinion dated Jan. 24, 2014, pp. 1-13.
J et al: "A Non-Aqueous Asymmetric Cell with a Ti 2 C-Based Two-Dimensional Negative Electrode", A1368 Journal ofThe Electrochemical Society, Jan. 1, 2012, pp. 1368-1373.
Jiang et al., "Facile, Green and Affordable Strategy for Structuring Natural Graphite/Polymer Composite with Efficient Electromagnetic Interference Shielding", RSC Advances, 2015, 5, 22587-22592.
Jin et al., "Synthesis of VC—Cr3C2 Nanocomposite Powders by Carbothermal Reduction", Nanoscience and Nanotechnology Letters, Oct. 2012, vol. 4, No. 10, 1028-1030, Abstract, 1 page.
Jiwu Shang et al: "Fabrication and dielectric properties of oriented polyvinylidene fluoride nanosheets", Materials Chemistry and Physics, Elsevier SA, Switerland, Taiwan, Republic of China, vol. 134, No. 2, Mar. 23, 2012 pp. 867-874.
Jung, I., et al., "Tunable electrical conductivity of individual graphene oxide sheets reduced at "low" temperatures," Nano Lett, vol. 8, issue 12, Nov. 1, 2008, pp. 4283-4287.
Korzhavyi et al, "Ab Initio Study of Phase Equilibria in TiC.sub.x", Physical Review Letters, Dec. 18, 2001, 88(1), 1-4.
Krueger et al., "Synergistic Effects of Carbon Fillers on Shielding Effectiveness in Conductive Nylon 6, 6-and Polycarbonate-Based Resins", Advances in polymer Technology, 2003, 22, 96-111.
Kuester et al., "Processing and Characterization of Conductive Composites Based on poly(styrene-b-ethylene-ran-butylene-b-styrene) (SEBS) and Carbon additives: A Comparative study on expanded graphite and carbon Black", Composites Part B: Engineering, 2016, 84, 236-247.
Kulkarni et al, Thermal Expansion and Stability of Ti2SC in Air and Inert Atmospheres, Journal of Alloys and Compounds, 2009, 469, 395-400.
Kumar et al., "Large-Area Reduced Graphene Oxide thin film with excellent thermal conductivity and Electromagnetic Interference Shielding Effectiveness", Carbon, 2015, 94, 494-500.
Levi, M. D., et al., "Solving the capacitive paradox of 2D MXene by electrochemical quartz-crystal admittance and in situ electronic conductance measurements," Advance Energy Materials, vol. 5, Issue 1, Aug. 8, 2014, pp. 11.
Li et al., "Electrical and Mechanical Properties of Electronically Conductive Polyethersulfone Composites", Composites, 1994, 25, 215-224.
Li et al., "Facile Synthesis and properties of ZnFe204 and ZnFe204/polypyrrole core-shell nanoparticles", Solid State Sciences, 2009, 11, 1319-1324.
Li et al., "Lightweight and highly conductive aerogel-like carbon from sugarcane with superior mechanical and EMI shielding Properties", ACS Sustainable Chemistry & Engineering, 2015, 3, 1419-1427.
Li et al., "Making polymeric membranes antifouling via "grafting from", polymerization of zwitterions", Journal of Applied Polymer Science, 2015, 132, 41781.
Li et al., "Synthesis and thermal stability of two-dimensional carbide MXene Ti3C2", Materials Science and Engineering, vol. 191, 2015, pp. 33-40.
Li et al., "Ultrathin carbon foams for effective electromagnetic interference shielding", Carbon, 2016, 100, 375-385.
Liang et al., "Electromagnetic interference shielding of graphene/epoxy composites", Carbon, 2009, 47, 922-925.
Ling et al., "Facile Preparation of Lightweight Microcellular Polyetherimide/graphene composite foams for electromagnetic interference shielding", ACS Applied Materials & Interfaces, 2013, 5, 2677-2684.
Ling et al., "Flexible and conductive MXene films and nanocomposites with high capacitance", PNAS, Nov. 25, 2014, vol. 111, No. 47, 16676-16681, Supporting Information.
Lis, D., et al., "Liquid flow along a solid surface reversibly alters interfacial chemistry," Science, vol. 344, Issue 6188, Jun. 6, 2014, pp. 1138-1142.
Lukatskaya et al, "Cation Intercalation and High Volumetric Capacitance of Two-Dimensional Titanium Carbide", Science, vol. 341, No. 6153, Sep. 27, 2013, pp. 1502-1505, & "Supplementary Materials—Cation Intercalation and High Volumetric Capacitance of Two-Dimensional Titanium Carbide", Science, vol. 341, No. 6153, Sep. 26, 2013, pp. 1-15.
Madsen, F. T., et al., "The swelling behaviour of clays," Applied, Clay Science, vol. 4, Issue 2, Jun. 1989, pp. 143-156.
Makino et al., "Characterization of Zr—Al—N films synthesized by a magnetron sputtering method", Surface & Coatings Technology, 193 (2005) 219-222.
Mashtalir, O., et al., "Intercalation and delamination of layered carbides and carbonitrides," Nature Communications, vol. 4, Issue 1, Apr. 16, 2013, pp. 24.
Mashtalir, O., et al., "Kinetics of aluminum extraction from Ti3AlC2 in hydrofluoric acid," Materials Chemistry and Physics, vol. 139, Issue 1, Apr. 15, 2013, pp. 147-152.
Miller, J., et al., "Electrochemical capacitors for energy management," Materials Science, vol. 321, No. 5889, Sep. 2008, pp. 651-652.
Mishra et al., "Conducting Ferrofluid: a high-performance microwave shielding material", Journal of Materials Chemistry A, 2014, 2, 13159-13168.
Mogilevsky et al, "The Structure of Multilayered Titania Nanotubes Based on Delaminated Anatase", Chemical Physics Letters, 2008, 460, 517-520.
Moglie "Electromagnetic Shielding Performance of Carbon Foams", et al., Carbon, 2012, 50, 1972-1980.
Murali, S., et al., "Volumetric capacitance of compressed activated microwave-expanded graphite oxide (a-MEGO) electrodes," Nano Energy, vol. 2, Feb. 7, 2013, pp. 764-768.
Myhra, et al., "Crystal-Chemistry of the Ti.sub.3AlC.sub.2 and Tl.sub.4AlN Layered Carbide/Nitride Phases—Characterization by XPS", Journal of Physics and Chemistry of Solids, Apr. 2001, vol. 62(4), 811-817.
Nadeau, "Clay Particle Engineering: a Potential New Technology with Diverse Applications", Applied Clay Science, 1987, 2, 83-93.
Naguib et al, "Mxene: A Promising Transition Metal Carbide Anode for Lithium-ion Batteries", Electrochemistry Communications, 2012, 16, 61-64.
Naguib et al, "New Two-dimensional Niobium and Vanadium Carbides as Promising Materials for Li-Ion Batteries", American Chemical Society, Oct. 2013, 135(43), 15966-15969.
Naguib et al, "Two-Dimensional Nanocrystals Produced by Exfoliation of Ti.sub.3AlC.sub.2", Advanced Materials, 2011, 23, 4248-4253.
Naguib et al, "Two-Dimensional Transition Metal Carbides", American Chemical Society, Feb. 2012, 6(2), 1322-1331.
Naguib et al, Synthesis of a New Nanocrystalline Titanium Aluminum Fluoride Phase by Reaction of Ti2aic With Hydrofluoric Acid, RSC Adv. 1: 1493-1499, 2011. [retrieved on Mar. 7, 2014]. Retrieved from the internet: <URL: http://pubs.rsc.org .ezproxy.neu.ed u/en/Content/Articlelanding/2011/RA/c1raO0390a#/div, Abstract.
Naguib et al., "Mxenes: A new family of two-dimensional materials", Advanced Materials, 2014, 26, 992-1005.
Naguib, M., et al., "Mxenes: A new family of two dimensional materials," Advanced Materials, vol. 26, 2014, pp. 992-1005.
Naguib, M., et al., "Two-dimensional nanocrystals produced by exfoliation of Ti3AlC2," Advanced Materials, vol. 23, Issue 37, Oct. 4, 2011, pp. 4248-4253.
Nan et al., "Percolation phenomena in niobium-doped TiC1—x", Materials Science and Engineering B-Solid State Materials for Advanced Technology, Feb. 1991, vol. 7, Issue 4, 283-286.
Nicolosi, V., et al., "Liquid exfoliation of layered materials," Science, vol. 340, Issue 6139, 2013, pp. 19.

(56) References Cited

OTHER PUBLICATIONS

Ning et al., "Two-dimensional nanosheets of MoS2: A promising material with high dielectric properties and microwavE absorption performances", Nanoscale, 2015, 7, 15734-15740.
Novel Electronic and Magnetic Properties of Two-Dimensional Transition Metal Carbides and Nitrides, Khazaei et al., Adv. Funct. Mater. 2013, 23, 2185-2192.
Ohlan et al., "Microwave Absorption behavior of core-shell structured poly (3, 4-ethylenedioxy thiophene)—Barium Ferrite Nanocomposites", ACS Applied Materials & Interfaces, 2010, 2, 927-933.
Panwar et al., "Analysis of electrical, dielectric, and electromagnetic interference shielding behavior of graphite filled high density polyethylene composites", Polymer Engineering & Science, 2008, 48, 2178-2187.
Peng et al., "Unique lead adsorption behavior of activated hydroxyl group in two-dimensional titanium carbide", Journal of The American Chemical Society, 2014, 136, 4113-4116.
Rao et al, "A Study of the Synthetic Methods and Properties of Graphenes", Science and Technology of Advanced Materials, 11, Oct. 27, 2010, 1-15.
Rao et al., "Single-Layer Graphene-Assembled 30 Porous Carbon Composites with PVA and Fe 3 0 4 nano-fillers: an interface-mediated superior dielectric and EMI shielding", Physical Chemistry Chemical Physics, 2015, 17, 18353-18363.
Rudy, "Crystal structure of Ta2VC2", Journal of the Less-Common Motale, Jan. 1970, vol. 20, Issue 1, 49-55.
S. H. Hosseini and A. Asadnia, J. Nanomalerials, 2012, 2012, 3-3.
Sachdev et al., "Electromagnetic Interference Shielding of Graphile/Acrylonilrile Buladiene Styrene Composites", Journal of Applied Polymer Science, 2011, 120, 1100-1105.
Savoskin et al, "Carbon Nanoscrolls Produced From Acceptor-Type Graphite Intercalation Compounds", 2007, Carbon, 45, 2797-2800.
Schmidt, et al., "XPS Studies of Amino Acids Absorbed on Titanium Dioxide Surfaces", Fresenius Journal of Analytical Chemistry, May 1991, 341, 412-415.
Shahzad et al., "Biomass-Derived Thermally Annealed Interconnected Sulfur-Doped Graphene as a Shield Against Electromagnetic Interference", ACS Applied Materials & Interfaces, 2016, 8, 9361-9369.
Shahzad et al., "Sulfur doped graphene/polystyrene nanocomposites for electromagnetic interference shielding", Composite Structures, 2015, 133, 1267-1275.
Shen et al., "Compressible Graphene-Coated Polymer Foams with Ultralow Density for Adjustable Electromagnetic Interference (EMI) Shielding," ACS Appl. Mater. Interfaces, vol. 8, 2016, pp. 8050-8057.
Shen et al., "Lightweight, Multifunctional Polyetherimide/Graphene@Fe304 Composite Foams for Shielding of Electromagnetic Pollution", ACS Applied Materials & Interfaces, 2013, 5, 11383-11391.
Shen et al., "Microcellular graphene foam for improved broadband electromagnetic interference shielding", Carbon, 2016, 102, 154-160.
Shen et al., "Ultrathin flexible graphene film: An Excellent thermal conducting material with efficient EMS shielding", Advanced Functional Materials, 2014, 24, 4542-4548.
Shui et al., "Nickel filament polymer-matrix composites with low surface impedance and high electromagnetic interference shielding effectiveness", Journal of Electronic Materials, 26, 928-934.
Simon, P., et al., "Materials for electrochemical capacitors," Nature Materials, vol. 7, Dec. 2008, pp. 845-854.
Simon, P., et al., "Where do batteries end and supercapacitors begin?," Science, vol. 343, Mar. 14, 2014, pp. 1210-1211.
Singh et al., "Encapsulation of y-Fe 2 O 3 decorated reduced graphene oxide in polyaniline core-shell tubes as an exceptional tracker for electromagnetic environmental pollution", Journal of Materials Chemistry A, 2014, 2, 3581-359.
Singh et al., "Nanostructured graphene/Fe 3 O 4 incorporated polyaniline as a high performance shield against electromagnetic pollution", Nanoscale, 2013, 5, 2411-2420.
Singh et al., "Phenolic resin-based composite sheets filled with mixtures of reduced graphene oxide, y-Fe203 and carbon fibers for excellent electromagnetic interference shielding in the X-band", Carbon, 2012, 50, 3868-3875.
Singh et al., "Poly (3,4-ethylenedioxythiophene) y-Fe203 polymer composite-super paramagnetic behavior and variable range hopping 1D conduction mechanism-synthesis and Characterization", Polymers for Advanced Technologies, 2008, 19, 229-236.
Singh et al., "Probing the engineered sandwich network of vertically aligned carbon nanotube-reduced graphene oxide composites for high performance electromagnetic interference shielding applications", Carbon, 2015, 85, 79-88.
Song et al., "Flexible graphene/polymer composite films in sandwich structures for effective electromagnetic interference shielding", Carbon, 2014, 66, 67-76.
Song et al., "Interfacial engineering of carbon nanofiber-graphene-carbon nanofiber heterojunctions in flexible lightweight electromagnetic shielding networks", ACS Applied Materials & Interfaces, 2014, 6, 10516-10523.
Song et al., "Magnetic and conductive graphene papers toward thin layers of effective electromagnetic shielding", Journal of Materials Chemistry A, 2015, 3, 2097-2107.
Spanier et al, "Vibrational Behavior of the Mn+1AXn phases from First-Order Raman Scattering , M=Ti , V,Cr, A=Si, X=C,N)", Physical Review B, Jan. 2005, 71, 1-4.
Srinivasan, "Batteries for Advanced Transportation Technologies (BATT) Program. The fourth quarter 2014 FY report", Berkeley National Laboratory Document, Nov. 19, 2014, http://bmr.lbl.gov/wp-content/uploads/sites/3battfiles/reports/BATT_2014_-4th_Quarterly_Report.pdf, 74 pages.
Stankovich et al, "Graphene-based Composite Materials", Nature, Jul. 2006, 442, 282-286.
Su et al., "High-Quality Thin Graphene Films from Fast Electrochemical Exfoliation", ACS Nano, 2011, 5(3), 2332-2339.
Sui et al., "The Synthesis of three-dimensional (30) Polydopamine-functioned carbonyl ion powder@polypryrrole (CIP@PPy) Aerogel Composites for Excellent Microwave Absorption", Synthetic Metals, Dec. 2015, vol. 210, Part B, pp. 156-164.
Tang et al., "Are MXenes Promising Anode Materials for Li Ion Batteries? Computational Studies on Electronic Properties and Li Storage Capability of Ti.sub.3C.sub.2 and Ti.sub.3C.sub.2X.sub.2 (X=F, OH) Monolayer", Journal of The American Chemical Society, 2012, 134, 16909-16916.
Tao, Y., et al., "Towards ultrahigh volumetric capacitance: graphene derived highly dense but porous carbons for supercapacitors," Scientific Report, vol. 3, Issue 1, Oct. 17, 2013, pp. 8.
Thore, Phase stability and physical properties of nanolaminated materials from first principles, Link ping Studies in Science and Technology Dissertation No. 1742, 2016.
Tran et al, "Lithium Intercalation in Porous Carbon Electrodes", Material Research Society 1995 Spring Meeting, San Francisco, CA, Apr. 17-21, 1995, 12 Pages.
Travaglini et al, "The Corrosion Behavior of Ti3SiC2 In Common Acids and Dilute NaOH", Corrosion Science, Jun. 1, 2003, 45(6), 1313-1327.
Tripathi et al., "High yield Synthesis of Electrolyte heating assisted electrochemically exfoliated graphene for electromagnetic interference shielding applications", RSC Advances, 2015, 5, 19074-19081.
Tzenov et al, "Synthesis and Characterization of TI3ALC2", Journal of the American Ceramic Society, Jan. 1, 2000, 83(4), 825-832.
Umrao et al., "Microwave-Assisted Synthesis of Boron and Nitrogen co-doped Reduced Graphene Oxide for the Protection of Electromagnetic Radiation in Ku-Band", ACS Applied Materials & Interfaces, 2015, 7, 19831-19842.
Varshney et al., "In Situ Synthesis of Polypyrrole-y-Fe203-Fly Ash Nanocomposites for Protection against EMI Pollution", Industrial & Engineering Chemistry Research, 2014, 53, 14282-14290.

(56) References Cited

OTHER PUBLICATIONS

Verma et al., "Barium Ferrite Decorated Reduced Graphene Oxide Nanocomposite for Effective Electromagnetic Interference Shielding", Physical Chemistry Chemical Physics, 2015, 17, 1610-1618.
Viculis et al, "A Chemical Route to Carbon Nanoscrolls", Science, Feb. 28, 2003, 299, p. 1361.
Viculis, et al., "Intercalation and Exfoliation Routes to Graphite Nanoplatelets", Journal of Materials Chemistry, 2005, vol. 15, 974-978.
Wang, J., et al., "Pseudocapacitive contributions to electrochemical energy storage in TiO2 (anatase) nanoparticles," J. Phys. Chem. C, vol. 111, Issue 40, Sep. 18, 2007, pp. 14925-14931.
Wen et al., "High Performance electromagnetic Interference Shielding of Lamellar MoSi2/glass composite coatings by plasma spraying", Journal of Alloys and Compounds, 2016, 666, 359-365.
Wen et al., "Reduced Graphene Oxides: Light-Weight and High-Efficiency Electromagnetic Interference Shielding at Elevated Temperatures", Advanced Materials, 2014, 26, 3484-3489.
Wen et al., "Reduced Graphene Oxides: The Thinnest and Most Lightweight Materials with Highly Efficient Microware Attenuation Performances of the Carbon World", Nanoscale, 2014, 6, 5754-5761.
Wenderoth et al., "Synergism on Electromagnetic Inductance (EMI)-shielding in metal-and-ferroelectric-particle filled polymers", Polymer Composites, 1989, 10, 52-56.
X. Huang, B. Dai, Y. Ren, J. Xu and P. Zhu, J. Nanomaterials, 2015, 2015, 2-2.
Xiao, Han et al., "Studies on the Synthesis and Microwave Absorption Properties of Fe3 04/polyaniline FGM", Physiec Scripta, 2007, 2007, 335.
Xie, X, et al., "Surface AI leached Ti3AlC2 substituting carbon for catalyst support served in a harsh corrosive electrochemical system," Nanoscale, vol. 6, No. 19, Oct. 7, 2014, pp. 11035-11040.
Xu et al., "Synthesis of Electromagnetic Functionalized Barium Ferrite Nanoparticles Embedded in Polypyrrole", The Journal of Physical Chemistry B, 2008, 112, 2775-2781.
Yan et al., "Efficient Electromagnetic Interference Shielding of Lightweight Graphene/Polystyrene Composite", Journal of Materials Chemistry, 2012, 22, 18772-18774.
Yan et al., "Structured Reduced Graphene Oxide/Polymer Composites for Ultra-Efficient Electromagnetic Interference Shielding", Advanced Functional Materials, 2015, 25, 559-566.
Yang et al., "Conductive Carbon Nanofiber-Polymer Foam Structures", Advanced Materials, 2005, 17, 1999-2003.
Yang et al., "Novel Carbon Nanolube-Polystyrene Foam Composites for Electromagnetic Interference Shielding" Nanc Letters, 2005, 5, 2131-2134.
Yang, X., et al., "Liquid-mediated dense integration of graphene materials for compact capacitive energy storage," Science, vol. 341, Issue 6145, Aug. 2, 2013, pp. 534-537.
Yao et al., "Flammability Properties and Electromagnetic Interference Shielding of PVC/graphene Composites Containing Fe304 Nanoparticles", RSC Advances, 2015, 5, 31910-31919.
Yuan et al., "Design of Artificial Nacre-Like Hybrid Films as Shielding to Mitigate Electromagnetic Pollution", Carbon, 2014, 75, 178-189.
Yuchang et al., "Graphene Nanosheels/BaTiO 3 ceramics as highly efficient electromagnetic interference shielding materials in the X-band", Journal of Materials Chemistry C, 2016, 4, 371-375.
Zeng et al., "Lightweight and Anisotropic Porous MWCNT/WPU composites for ultrahigh performance electromagnetic interference shielding", Advanced Functional Materials, 2016, 26, 303-310.
Zeng et al., "Thin and Flexible multi-walled carbon nanolube/walerborne polyurethane composites with high-performance electromagnetic interference shielding", Carbon, 2016, 96, 768-777.
Zhang et al., "Nitrogen-doped Graphdiyne Applied for Lithum-ion Storage", ACS applied materials & interfaces, 2016, 8, 13, 8467-8473.
Zhang et al., "Preparation and Characterization of Graphene Paper for Electromagnetic Interference Shielding", Carbon, 2015, 82, 353-359.
Zhang et al., "Recent Research and Applications of (Ti12xAlx)N Thin Hard Coaling", Journal of Synthetic Crystals, Jun. 2007, p. 700.
Zheng, J. P., et al., "Hydrous ruthenium oxide as an electrode material for electrochemical capacitors," J. Electrochemical Society, vol. 142, No. 8, Aug. 1995, pp. 2699-2703.
Uzun Simge et al: "Knittable and Washable Multifunctional MXeneCoated Cellulose Yarns", Advanced Functional Materials, vol. 29, No. 45, Nov. 5, 2019 (Nov. 5, 2019), p. 1905015.
Wang et al., High Perfomance Biscrolled MXene/Carbon Nanotube Yam Supercapacitors, Small, 2018, 14(37), 1802225.
Wang et al., Influences from solvents on charge storage in titanium carbide Mxenes, Nat. Energy, 2019, 4, 241-248.
Wang Zhiyu et al: "High-Performance Biscrolled MXene/Carbon Nanotube Yarn Supercapacitors", Small, vol. 14, No. 37, Sep. 1, 2018 (Sep. 1, 2018), p. 1802225.
Weng et al., Layer-by-Layer Assembly of Cross-Functional Semi-transparent MXene-Carbon Nanotubes Composite Films for Next-Generation Electromagnetic Interference Shielding, Adv. Funct. Mater., 2018, 28, 1803360.
Weng et al., Smart Electronic Textiles, Angew. Chem. Int. ed., 2016, 55, 6140-6169.
Xiao et al., Fiber-Based All-Solid-State Flexible Supercapacitors for Self-Powered Systems, ACS Nano, 2012, 6, 9200-9206.
Xiong et al., Recent Advances in Layered Ti3C2Tx MXene for Electrochemical Energy Storage, Small, 2018, 14, 1703419.
Xu et al., Direct spinning of fiber supercapacitor, Nonoscale, 2016, 8, 12113-12117.
Xue et al., Recent Progress on Flexible and Wearable Supercapacitors, Small, 2017, 13, 1701827.
Yang et al., Assembly of NiO/Ni(OH)2/PEDOT Nanocomposites on Contra Wires for Fiber-Shaped Flexible Asymmetric Supercapacitors, ACS Apl. Mater Interfaces, 2016, 8, 1774-1779.
Yetisen et al., Nanotechnology in Textiles, ACS Nano, 2016, 10, 3042-3068.
Yu et al., Emergence of fiber supercapacitors, Chem. Soc. Rev., 2015, 44, 647-62.
Yu et al., Scalable synthesis of hierarchically structured carbon nanotube-graphene fibres for capacitive energy storage, Nat. Nanotechnol., 2014, 9, 555-562.
Zhang et al., "Transparent, Flexible, and Conductive 2D Titanium Carbide (MXene) Films with High Volumetric Capacitance" Adv. Mater, Sep. 27, 2017, vol. 29, Issue 36, 1702678.
Zhang et al., Fast and scalable wet-spinning of highly conductive PEDOT:PSS fibers enables versatile applications, J. mater. Chem. A, 2019, 7, 6401-6410.
Zhang et al., Highly Conductive Ti3C2Tx MXene Hybrid Fibers for Flexible and Elastic Fiber-Shaped Supercapacitors, Small, 2019, 15, 1804732.
Zhang et al., Mxene: a potential candidate for yarn supercapacitors, Nanoscale, 2017, 9(47), 18604-18608.
Zhang et al., Oxidation Stability of Colloidal Two-Dimensional Titanium Carbides (MXenes), Chem. Mater., 2017, 29, 4848-4856.
Zhao et al., Flexible MXene/carbon nanotube composite paper with high volumetric capacitance, Adv. Mater, 2015, 27, 339-345.
Zhao et al., Graphene-based single fiber supercapacitor with a coaxial structure, Nanoscale, 2015, 7, 9399-9404.
Alhabeb et al., Guidelines for Synthesis and Processing of Two-Dimensional Titanium Carbide (Ti3C2Tx MXene), Chem. Mater., 2017, 29, 7633-7644.
An English translation to CN 108489644 A to Gao et al. obtained from PE2E database (Year: 2018).
Atalay et al., Knitted Strain Sensors: Impact of Design Parameters on Sensing Properties, Sensors, 2014, 14(3), 4712-4730.
Bayes, TEX: Universal Yarn Numbering System, J. Text. Inst. Proc. 1957, 48, 255-267.
Behabtu et al., Strong, light, multifunctional fibers of carbon nanotubes with ultrahigh conductivity, Science, 2013, 339, 182-186.

(56) References Cited

OTHER PUBLICATIONS

Beidaghi et al., Capacitive energy storage in micro-scale devices: recent advances in design and fabrication of microsupercapacitors, Energy Environ. Sci. 2014, 7, 867-884.
Chae et al., An investigation into the factors governing the oxidation of two-dimensional Ti3C2 Mxene, Nanoscale, 2019, 11, 8387-8393.
Chen et al., An Integrated "energy wire" for both photoelectric conversion and energy storage, Angew. Chem. Int. Ed., 2012, 51, 11977-11980.
Davis et al., True solutions of single-walled carbon nanotubes for assembly into macroscopic materials, Nat. Nanotechnol. 2009, 4, 830-834.
English Machine Translation of CN 107934908 A, Apr. 20, 2018 (Year: 2018).
English Machine Translation of CN 108489644 A, Sep. 4, 2018 (Year: 2018).
Ghidiu et al., Conductive two-dimensional titanium carbide 'clay' with high volumetric capacitance, Nature, 2014, 516, 78-81.
Ghidiu et al., The {110} reflection in X-ray diffraction of MXene films: Misinterpretation and measurement via non-standard orientation, J. Am. Ceram. Soc., 2017, 100, 5395-5399.
Habib et al., Oxidation stability of Ti3C2Tx MXene nanosheets in solvents and composite films, npj 2D Materials and Applications, 2019, 3, 8.
Halim et al., X-ray photoelectron spectroscopy of select multi-layered transition metal carbides (MXenes), Appl. Surf. Sci., 2016, 362, 406-417.
He et al., Graphene-Fiber-Based Supercapacitors Favor N-Methyl-2-pyrrolidone/Ethyl Acetate as the Spinning Solvent/Coagulant Combination, ACS Appl. Mater. Lnlerfaces, 2017, 9, 24568-24576.
Hu et al., All-Solid-State Flexible Fiber-Based MXene Supercapacitors, Advanced Materials Technologies, 2017, 2(10), 1700143.
Huang et al., From Industrially Weavable and Knittable Highly Conductive Yarns to Large Wearable Energy Storage Textiles, ACS Nano, 2015, 9(5), 4766-4775.
Jalili, R., et al., "One-Step Wet-Spinning Process of Poly(3,4-ethylenedioxythiophene): Poly(styrenesulfonate) Fibers and the Origin of Higher Electrical Conductivity," Advanced Functional Materials, vol. 21, Issue 17, Sep. 9, 2011, pp. 3363-3370.
Jin et al., High-performance yarn electrode materials enhanced by surface modifications of cotton fibers with graphene sheets and polyaniline nanowire arrays for all-solid-state supercapacitors, Electrochim. Acta., 2018, 270, 205-214.
Jost et al., Carbon coated textiles for flexible energy storage, Energy Environ. Sci., 2011, 4, 5060-5067.
Jost et al., Knitted and screen printed carbon-fiber supercapacitors for applications in wearable electronics, Energy Environ. Sci., 2013, 6, 2698-2705.
Jost et al., Natural Fiber Welded Electrode Yarns for Knittable Textile Supercapacitors, Advanced Energy Materials, 2015, 5(4), 1401286.
Jost et al., Textile energy storage in perspective, Journal of Materials Chemistry A, 2014, 2(28), 10776-10787.
Kurra et al., "MXene-on-Paper Coplanar Microsupercapacitors," Adv. Energy Mater, Dec. 21, 2016, vol. 6, Issue 24, 1601372.
Le et al., Coaxial Fiber Supercapacitor Using All-Carbon Material Electrodes, ACS Nano, 2013, 7, 5940-5947.
Lee et al., Conductive Fiber-Based Ultrasensitive Textile Pressure Sensor for Wearable Electronics, Adv. Mater, 2015, 27, 2433-2439.
Levi et al., Solving the Capacitive Paradox of 2D MXene using Electrochemical Quartz-Crystal Admittance and In Situ Electronic Conductance Measurements, Adv. Energy Mater., 2015, 5, 1400815.
Lima et al., Biscrolling nanotube sheets and functional guests into yarns, Science, 2011, 331, 51-55.
Lin et al., Two-Dimensional Ultrathin MXene Ceramic Nanosheets for Photothermal Conversion, Nano Lett., 2017, 17, 384-391.
Ling et al., Flexible and conductive MXene films and nanocomposites with high capacitance, Natl Acad. Sci., 2014, 111, 16676-16681.
Lipomi et al., Skin-like pressure and strain sensors based on transparent elastic films of carbon nanotubes, Bao. Nat. Nanotechnol., 2011, 6, 788-792.
Liu et al., Cable-type supercapacitors of three-dimensional cotton thread based multi-grade nanostructures for wearable energy storage, Adv. Mater., 2013, 25, 4925-4931.
Liu et al., Wearable energy-dense and power-dense supercapacitor yarns enabled by scalable graphene-metallic textile composite electrodes, Nature Communications, 2015, 6, 7260.
Lukatskaya et al., Cation Intercalation and High Volumetric Capacitance of Two-Dimensional Titanium Carbide, Science, 2013, 341, 1502-1505.
Lukatskaya et al., Probing the Mechanism of High Capacitance in 2D Titanium Carbide Using In Situ X-Ray Absorption Spectroscopy, Adv. Energy Mater., 2015, 5, 1500589.
Lukatskaya et al., Ultra-high-rate pseudocapacitive energy storage in two-dimensional transition metal carbides, Nat. Energy, 2017, 2, 17105.
Maleski et al., Size-Dependent Physical and Electrochemical Properties of Two-Dimensional MXene Flakes, ACS Appl. Mater. Interfaces, 2018, 10, 24491-24498.
Maria R. Lukatskaya et al: "Ultra-high-rate pseudocapacitive energy storage in two-dimensional transition metal carbides", Nature Energy, vol. 2, No. 8, Jul. 10, 2017 (Jul. 10, 2017), p. 17105.
Meng et al., High-Performance All-Carbon Yarn Micro-Supercapacitor for an Integrated Energy System, Adv. Mater., 2014, 26, 4100-4106.
Meng et al., MXene Sorbents for Removal of Urea from Dialysate: A Step toward the Wearable Artificial Kidney, ACS Nano., 2018, 12, 10518-10528.
Park et al., Cellulose crystallinity index: measurement techniques and their impact on interpreting cellulase performance, Biotechnol. Biofuels, 2010, 3, 10.
Peng et al., All-MXene (2D titanium carbide) solid-state microsupercapacitors for on-chip energy storage, Energy Environ. Sci., 2016, 9, 2847-2854.
Persson et al., On the organization and thermal behavior of functional groups on Ti3C2 MXene surfaces in vacuum, 2D Materials, 2017, 5, 015002.
Seyedin et al., Knittable energy storing fiber with high volumetric performance made from predominantly MXene nanosheets. Journal of Materials Chemistry A, 2017, 5(46), 24076-24082.
Seyedin et al., Knitted Strain Sensor Textiles of Highly Conductive All-Polymeric Fibers, ACS Appl. Mater. Interfaces, 2015, 7, 21150-21158.
Shao Wenyu et al: "Polyester@MXene nanofibers-based yarn electrodes", Journal of Power Sources, vol. 396, Aug. 1, 2018 (Aug. 1, 2018), pp. 683-690.
Smentkowski, V.S., "Trends in sputtering," Progress in Surface Science, May 2000, vol. 64, Issue 1-2, pp. 1-58.
Stoller et al., Best practice methods for determining an electrode material's performance for ultracapacitors, Energy Environ. Sci., 2010, 3, 1294-1301.
Tebyeteken et al., Energy & Environmental Science 2019.

* cited by examiner

FIG. 3A
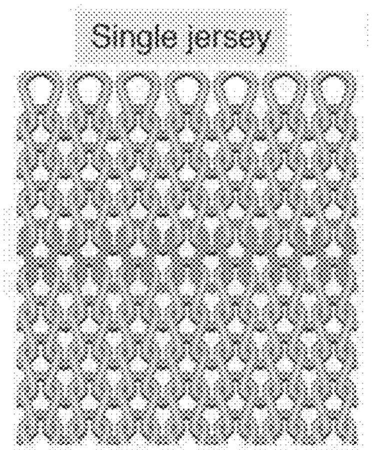
FIG. 3B
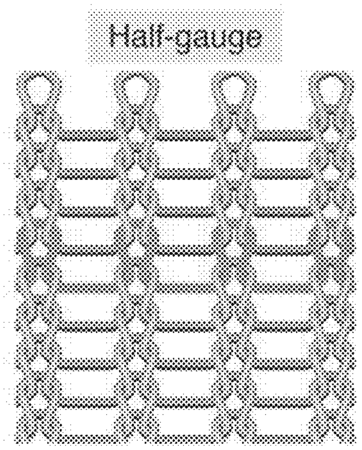
FIG. 3C
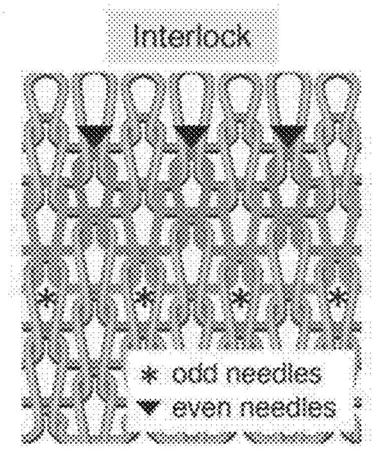
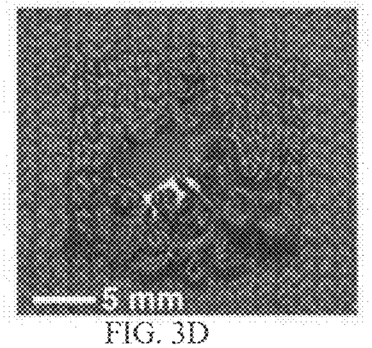
FIG. 3D
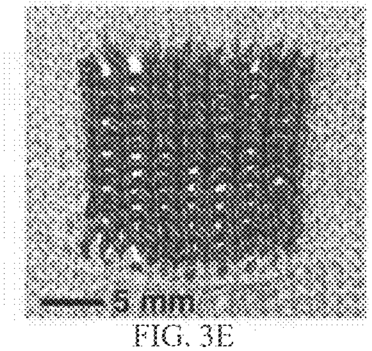
FIG. 3E
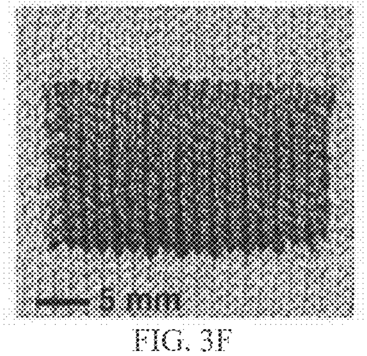
FIG. 3F FIG. 10A
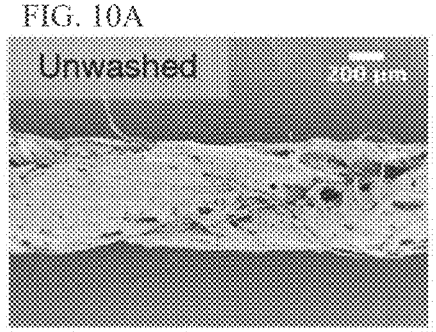
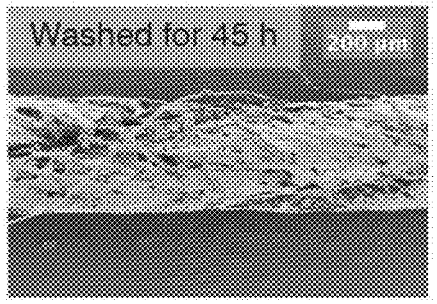
FIG. 10B
FIG. 10C
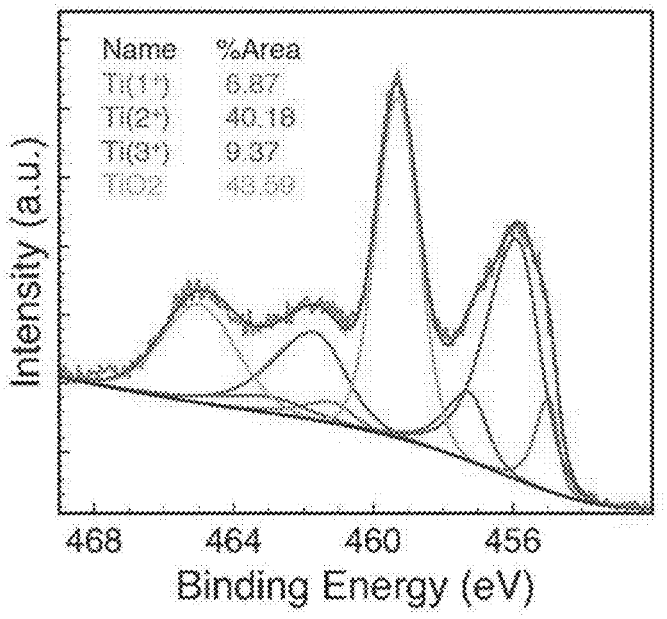

MXENE BASED SENSOR DEVICES

CROSS REFERENCE TO RELATED APPLICATIONS

The present application is a Continuation of U.S. patent application Ser. No. 18/588,226, "MXENE-BASED SENSOR DEVICES" (filed Feb. 27, 2024); which is a Continuation of U.S. patent application Ser. No. 17/292,031, "MXENE-BASED SENSOR DEVICES" (filed May 7, 2021); which is the National Stage Application of International Patent Application No. PCT/US2019/060549, "MXENE-BASED SENSOR DEVICES" (filed Nov. 8, 2019); which claims priority to and the benefit of U.S. patent application No. 62/757,321, "MXene Coated Yarns And Textiles For Functional Fabric Devices" (filed Nov. 8, 2018) and to U.S. patent application No. 62/767,092, "MXene Coated Yarns And Textiles For Functional Fabric Devices" (filed Nov. 14, 2018). All foregoing applications are incorporated herein by reference in their entireties for any and all purposes.

TECHNICAL FIELD

The present disclosure is directed to fabrics and clothing containing functional textile devices.

BACKGROUND

The recent surge of interest in textile-based electronics has directed research efforts towards designing multifunctional fibers and yarns. Electrically conducting yarns are quintessential for wearable applications because they can be engineered to perform specific functions in a wide array of technologies such as energy storage, sensing, actuation, and communication.

However, many challenges remain unaddressed regarding manufacturability of functional fibers and their integration in textiles. Current wearables utilize conventional batteries, which are bulky, uncomfortable, and can impose design limitations to the final product. Therefore, the development of flexible, electrochemically and electromechanically active yarns, which can be engineered and knitted into full fabrics provide new and practical insights for the scalable production of textile-based devices.

SUMMARY

In meeting the long-felt needs described above, the present disclosure provides a pressure sensor, comprising: a first electrode; a second electrode; and a dielectric material disposed so as to place the first electrode into electrical isolation from the second electrode, at least one of the first electrode and the second electrode comprising (a) a substrate fiber, the substrate fiber defining an outer surface coated with a first plurality of MXene particulates, (b) a yarn comprising a plurality of coating fibers, each coating fiber comprising a substrate fiber defining an outer surface coated with a first plurality of MXene particulates, (c) a yarn comprising a plurality of coating fibers, each coating fiber comprising a substrate fiber defining an outer surface coated with a first plurality of MXene particulates and the yarn defining an outer surface coated with a second plurality of MXene particulates, or (d) a yarn comprising a plurality of fibers, the yarn defining an outer surface coated with a second plurality of MXene particulates.

Also provided are methods, comprising operating a pressure sensor according to the present disclosure.

Further provided are strain sensors, comprising: a sensor region, the sensor region comprising (a) a substrate fiber, the substrate fiber defining an outer surface coated with a first plurality of MXene particulates, (b) a yarn comprising a plurality of coating fibers, each coating fiber comprising a substrate fiber defining an outer surface coated with a first plurality of MXene particulates, (c) a yarn comprising a plurality of coating fibers, each coating fiber comprising a substrate fiber defining an outer surface coated with a first plurality of MXene particulates and the yarn defining an outer surface coated with a second plurality of MXene particulates; and or (d) a yarn comprising a plurality of fibers, the yarn defining an outer surface coated with a second plurality of MXene particulates, and a current collector configured to monitor a signal of the sensor region related to a strain experienced by the panel.

BRIEF DESCRIPTION OF THE DRAWINGS

The present application is further understood when read in conjunction with the appended drawings. For the purpose of illustrating the subject matter, there are shown in the drawings exemplary embodiments of the subject matter; however, the presently disclosed subject matter is not limited to the specific methods, devices, and systems disclosed. In addition, the drawings are not necessarily drawn to scale.

FIG. 2A Digital photograph of ~100 mL of MXene dispersion (~20-25 mg/mL) in a petri dish with a schematic of the atomic structure of $Ti_3C_2$ MXene flake. FIG. 2B Zeta potential (graph) at pH 6.8 and transmission electron microscopy (TEM) image (inset) of probe sonicated (S—$Ti_3C_2$) MXene flakes. FIG. 2C Flake-size distribution of as-synthesized (L-$Ti_3C_2$) and S—$Ti_3C_2$ MXene dispersions. The size is represented as hydrodynamic diameter (d, nm) in nanometers. Insets: Scanning electron microscopy (SEM) images of S—$Ti_3C_2$ (Top) and L—$Ti_3C_2$ (Bottom) MXene flakes. Two-step coating process of highly conductive MXene-coated cotton yarns. First coating step (fiber coating) requires using S—$Ti_3C_2$ MXene flakes, which enables MXene penetration into the fiber level. Second coating step (yarn coating) uses L—$Ti_3C_2$ MXene flakes to cover the yarn surface to provide high conductivity. The schematic illustration of the cross-section of cotton yarn FIG. 2D pristine, FIG. 2E coated with S—$Ti_3C_2$ MXene flakes, FIG. 2F coated with S—$Ti_3C_2$ and L-$Ti_3C_2$ MXene flakes. Cross-section SEM images of FIG. 2G pristine cotton fibers, FIG. 2H cotton fibers coated with S—$Ti_3C_2$ MXene flakes, FIG. 2I cotton yarn after being coated with S—$Ti_3C_2$ and L—$Ti_3C_2$ MXene flakes. SEM images of the cotton yarn surface FIG. 2J pristine, FIG. 2K coated with S—$Ti_3C_2$ MXene flakes, and FIG. 2L coated with S—$Ti_3C_2$ and L—$Ti_3C_2$ MXene flakes.

FIGS. 3A-3F. Different stitch patterns commonly used in knitted fabrics. FIG. 3A Single jersey. FIG. 3B Half gauge. FIG. 3C Interlock. FIG. 3D attempt to knit MXene-coated cotton yarn (black) in single jersey pattern. FIG. 3E MXene-coated cotton yarn knitted with half gauge pattern resulted in a porous fabric. FIG. 3F MXene-coated cotton yarn knitted with interlock pattern resulted in a dense fabric.

FIG. 4A The change in the MXene loading and the linear resistance as a function of washing temperature ranging from 30° C. to 80° C. Ti2p XPS spectra of FIG. 4B unwashed MXene-coated cotton yarn and FIG. 4C washed MXene-coated cotton yarn after 3 min of sputtering. The yarns were washed for 20 washing cycles at 30° C. and 5 washing cycles at temperatures ranging from 40° C. to 80° C.

FIG. 5A Cyclic voltammetry (CV) curves (5 mV/s) at various operation potentials. FIG. 5B CV curves of MXene-coated yarns at various scan rates. FIG. 5C Galvanostatic charge-discharge (GCD) curves at various current densities. FIG. 5D Rate capability of length and linear density capacitance of MXene-coated cotton yarns. FIG. 5E Normalized Nyquist plot based on the length of the yarn, FIG. 5F Cyclic stability of the MXene-coated cotton yarn during 10,000 cycles at a current density of 30 mA/cm.

FIG. 6A Schematic representation of the capacitive pressure sensor (active area-16 mm×26 mm) assembled by using two knitted fabric electrodes and a dielectric layer. FIG. 6B Electromechanical behavior of the knitted sensor. The applied strain is incrementally increased from 2.8% to 19.7%. Each cyclic deformation is repeated 20 times. FIG. 6C Capacitance as a function of time at different compression strains ranging from 2.8% to 19.7%. The hold time is 10 seconds. FIG. 6D Relative capacitance changes of the sensor at various strains. Gauge factor (GF) is derived from the linear fit. FIG. 6E Cyclic stability of the sensor based on relative capacitance change at 14.1% strain for 2,000 cycles. FIG. 6F Top: Digital photo of the knitted pressure sensor button (active area—16 mm×5 mm). Bottom: Capacitance output of the sensor when a gentle, moderate, or hard pressure is applied to the device by a finger.

FIG. 7A X-ray diffraction (XRD) patterns of pristine cotton yarn, $Ti_3C_2$ MXene-coated cotton yarn, $Ti_3C_2$ MXene film (made with L—$Ti_3C_2$), and $Ti_3AlC_2$ MAX powder. Asterisk (*) indicates a second layer of intercalated water within the structure. The prefixes "M" and "C" in the composite spectra indicate MXene and cotton peaks, respectively. FIG. 7B TEM image of L—$Ti_3C_2$ MXene flake. AFM images and the line profile of the FIG. 7C S—$Ti_3C_2$ MXene flake and FIG. 7D L—$Ti_3C_2$ MXene flake.

FIG. 9A Resistance and conductivity change of the MXene-coated cotton, bamboo, and linen yarns as a function of length. FIG. 9B Typical tensile stress-strain curves of pristine and MXene-coated cellulose-based yarns. FIG. 9C SEM image of knotted MXene-coated cotton yarn with 78 wt. % active material loading.

FIGS. 10A-10C. SEM images of FIG. 10A unwashed and FIG. 10B washed MXene-coated cotton yarn surface. FIG. 10C XPS spectrum of the washed MXene-coated cotton yarn without sputtering. The washed samples went through 20 washing cycles at 30° C. and 5 washing cycles ranging from 40° C. to 80° C.

FIG. 12A CV curves at different scan rates, FIG. 12B GCD curves at different current densities, FIG. 12C Specific length and linear density capacitance of the device calculated from CV curves, FIG. 12D Electrochemical impedance spectroscopy of yarn supercapacitor device, FIG. 12E Capacitance retention and Coulombic efficiency versus cycle number at a current density of 5 mA/cm, FIG. 12F Capacitance retention of the device under different bending angles. Inset shows capacitance retention after bending from 0° to 90°.

DETAILED DESCRIPTION OF ILLUSTRATIVE EMBODIMENTS

Figure 1:
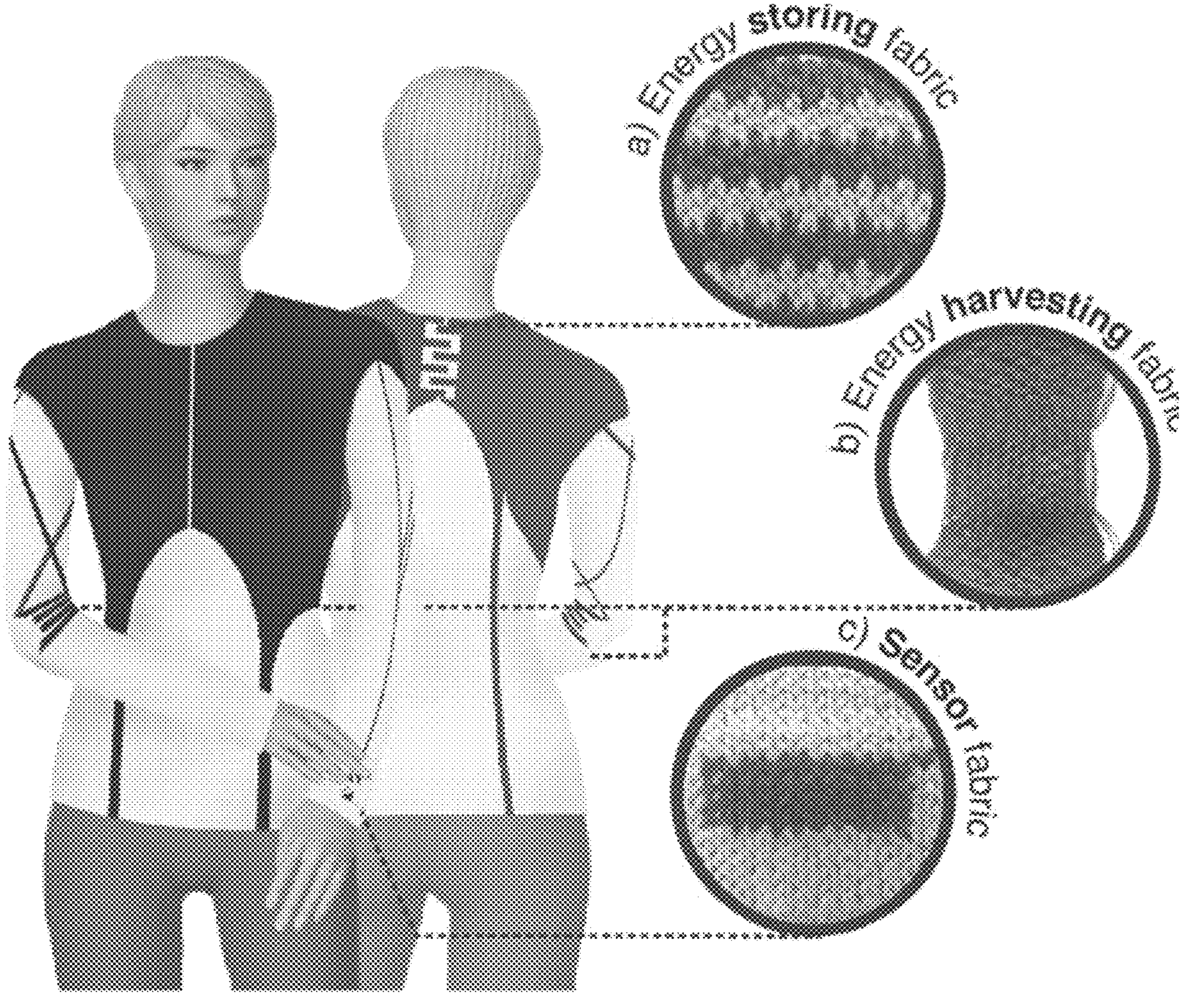
FIG. 1. Seamlessly knitted MXene-coated cellulose-based yarns. Concept illustration of a garment integrated with energy storage and harvesting device with a capacitive pressure sensor. Insets show actual device prototypes comprising of a) Knitted energy storing fabric with alternating MXene-coated cotton yarn (black) and a non-conductive commercial viscose yarn (green). b) Knitted energy harvesting fabric with alternating MXene-coated linen yarn (black) and a commercial Teflon yarn (brown) can be placed strategically to harvest energy from body movements. c) Capacitive pressure sensor device knitted with MXene-coated bamboo yarn, where the device can sense different applied pressures ranging from low to high.

The present disclosure may be understood more readily by reference to the following detailed description taken in connection with the accompanying figures and examples, which form a part of this disclosure. It is to be understood that this invention is not limited to the specific devices, methods, applications, conditions or parameters described and/or shown herein, and that the terminology used herein is for the purpose of describing particular embodiments by way of example only and is not intended to be limiting of the claimed invention.

Also, as used in the specification including the appended claims, the singular forms "a," "an," and "the" include the plural, and reference to a particular numerical value includes at least that particular value, unless the context clearly dictates otherwise. The term "plurality", as used herein, means more than one. When a range of values is expressed, another embodiment includes from the one particular value and/or to the other particular value. Similarly, when values are expressed as approximations, by use of the antecedent "about," it will be understood that the particular value forms another embodiment. All ranges are inclusive and combinable, and it should be understood that steps may be performed in any order.

It is to be appreciated that certain features of the invention which are, for clarity, described herein in the context of separate embodiments, may also be provided in combination in a single embodiment. Conversely, various features of the invention that are, for brevity, described in the context of a single embodiment, may also be provided separately or in any subcombination. All documents cited herein are incorporated herein in their entireties for any and all purposes.

Further, reference to values stated in ranges include each and every value within that range. In addition, the term "comprising" should be understood as having its standard, open-ended meaning, but also as encompassing "consisting"

as well. For example, a device that comprises Part A and Part B may include parts in addition to Part A and Part B, but may also be formed only from Part A and Part B.

The present invention relates to MXene coated conductive yarns and knitted fabrics (as well as woven and non-woven fabrics) and the use of such yarns to create functional textile devices seamlessly integrated into fabric products including but not limited to garments. The objective of the system described herein is to realize a low-cost, yarn coating system to create a variety of textile-based applications.

The invention includes the development of a facile and scalable dip-coating approach for producing highly conductive and durable MXene coated yarns. Concentration and flake size distribution of MXene dispersions are tailored to ensure penetration of MXene flakes at the fiber and/or yarn level. The coating process can be easily tailored to match specific conductivity and/or electrochemistry requirements for the desired final application.

Fibers are the fundamental units of yarns, and the yarns are the building blocks of the textiles. The commercial yarns used for dipping process include but not limited to natural, synthetic fibers, and their blends, such as cotton, bamboo, linen, modal, regenerated cellulose, nylon, polyester, viscose, and more.

The MXene-coated yarns can be utilized for various types of smart textile applications where conductivity is required. These include but are not limited to sensors (e.g. pressure, strain, moisture, and temperature), supercapacitors, triboelectric generators, antennas, and electromagnetic interference (EMI) shielding textiles. The coating process can be easily tailored based on the specific requirements of the target application.

An exemplary yarn MXene dip coating process is as follows.

Coating with small flakes: MXene dispersion with small flakes (~250-400 nm) is used to dip-coat individual fibers. This type of coating retains the original property of the yarn and gives sufficient conductivity for variety of applications such as pressure and strain sensor. In case of a pressure sensor, when pressure is applied to the yarn, the small MXene flakes between individual fibers result in higher sensitivity to the changes in applied pressure due to higher possible number of contact points between the flakes.

Coating with large flakes: MXene dispersion with large flakes (e.g. 9.4%-6789 nm, 85%-940 nm, 5.6%-200.1 nm) is used to dip-coat yarn surface. When only MXene dispersions with large flakes are used to coat the yarns, the yarn surface would be completely covered with the MXene flakes and the pathway to the individual fibers would be blocked. This coating approach is useful when the conductivity is the priority for the application. This uniform, continuous and thin MXene coating on the yarn surface is ideal for electromagnetic interference (EMI) shielding applications. On the other hand, in case of electrochemistry applications, the ion diffusion is poor.

Coating with small and large flakes: combines the two methods described above to maximize the MXene loading both on the fiber and the yarn level. For instance, maximum amount of MXene coating is desirable for supercapacitors since the specific capacitance is directly proportional to the active material loading.

Electrochemical performance of MXene coated cotton yarns were evaluated using a standard three-electrode set-up with 1 M $H_2SO_4$ electrolyte. After evaluating the performance of MXene coated cotton yarns, yarn supercapacitors (YSC) are fabricated by using symmetric device configuration where both of the electrodes have the same amount of MXene loading. To the best of the inventors' knowledge, the cotton yarn with 2.2 mg/cm of MXene loading exhibits the highest specific capacitance among the cellulose-based yarn-shape supercapacitors reported to date. These capacitance values achieved from MXene-cotton yarns are higher or at the upper bound of the highest reported values among best performance yarn supercapacitors in the literature.

The yarns have shown the ability to withstand prolonged exposure to aqueous environments, a critical requirement for use in textile devices. MXene coated cotton yarns can withstand high washing temperatures (from 30° C. to 80° C.) for 45 washing cycles. Additionally, textiles from MXene-coated yarns have been produced on industrial machine.

Textile Devices Made of MXene Coated Yarns

As a proof of concept, MXene coated bamboo yarns are knitted into a pressure sensor device using an industrial knitting machine. The sensor exhibits a constant (linear) gauge factor value of ~6 at applied strains of up to ~20% and demonstrates a high stability and linearity during the cyclic test (2000 cycles). The inventors manufactured this technology by using conductive MXene yarns and non-conductive commercial yarns through conventional knitting machines without the need of sewing or gluing conductive parts.

In addition to the pressure sensor, we demonstrated the feasibility of a textile interdigitated supercapacitor and triboelectric generator, and electromagnetic interference (EMI) shielding fabric devices with MXene coated yarns.

Advantages and Impact

Nanomaterials have been incorporated into yarns via a variety of methods, including dip-coating, drop-casting, and biscrolling, and processed into fibers via wet-spinning and electrospinning. The dip-coating process is the most facile, simple, scalable, and environmentally friendly (no organic solvent required) method among others.

Conductive yarns are widely used in smart textile applications to provide properties like sensing, capacitance and more. Demonstrating the processability of these conductive yarns is crucial because high electrical conductivity, electrochemical, and electromechanical performance do not necessarily mean that the yarns can undergo industrial knitting or weaving processes. In order to produce true textile devices, the conductive yarns need to be knittable or weavable on industrial equipment. In this invention, we demonstrate that textile using MXene coated yarns can be produced on industrial equipment. MXene composite yarns produced with other methods (electrospinning, biscrolling, etc.) are not currently strong enough to be knitted or woven on industrial machines.

The MXene coated yarns demonstrate excellent washability over 45 washing cycles at temperatures ranging from 30° C. to 80° C.

A textile pressure sensor device as knitted with MXene coated yarns. This is the first wearable device produced with MXene yarns that does not require any post-processing to demonstrate its feasibility.

MXenes

MXene compositions may comprise any of the compositions described elsewhere herein. Exemplary MXene compositions include those comprising:

(a) at least one layer having first and second surfaces, each layer described by a formula $M_{n+1}X_nT_x$ and comprising:

substantially two-dimensional array of crystal cells, each crystal cell having an empirical formula of $M_{n+1}X_n$, such that each X is positioned within an octahedral array of M, wherein M is at least one Group IIIB, IVB, VB, or VIB metal or Mn, wherein each X is C, N, or a combination thereof;

n=1, 2, or 3; and wherein $T_x$ represents surface termination groups; or (b) at least one layer having first and second surfaces, each layer comprising:

a substantially two-dimensional array of crystal cells, each crystal cell having an empirical formula of $M'_2M''_nX_{n+1}T_x$, such that each X is positioned within an octahedral array of M' and M", and where M"n are present as individual two-dimensional array of atoms intercalated between a pair of two-dimensional arrays of M' atoms, wherein M' and M" are different Group IIIB, IVB, VB, or VIB metals, wherein each X is C, N, or a combination thereof;

n=1 or 2; and wherein $T_x$ represents surface termination groups. In certain of these exemplary embodiments, the at least one of said surfaces of each layer has surface termination groups ($T_x$) comprising alkoxide, carboxylate, halide, hydroxide, hydride, oxide, sub-oxide, nitride, sub-nitride, sulfide, thiol, or a combination thereof. In certain preferred embodiments, the MXene composition has an empirical formula of $Ti_3C_2$.

While the instant disclosure describes the use of $Ti_3C_2$, because of the convenient ability to prepare larger scale quantities of these materials, it is believed and expected that all other MXenes will perform similarly, and so all such MXene compositions are considered within the scope of this disclosure. In certain embodiments, the MXene composition is any of the compositions described in at least one of U.S. patent application Ser. No. 14/094,966 (filed Dec. 3, 2013), 62/055,155 (filed Sep. 25, 2014), 62/214,380 (filed Sep. 4, 2015), 62/149,890 (filed Apr. 20, 2015), 62/127,907 (filed Mar. 4, 2015) or International Applications PCT/US2012/043273 (filed Jun. 20, 2012), PCT/US2013/072733 (filed Dec. 3, 2013), PCT/US2015/051588 (filed Sep. 23, 2015), PCT/US2016/020216 (filed Mar. 1, 2016), or PCT/US2016/028,354 (filed Apr. 20, 2016), preferably where the MXene composition comprises titanium and carbon (e.g., $Ti_3C_2$, $Ti_2C$, $Mo_2TiC_2$, etc.). Each of these compositions is considered independent embodiment. Similarly, MXene carbides, nitrides, and carbonitrides are also considered independent embodiments. Various MXene compositions are described elsewhere herein, and these and other compositions, including coatings, stacks, laminates, molded forms, and other structures, described in the above-mentioned references are all considered within the scope of the present disclosure.

Where the MXene material is present as a coating on a conductive or non-conductive substrate, that MXene coating may cover some or all of the underlying substrate material. Such substrates may be virtually any conducting or non-conducting material, though preferably the MXene coating is superposed on a non-conductive surface. Such non-conductive surfaces or bodies may comprise virtually any non-electrically conducting organic or inorganic polymers. In independent embodiments, the substrate may be a non-porous, porous, microporous, or aerogel form of an organic polymer, for example, a fluorinated or perfluorinated polymer (e.g., PVDF, PTFE) or an alginate polymer, a silicate glass.

The coating may be patterned or unpatterned on the substrate. In independent embodiments, the coatings may be applied or result from the application by spin coating, dip coating, roller coating, compression molding, doctor blading, ink printing, painting or other such methods. Multiple coatings of the same or different MXene compositions may be employed.

The methods described in PCT/US2015/051588 (filed Sep. 23, 2015), incorporated by reference herein at least for such teachings, are suitable for such applications.

In independent embodiments, the MXene coating can be present and is operable, in virtually any thickness, from the nanometer scale to hundreds of microns. Within this range, in some embodiments, the MXene may be present at a thickness ranging from 1-2 nm to 1000 microns, or in a range defined by one or more of the ranges of from 1-2 nm to 25 nm, from 25 nm to 50 nm, from 50 nm to 100 nm, from 100 nm to 150 nm, from 150 nm to 200 nm, from 200 nm to 250 nm, from 250 nm to 500 nm, from 500 nm to 1000 nm, from 1000 nm to 1500 nm, from 1500 nm to 2500 nm, from 2500 nm to 5000 nm, from 5 μm to 100 μm, from 100 μm to 500 μm, or from 500 μm to 1000 μm.

Typically, in such coatings, the MXene is present as an overlapping array of two or more overlapping layers of MXene platelets oriented to be essentially coplanar with the substrate surface. In specific embodiments, the MXene platelets have at least one mean lateral dimension in a range of from about 0.1 micron to about 50 microns, or in a range defined by one or more of the ranges of from 0.1 microns to 2 microns, from 2 microns to 4 microns, from 4 microns to 6 microns, from 6 microns to 8 microns, from 8 microns to 10 microns, from 10 microns to 20 microns, from 20 microns to 30 microns, from 30 microns to 40 microns, or from 40 microns to 50 microns.

Terms

In the present disclosure the singular forms "a," "an," and "the" include the plural reference, and reference to a particular numerical value includes at least that particular value, unless the context clearly indicates otherwise. Thus, for example, a reference to "a material" is a reference to at least one of such materials and equivalents thereof known to those skilled in the art, and so forth.

When a value is expressed as an approximation by use of the descriptor "about," it will be understood that the particular value forms another embodiment. In general, use of the term "about" indicates approximations that can vary depending on the desired properties sought by the disclosed subject matter and is to be interpreted in the specific context in which it is used, based on its function. The person skilled in the art will be able to interpret this as a matter of routine. In some cases, the number of significant figures used for a particular value may be one non-limiting method of determining the extent of the word "about." In other cases, the gradations used in a series of values may be used to determine the intended range available to the term "about" for each value. Where present, all ranges are inclusive and combinable. That is, references to values stated in ranges include every value within that range.

It is to be appreciated that certain features of the disclosure which are, for clarity, described herein in the context of separate embodiments, may also be provided in combination in a single embodiment. That is, unless obviously incompatible or specifically excluded, each individual embodiment is deemed to be combinable with any other embodiment(s) and such a combination is considered to be another embodiment. Conversely, various features of the disclosure that are, for brevity, described in the context of a single embodiment, may also be provided separately or in any sub-combination. Finally, while an embodiment may be described as part of a series of steps or part of a more general structure, each said step may also be considered an independent embodiment in itself, combinable with others.

When a list is presented, unless stated otherwise, it is to be understood that each individual element of that list, and every combination of that list, is a separate embodiment. For example, a list of embodiments presented as "A, B, or C" is to be interpreted as including the embodiments, "A," "B," "C," "A or B," "A or C," "B or C," or "A, B, or C."

The transitional terms "comprising," "consisting essentially of," and "consisting" are intended to connote their generally in accepted meanings in the patent vernacular; that is, (i) "comprising," which is synonymous with "including," "containing," or "characterized by," is inclusive or open-ended and does not exclude additional, unrecited elements or method steps; (ii) "consisting of" excludes any element, step, or ingredient not specified in the claim; and (iii) "consisting essentially of" limits the scope of a claim to the specified materials or steps "and those that do not materially affect the basic and novel characteristic(s)" of the claimed disclosure. Embodiments described in terms of the phrase "comprising" (or its equivalents), also provide, as embodiments, those which are independently described in terms of "consisting of" and "consisting essentially of." Where the term "consisting essentially of" is used, the basic and novel characteristic(s) of the method is intended to be the ability to provide ordered perovskite, perovskite-type, and perovskite-like films using MXene materials, which exhibit the crystallinity and properties described herein.

Throughout this specification, words are to be afforded their normal meaning, as would be understood by those skilled in the relevant art. However, so as to avoid misunderstanding, the meanings of certain terms will be specifically defined or clarified.

While MXene compositions include any and all of the compositions described in the patent applications and issued patents described above, in some embodiments, MXenes are materials comprising or consisting essentially of a $M_{n+1}X_n(T_x)$ composition having at least one layer, each layer having a first and second surface, each layer comprising

- a substantially two-dimensional array of crystal cells.
- each crystal cell having an empirical formula of $M_{n+1}X_n$, such that each X is positioned within an octahedral array of M,
- wherein M is at least one Group 3, 4, 5, 6, or 7, or Mn,
- wherein each X is carbon and nitrogen or combination of both and
- n=1, 2, or 3;
- wherein at least one of said surfaces of the layers has surface terminations, $T_s$, independently comprising alkoxide, alkyl, carboxylate, halide, hydroxide, hydride, oxide, sub-oxide, nitride, sub-nitride, sulfide, sulfonate, thiol, or a combination thereof;

As described elsewhere within this disclosure, the $M_{n+1}X_n(T_x)$ materials produced in these methods and compositions have at least one layer, and sometimes a plurality of layers, each layer having a first and second surface, each layer comprising a substantially two-dimensional array of crystal cells; each crystal cell having an empirical formula of $M_{n+1}X_n$, such that each X is positioned within an octahedral array of M, wherein M is at least one Group 3, 4, 5, 6, or 7 metal (corresponding to Group IIIB, IVB, VB, VIB or VIIB metal or Mn), wherein each X is C and/or N and n=1, 2, or 3; wherein at least one of said surfaces of the layers has surface terminations, $T_s$, comprising alkoxide, alkyl, carboxylate, halide, hydroxide, hydride, oxide, sub-oxide, nitride, sub-nitride, sulfide, sulfonate, thiol, or a combination thereof.

Supplementing the descriptions above, $M_{n+1}X_n(T_x)$, compositions may be viewed as comprising free standing and stacked assemblies of two dimensional crystalline solids. Collectively, such compositions are referred to herein as "$M_{n+1}X_n(T_x)$," "MXene," "MXene compositions," or "MXene materials." Additionally, these terms "$M_{n+1}X_n(T_x)$," "MXene," "MXene compositions," or "MXene materials" also refer to those compositions derived by the chemical exfoliation of MAX phase materials, whether these compositions are present as free-standing 2-dimensional or stacked assemblies (as described further below). Reference to the carbide equivalent to these terms reflects the fact that X is carbon, C, in the lattice. Such compositions comprise at least one layer having first and second surfaces, each layer comprising: a substantially two-dimensional array of crystal cells; each crystal cell having an empirical formula of $M_{n+1}X_n$, where M, X, and n are defined above. These compositions may be comprised of individual or a plurality of such layers. In some embodiments, the $M_{n+1}X_n(T_x)$ MXenes comprising stacked assemblies may be capable of, or have atoms, ions, or molecules, that are intercalated between at least some of the layers. In other embodiments, these atoms or ions are lithium. In still other embodiments, these structures are part of an energy-storing device, such as a battery or supercapacitor. In still other embodiments these structures are added to polymers to make polymer composites.

The term "crystalline compositions comprising at least one layer having first and second surfaces, each layer comprising a substantially two-dimensional array of crystal cells" refers to the unique character of these MXene materials. For purposes of visualization, the two-dimensional array of crystal cells may be viewed as an array of cells extending in an x-y plane, with the z-axis defining the thickness of the composition, without any restrictions as to the absolute orientation of that plane or axes. It is preferred that the at least one layer having first and second surfaces contain but a single two-dimensional array of crystal cells (that is, the z-dimension is defined by the dimension of approximately one crystal cell), such that the planar surfaces of said cell array defines the surface of the layer; it should be appreciated that real compositions may contain portions having more than single crystal cell thicknesses.

That is, as used herein, "a substantially two-dimensional array of crystal cells" refers to an array which preferably includes a lateral (in x-y dimension) array of crystals having a thickness of a single cell, such that the top and bottom surfaces of the array are available for chemical modification.

Metals of Group 3, 4, 5, 6, or 7 (corresponding to Group IIIB, IVB, VB, VIB, or VIIB), either alone or in combination, said members including Ti, Zr, Hf, V, Nb, Ta, Cr, Mo, and W. For the purposes of this disclosure, the terms "M" or "M atoms," "M elements," or "M metals" may also include Mn. Also, for purposes of this disclosure, compositions where M comprises Ti, Zr, Hf, V, Nb, Ta, Cr, Mo, W, or mixtures thereof constitute independent embodiments. Similarly, the oxides of M may comprise any one or more of these materials as separate embodiments. For example, M may comprise any one or combination of Hf, Cr, Mn, Mo, Nb, Sc, Ta, Ti, V, W, or Zr. In other preferred embodiments, the transition metal is one or more of Ti, Zr, V, Cr, Mo, Nb, Ta, or a combination thereof. In even more preferred embodiments, the transition metal is Ti, Ta, Mo, Nb, V, Cr, or a combination thereof. Specific MXene metals may be used to provide dopant effects in the perovskite, perovskite-type, or perovskite-like lattices, or may be chosen to be chemically identical to one or more of the perovskite, perovskite-type, or perovskite-like lattices.

In certain specific embodiments, $M_{n+1}X_n$ comprises $M_{n+1}C_n$ (i.e., where X=C, carbon) which may be $Ti_2C$, $V_2C$, $V_2N$, $Cr_2C$, $Zr_2C$, $Nb_2C$, $Hf_2C$, $Ta_2C$, $Mo_2C$, $Ti_3C_2$, $V_3C_2$, $Ta_3C_2$, $MO_3C_2$, $(Cr_{2/3}Ti_{1/2})_3C_2$, $Ti_4C_3$, $V_4C_3$, $Ta_4C_3$, $Nb_4C_3$, or a combination thereof.

In more specific embodiments, the $M_{n+1}X_n(T_x)$ crystal cells have an empirical formula $Ti_3C_2$ or $Ti_2C$. In certain of these embodiments, at least one of said surfaces of each layer of these two dimensional crystal cells is coated with surface terminations, $T_s$, comprising alkoxide, fluoride, hydroxide, oxide, sub-oxide, sulfonate, or a combination thereof.

The range of compositions available can be seen as extending even further when one considers that each M-atom position within the overall $M_{n+1}X_n$ matrix can be represented by more than one element. That is, one or more type of M-atom can occupy each M-position within the respective matrices. In certain exemplary non-limiting examples, these can be $(M^A_xM^B_y)_2C$, $(M^A_xM^B_y)_3C_2$, or $(M^A_xM^B_y)_4C_3$, where $M^A$ and $M^B$ are independently members of the same group, and x+y=1. For example, in but one non-limiting example, such a composition can be $(V_{1/2}Cr_{1/2})_3C_2$.

As those skilled in the art will appreciate, numerous modifications and variations of the present disclosure are possible in light of these teachings, and all such are contemplated hereby.

The disclosures of each patent, patent application, and publication cited or described in this document are hereby incorporated herein by reference, each in its entirety, for all purposes, or at least for the purpose described in the context in which the reference was presented.

Additional Disclosure

There are various approaches in the literature to produce conductive and electrochemically active fibers and yarns. One common technique is the deposition of active material(s) onto a fiber/yarn substrate. This method is easily scalable and offers facile approach for incorporating various active materials into yarns. However, loading more than 30 wt. % of active material onto a fiber has remained a challenge for this method, resulting in fibers with low electrical conductivity and moderate electrochemical properties.

These results indicate the need for a more efficient coating approach that maximizes the active material loading while preventing their delamination from the yarn substrate during wear and washing. Wet-spinning has also been widely used to integrate active materials such as conductive polymers, graphene, and carbon nanotubes (CNTs) into fibers for energy storage and sensing applications. A biscrolling technique has also been developed that produces functional yarns by trapping active materials inside CNT sheets. These techniques achieved high loadings (up to ~97 wt. %) of active materials into fibers or yarns. However, functional fibers or yarns produced using these methods seldom offer the mechanical properties required by textile processing and can be challenging to scale-up. In the context of wearables, manufacturability of the yarns is crucial because high electrical conductivity and electrochemical performance do not necessarily correspond to the feasibility of industrial-scale knitting or weaving processes. When considering the use of functional yarns in truly wearable applications, washability also becomes important. The ability to withstand prolonged exposure to aqueous environments is necessary for practical applications because textiles undergo various washing cycles after use.

The above limitations have led the inventors to develop fabrication of knittable, washable, and highly conductive yarn electrodes using MXenes. MXenes are a large family of two-dimensional (2D) transition metal carbides and nitrides which have a general formula of $M_{n+1}X_nT_x$, where M is a transition metal, X is carbon and/or nitrogen with n=1, 2, or 3, and $T_x$ denotes the surface termination (—OH, —O, and —F). MXenes have attracted significant attention due to their high electrical conductivity (up to 10,000 S/cm as a thin film) and excellent volumetric capacitance (up to 1,500 $F/cm^3$). Their hydrophilic surface, due to the presence of abundant functional groups, makes them suitable for solution processing by spray-coating, vacuum-assisted filtration, printing and painting from aqueous solutions.

$Ti_3C_2T_x$ MXene (referred to as $Ti_3C_2$ for simplicity) has demonstrated exceptional cation intercalation and pseudocapacitive behavior, which is ideal for energy storage applications. $Ti_3C_2$ MXene is also biocompatible and does not present a risk in case of contact with skin. Environmental degradation or incineration of $Ti_3C_2$ produces titanium dioxide ($TiO_2$) and carbon dioxide ($CO_2$), which do not present threats to the environment.

By using $Ti_3C_2$ as an active material, we employed a simple two-step dipping and drying procedure and converted conventional cellulose-based yarns such as cotton, bamboo, and linen into yarn electrodes. These MXene-coated yarns demonstrate three orders of magnitude increase in electrical conductivity and one order of magnitude increase in electrochemical performance when compared to carbon materials. By optimizing the coating process and carefully choosing appropriate MXene sheet size at each step of the coating process, we achieve yarns with a high loading of 78 wt. % MXene. We demonstrate that these yarns can be washed at temperatures ranging from 30° C. to 80° C. for 45 washing cycles and with minimal decrease in conductivity. We further show that for the first time, these yarns can be knitted into various stitch patterns using an industrial scale knitting machine, which were only achieved by simulation in previous reports (FIG. 1). The electrochemical performance of MXene-coated cotton yarns show that they have the potential to power wearable electronics as yarn supercapacitor devices. We also demonstrated that the knitted MXene-coated yarns can be used to make a flexible and wearable capacitive pressure sensor. While the scope of this work focuses on MXene-coated cellulose-based yarns and demonstration of energy storage and pressure sensing applications, these yarns offer electrical and electrochemical properties that can meet the requirements of other applications such as in energy harvesting, other types of sensors (e.g., strain, moisture, and temperature), antennas, heaters, and electromagnetic interference (EMI) shielding. Such functional yarns offer a platform technology, which utilizes these conformal yarns to enable development of various types of textile-based devices.

Results

Production of Conductive MXene-Coated Cellulose-Based Yarns

Figure 2A:
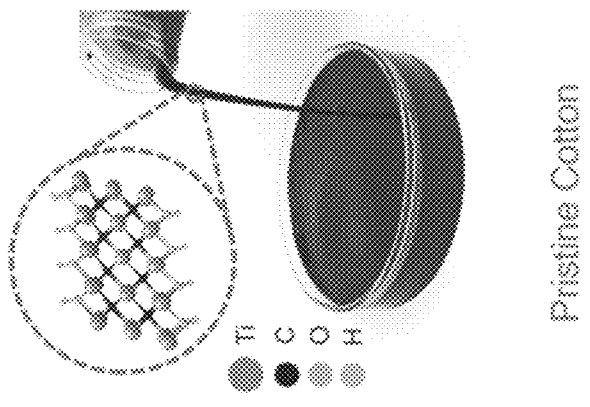
FIGS. 2A-2L. Characterization of $Ti_3C_2$ MXene dispersions.
Figure 7A:
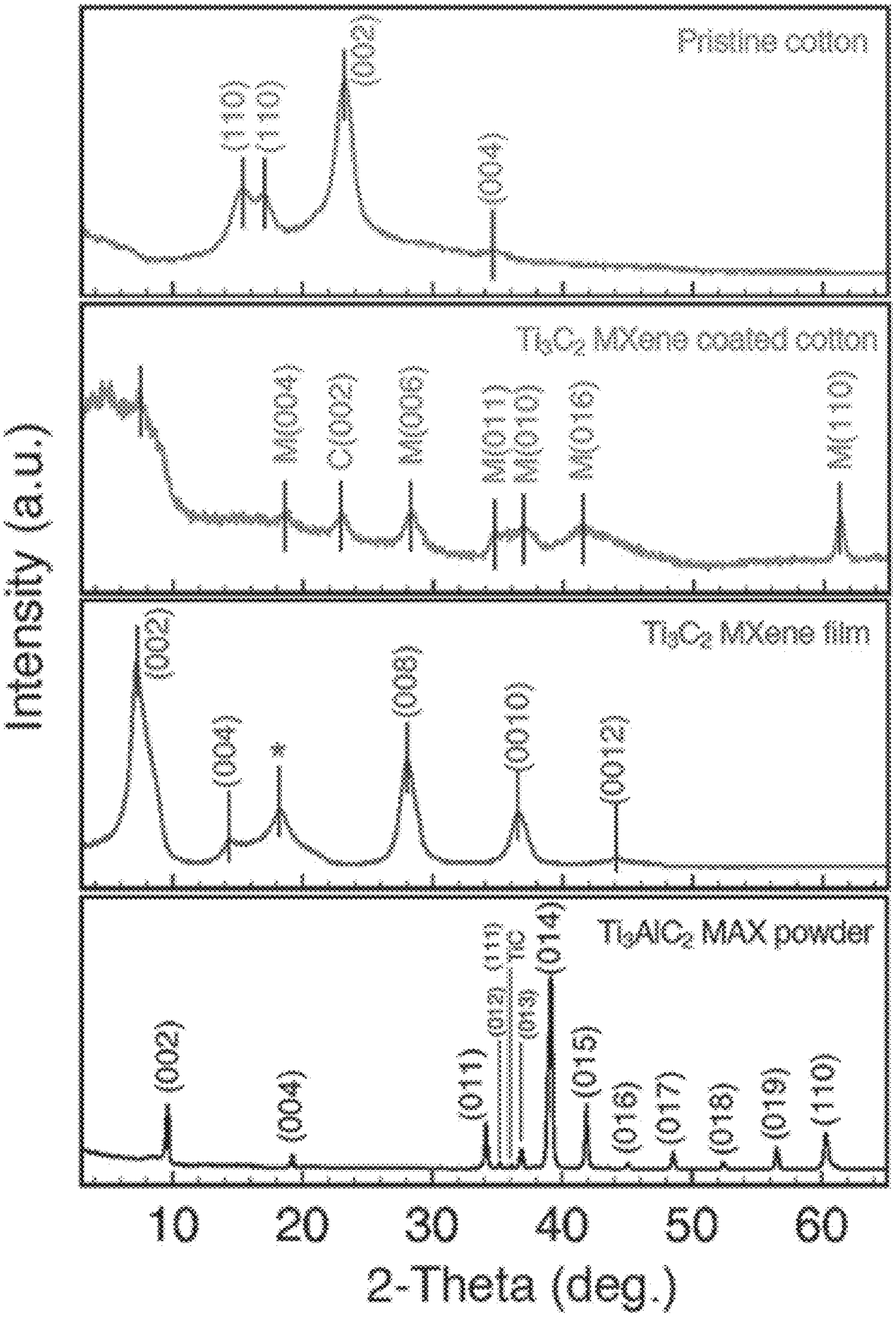
FIGS. 7A-7D.
Figure 7B:
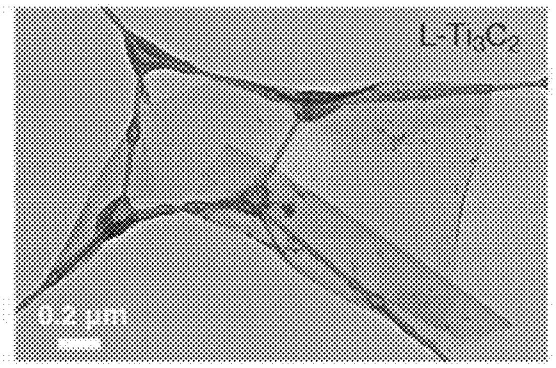
Figure 7C:
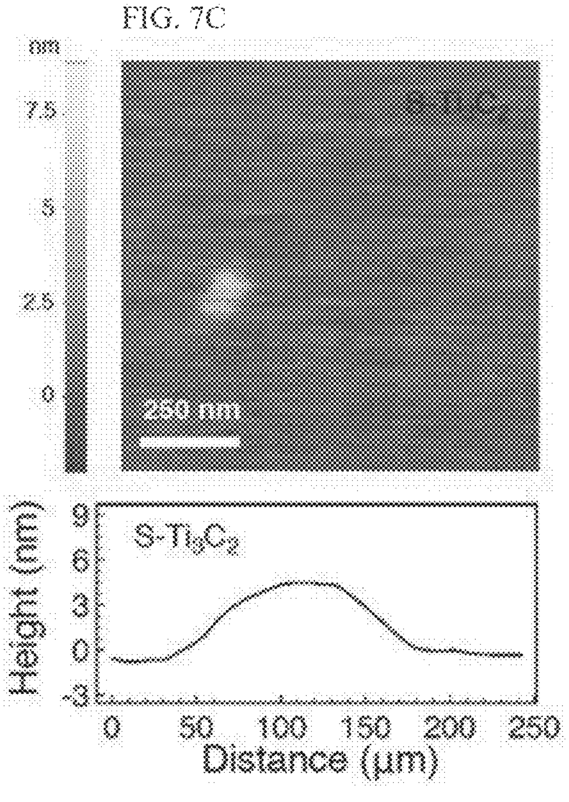
Figure 7D:
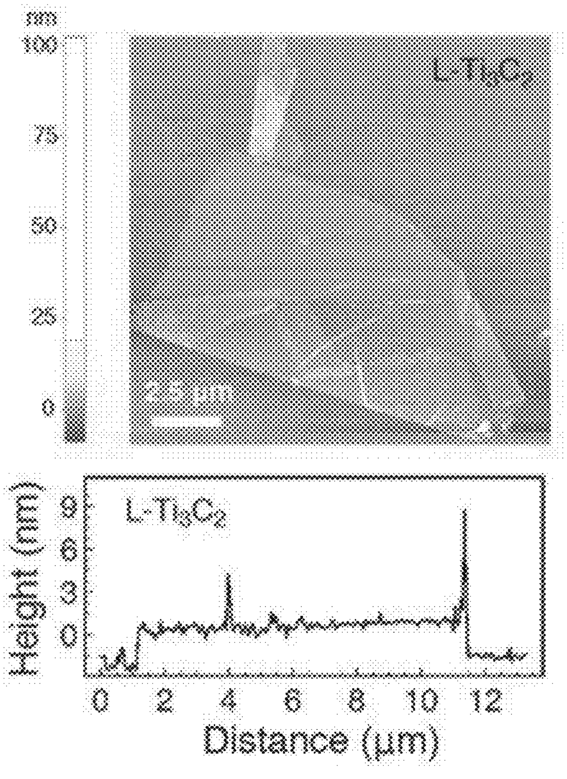

The initial step in producing the MXene-coated yarns begins with solution processing of MXene into homogenous dispersions (FIG. 2A). X-ray diffraction (XRD) results indicated the successful etching of Al layers and exfoliation of MXene by the expansion and disorder of the interlayer spacing according to the (002) peak (FIG. 7A). The disappearance of the (014) peak in the resulting $Ti_3C_2$ films indicated there is no residual MAX phase. Transmission electron microscopy (TEM) studies confirmed the synthesis of delaminated MXene nanosheets (small MXene flakes, $S—Ti_3C_2$, Inset of FIG. 2B and the large MXene flakes, $L—Ti_3C_2$, FIG. 7B). FIGS. 7C and 7D show an atomic force microscopy (AFM) images of $S—Ti_3C_2$ and $L—Ti_3C_2$ MXene flakes, respectively. The concentration of the MXene dispersions used during dipping was between 25-30 mg/mL.

Figure 2B:
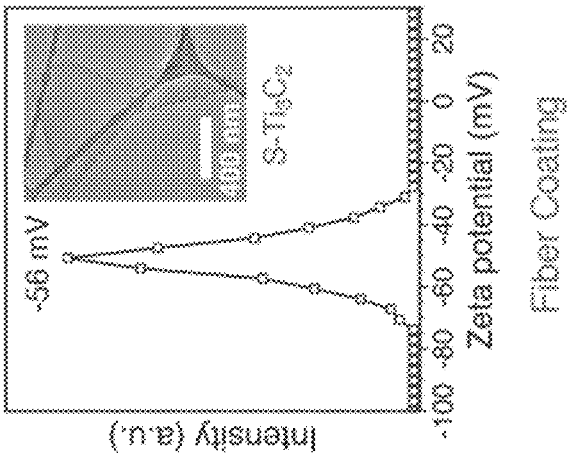
Figure 2C:
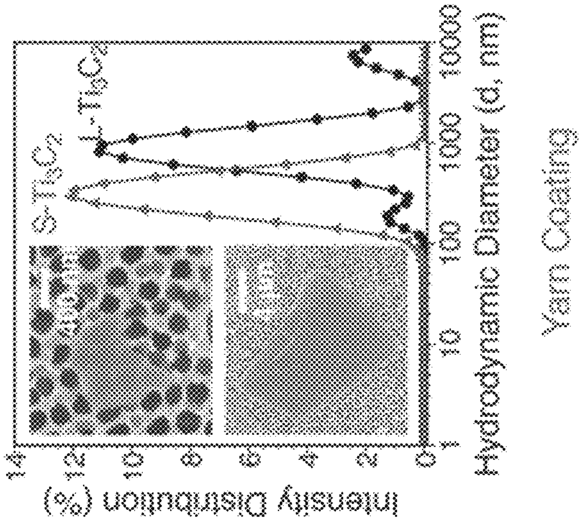

MXene flakes are negatively charged and hydrophilic due to their surface functional groups (e.g., —O, —OH, and —F). As shown in FIG. 2B, the zeta potential of the $Ti_3C_2$ MXene flakes was measured as −56 mV at pH 6.8. When hydrophilic cotton yarns were dipped into negatively charged MXene dispersions, MXene flakes attached to the surface of cotton fibers. As a result, strong electrostatic interactions were established between MXene flakes and cotton fibers. The XRD pattern for $Ti_3C_2$-coated cotton yarn shows signatures of both $Ti_3C_2$ MXene and cotton peaks (FIG. 7A). In order to increase the overall active material loading during the dip-coating process, MXene dispersions with two different flake size distributions were used in this study: as-synthesized ($L—Ti_3C_2$ MXene) and probe sonicated ($S—Ti_3C_2$ MXene). According to the dynamic light scattering (DLS) results (FIG. 2C), $L—Ti_3C_2$ MXene dispersions were primarily composed of large flakes with an average particle size of 1 μm, whereas the $S—Ti_3C_2$ MXene dispersions were composed of nanoscale-sized flakes with an average particle size of 340 nm. Scanning electron microscopy (SEM) images of $S—Ti_3C_2$ and $L—Ti_3C_2$ MXene flakes (Inset of FIG. 2C) are in agreement with the DLS data. It has been shown that $L—Ti_3C_2$ MXene flakes result in higher electrical conductivity compared to $S—Ti_3C_2$ MXene flakes, which is most likely due to less interfacial resistance between $L—Ti_3C_2$ MXene flakes. Films made by filtering $L—Ti_3C_2$ MXene flakes showed higher electrical conductivity of ~9490 S/cm, whereas the films produced by filtering $S—Ti_3C_2$ MXene flakes resulted in electrical conductivity of ~4080 S/cm.

Figure 2D:
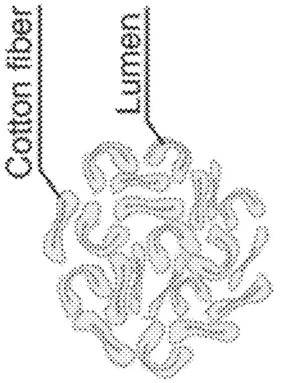
Figure 2E:
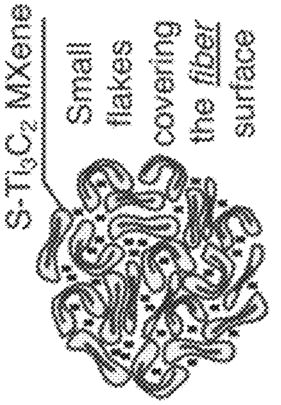

Three different approaches for producing conductive yarns with MXene dispersions were studied: (1) coating with $S—Ti_3C_2$ MXene, (2) $L—Ti_3C_2$ MXene, and (3) combination of small and large flakes. The pristine cotton yarn consists of twisted cotton fibers, which have a kidney-shaped cross-section with a hollow core (lumen) as illustrated in FIG. 2D. Unlike most synthetic yarns, cotton fibers have a rough surface (FIG. 2G), which is ideal for nanoparticle adhesion. The first coating process consisted of using only $S—Ti_3C_2$ MXene dispersions to allow for small MXene flakes to infiltrate between individual fibers (FIG. 2E, 2H. Using this coating method, the cotton yarn retained its flexibility. The conductivity of $S—Ti_3C_2$-coated cellulose-based yarns with MXene loadings of 0.6 mg/cm was between 30 and 50 S/cm, which is sufficient for a variety of applications such as pressure and strain sensing. The second coating method utilized $L-Ti_3C_2$ MXene dispersions to achieve MXene coating only on the surface of the yarn. When only MXene dispersions with large flakes were used to coat the yarns, the formation of MXene coating on the yarn surface prevented the further infiltration of MXene flakes into the internal yarn structure, thereby leaving the individual fibers closer to the center uncoated. The conductivity of $L—Ti_3C_2$-coated cellulose-based yarns ranges from 60 to 85 S/cm (MXene loading of 0.6 mg/cm), which is higher than the conductivity of the yarns coated only with $S—Ti_3C_2$ MXene flakes. Even though higher conductivity is achieved with $L—Ti_3C_2$-coated cellulose-based yarns, the yarns become less flexible. Notably, as the $L-Ti_3C_2$ MXene loading increased up to 0.6 mg/cm, MXene coating easily delaminated from the yarn surface upon forming the loops during knitting. Thus, the yarns coated with only $L—Ti_3C_2$ MXene flakes were not integrated into functional devices.

In order to balance the flexibility and the conductivity of the MXene coated yarns, we first infiltrated the internal yarn structure with $S—Ti_3C_2$ MXene in order to coat the individual fibers before finally coating the external yarn with $L—Ti_3C_2$ MXene. This approach, the two-step coating process, maximizes the MXene loading by coating both on the fiber and the yarn level.

Figure 2F:
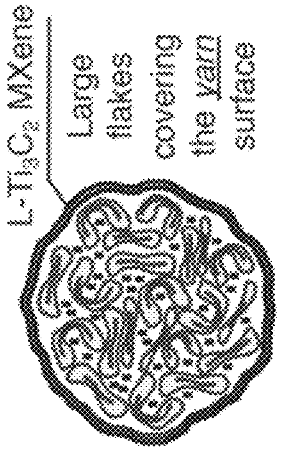
Figure 2G:
Figure 2H:
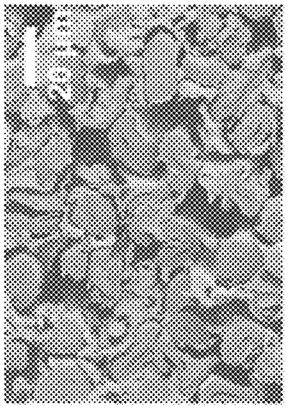
Figure 2I:
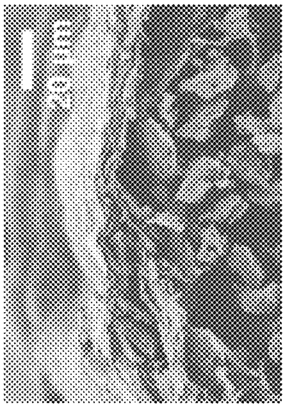
Figure 2J:
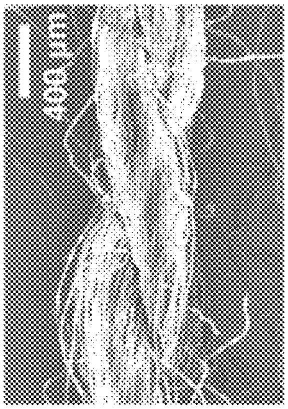
Figure 2K:
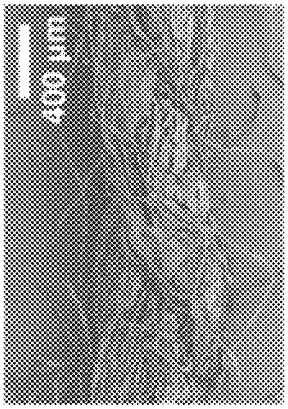
Figure 2L:
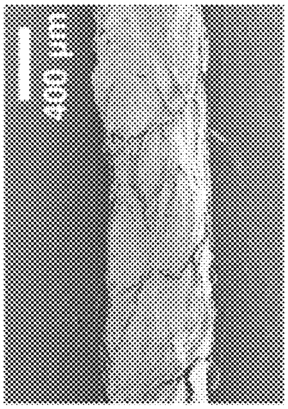

In order to maximize MXene loading on the yarn, the fibers were first saturated with $S—Ti_3C_2$ MXene flakes before coating with $L—Ti_3C_2$ MXenes to cover the yarn surface (FIGS. 2F, 2I). This coating approach could be ideal for yarn and textile supercapacitor applications since the capacitance has been reported to be MXene loading dependent.[10] The cotton yarn surface after coating with only $S—Ti_3C_2$ (FIG. 2Kk) remained similar to the pristine cotton (FIG. 2J) in terms of flexibility because majority of the small flakes infiltrated into the fiber. On the other hand, the twist became no longer visible after coating with both $S—Ti_3C_2$ and $L—Ti_3C_2$ MXene dispersions (FIG. 2L), which created a continuous conductive pathway along the yarn surface. The yarns produced via two-step dip coating process were not as flexible as the yarns coated with only $S—Ti_3C_2$ MXene dispersions.

Figure 8:
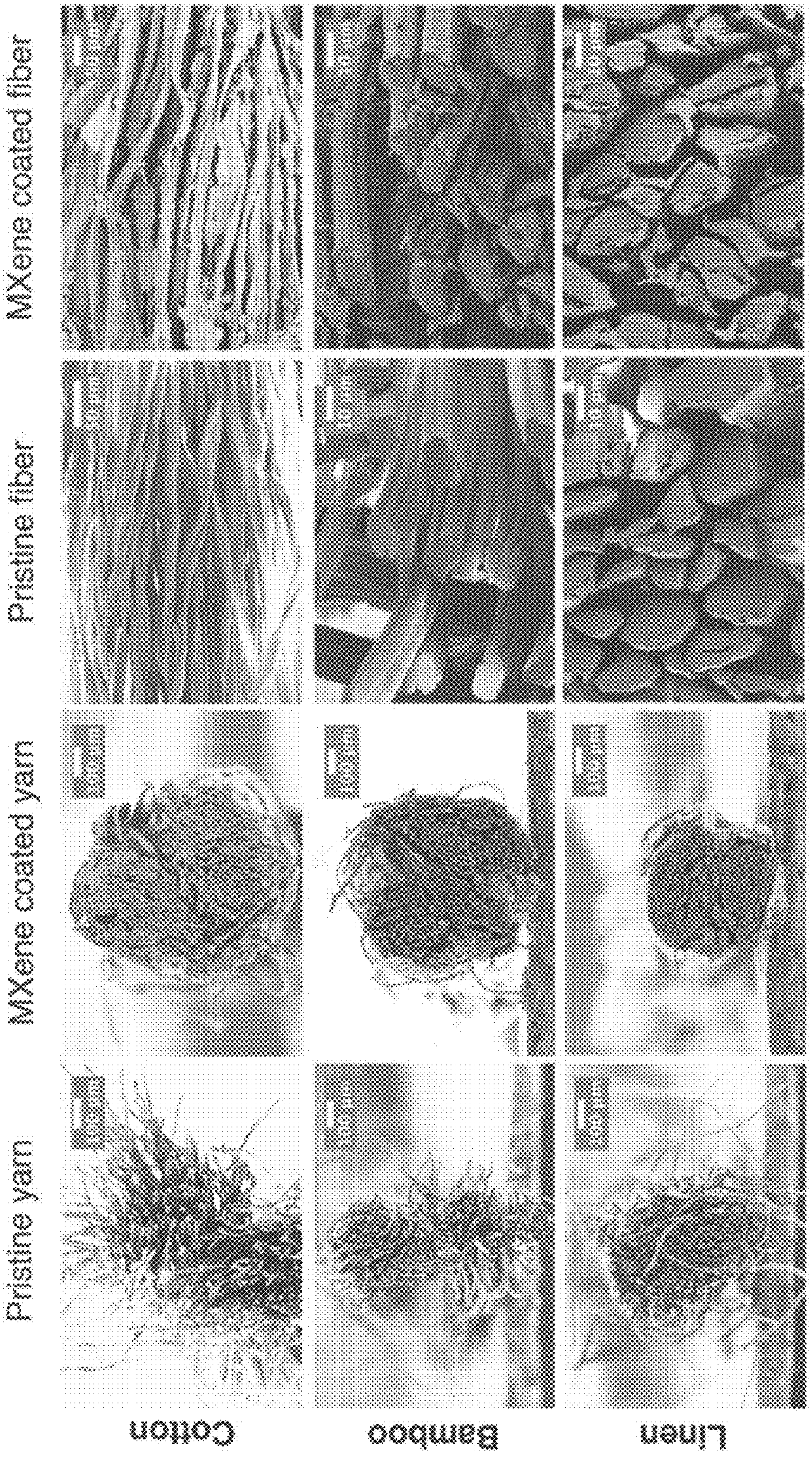
FIG. 8. Cross-section SEM images of cotton (top), bamboo (middle), and linen (bottom) yarns and fibers before and after $Ti_3C_2$ coating.

However, they demonstrated easier knittability and less flaking compared to the yarns coated with only $L—Ti_3C_2$ MXene dispersions. This is most likely due to a more balanced weight distribution between the center and the outside of the yarn achieved with the two-step dip coating process, where the presence of $S—Ti_3C_2$ MXene flakes at the internal yarn structure helped to balance the yarn's weight compared to only the presence of cotton fibers when the yarn surface only coated with $L—Ti_3C_2$ MXene dispersions. The same coating process was also applied to bamboo and linen yarns to demonstrate the adaptability of this method to other cellulose-based yarns. More detailed cross-sectional SEM images of the pristine and MXene-coated cotton, bamboo, and linen yarns are shown in FIG. 8. The MXene-coated yarns were dried thoroughly in air and subsequently placed in a vacuum desiccator prior to further evaluation.

To determine the mass loading of MXene, each yarn was weighed before and after dip-coating with MXene. The masses were averaged from three skeins with 200 cm length in order to account for mass variation along the length of the yarn. By following the two-step coating procedure, the active mass loading of up to 78 wt. % (2.5 mg/cm) could be achieved with cotton yarns. MXene-coated bamboo and linen yarns showed similar MXene loadings of ~75 wt. % (2.2 mg/cm) and ~77 wt. % (2.2 mg/cm), respectively. To the best of our knowledge, the active mass loading of ~78 wt. % deposited on the yarns is the highest reported value in the literature for a facile, yarn dip-coating approach.

Figure 9A:
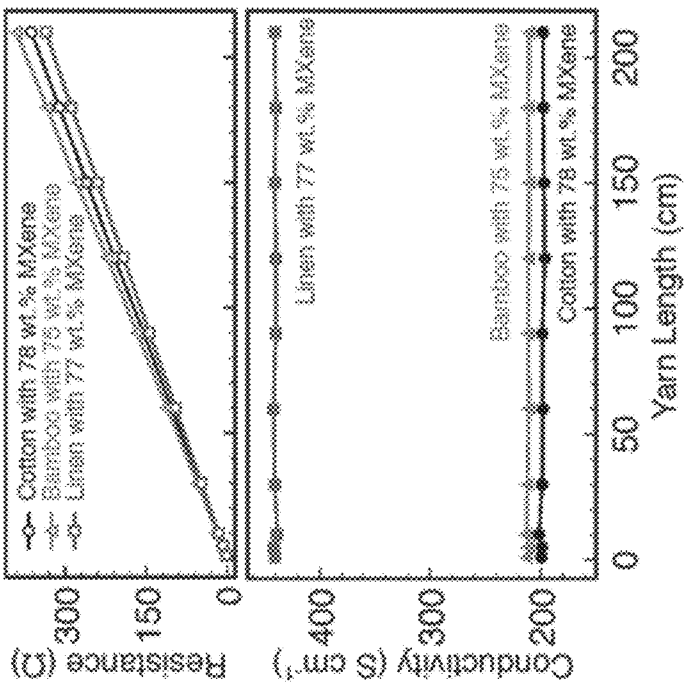
FIGS. 9A-9C.

Investigation of the changes in resistance and conductivity of the MXene-coated cellulose-based yarns with length (FIG. 9A) revealed that the resistance increased linearly as a function of yarn length, thus the conductivity remained unchanged when the yarn length increased from ~1 to ~210 cm. At the highest MXene loading of 78 wt. %, the conductivity of the MXene-coated cotton yarn reached 198.5±1.4 S/cm (1.7±0.2 Ω/cm, yarn diameter ~610 μm). While bamboo yarns with 75 wt. % MXene loading exhibited similar conductivity values with MXene-coated cotton yarns, the conductivity of the linen yarns with 77 wt. % MXene loading reached 440.3±0.9 S/cm, which is ~2.2-times higher than MXene-coated cotton and bamboo yarns.

Figure 9B:
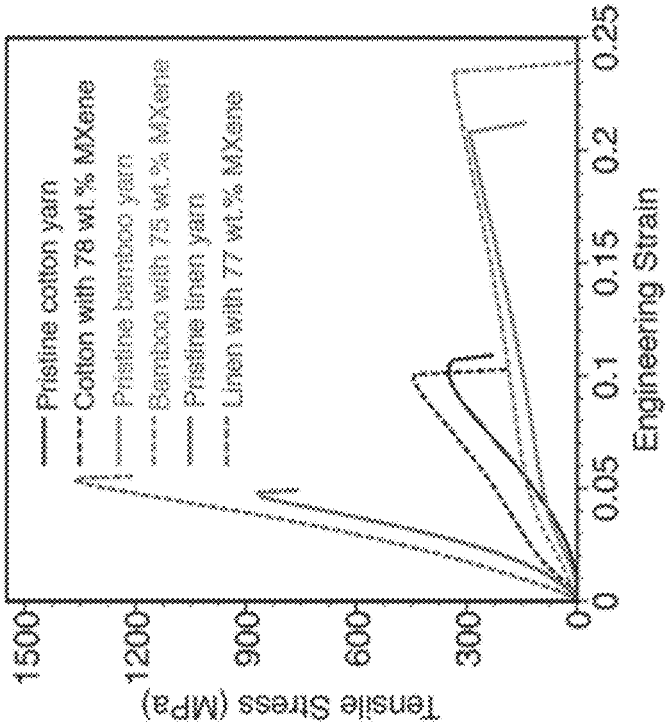
Figure 9C:
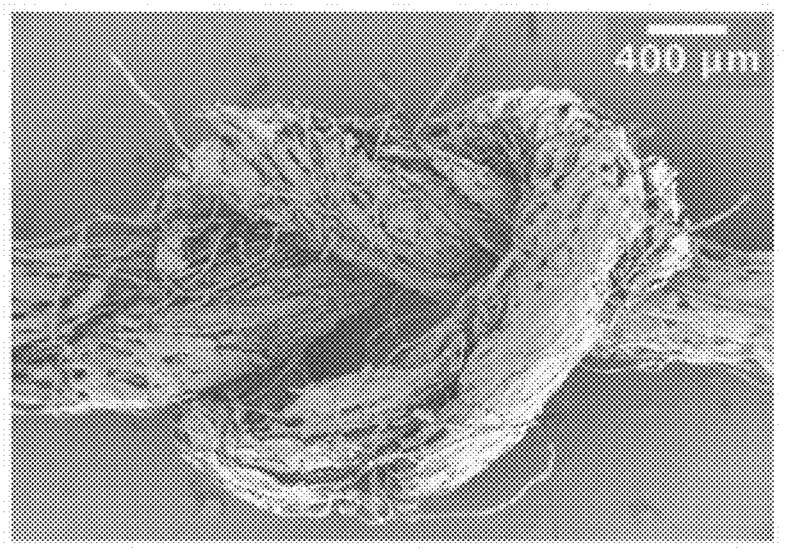

Since linen yarns possess the smallest diameter (~425 μm) among all examined yarns (~610 μm for cotton and ~570 μm for bamboo), the improved conductivity of the MXene-coated linen yarns can be attributed to the ~1.8-times higher MXene loading per unit volume of the linen yarn compared to cotton and bamboo yarns. Moreover, linen fibers (60-120 cm) are the longest fibers studied in this paper when compared to cotton (1-4 cm) and bamboo (5-8 cm) fibers. Similar to S—$Ti_3C_2$ vs. L—$Ti_3C_2$ MXene flakes, longer fibers infiltrated with MXene flakes help to decrease the overall interfacial resistance along the yarn length by creating more effective conduction paths. Mechanical testing of MXene-coated cellulose-based yarns at the maximum active material loading (75-78 wt. %) shows that MXene addition also reinforces the yarn, improving the mechanical properties (FIG. 9B). For instance, at 78 wt. % MXene, the cotton yarn showed a Young's modulus of 5.0±0.3 GPa and a tensile strength of 468.4±27.1 MPa, which were ~7% and ~40% higher than those of the pristine cotton yarns, respectively. Moreover, MXene-coated cotton yarn (78 wt. % MXene loading) can form a knot (FIG. 9C), indicating good flexibility and knittability. Thus, coating of cellulose-based yarns with $Ti_3C_2$ MXene dispersions resulted in flexible and mechanically stable yarns that offer good electrical conductivity and high active material loading for a variety of promising applications.

Knittability of MXene-Coated Cellulose-Based Yarns

We investigated the knittability of the MXene-coated cellulose-based yarns, including cotton, linen, and bamboo into full fabrics on an industrial machine using different stitch patterns. Knitting, the intermeshing of yarn loops to form a textile, was chosen due to its flexibility in programming and rapid prototyping. During industrial knitting process, the yarns are subjected to uniaxial tensile and bending stresses, making the overall stress much higher in comparison to hand knitting. Knitting cotton yarns coated with active materials with industrial machines was not possible for a long time as discussed in previous literature.

One of the reasons is that the cotton fibers are more likely to pull apart from each other while under tension during knitting since they consist of shorter fibers (1-4 cm) in comparison to other cellulose-based yarns (5-8 cm for bamboo and 60-120 cm for linen). The MXene-coated yarns are stronger and less flexible compared to their pristine counterparts. We addressed their reduced flexibility (after coating) by optimizing the stitch patterns through extensive parametric studies.

Here, we successfully knitted MXene-coated cotton and other cellulose-based yarns into swatches (fabric samples with 60 mm×65 mm in total area and 16 mm×26 mm in active area) and investigated different stitch patterns (geometric construction of the knitted loops) including single jersey (FIG. 3A), half-gauge (FIG. 3B), and interlock (FIG. 3C). The stitch pattern dictates how the yarns are interlooped to create different knit structures. Single jersey is the most common fabric type and simplest loop structure among knitted textiles. However, it is not necessarily the ideal stitch pattern when it comes to knitting the coated yarns since these yarns exhibit lower flexibility compared to their pristine states. In jersey knits, the loops are formed using every needle adjacent to each other on the needle bed. This can result in yarn-to-yarn rubbing and breakage due to a smaller bending radius of the yarn during knitting (FIG. 3D). To prevent the yarn breakage, a half-gauge pattern can be knitted. Half-gauge knit uses every other needle on the bed in each machine pass, resulting in a more porous fabric (FIG. 3E). The interlock pattern (FIG. 3F), also uses every other needle but knits all needles in two passes. Odd needles (denoted with asterisks) are knitted in the first machine pass and the even needles (denoted with triangles) are knitted during the second pass of the sequence. The interlock pattern (FIG. 3F) results in a fabric closer in density to single jersey and is denser compared to the half-gauge pattern. Thus, utilization of half-gauge and interlock stitch patterns increased the space between each line of the loops and reduced the yarn-to-yarn friction and yarn breakage. The ability to knit MXene-coated cellulose-based yarns with different stitch patterns allowed us to control the fabric properties such as porosity and thickness for various applications. Understanding the properties and the limitations of conductive yarns enabled us to adjust the stitch patterns and the corresponding knitting parameters in order to knit these yarns.

Washability of MXene-Coated Cellulose-Based Yarns

Figure 4A:
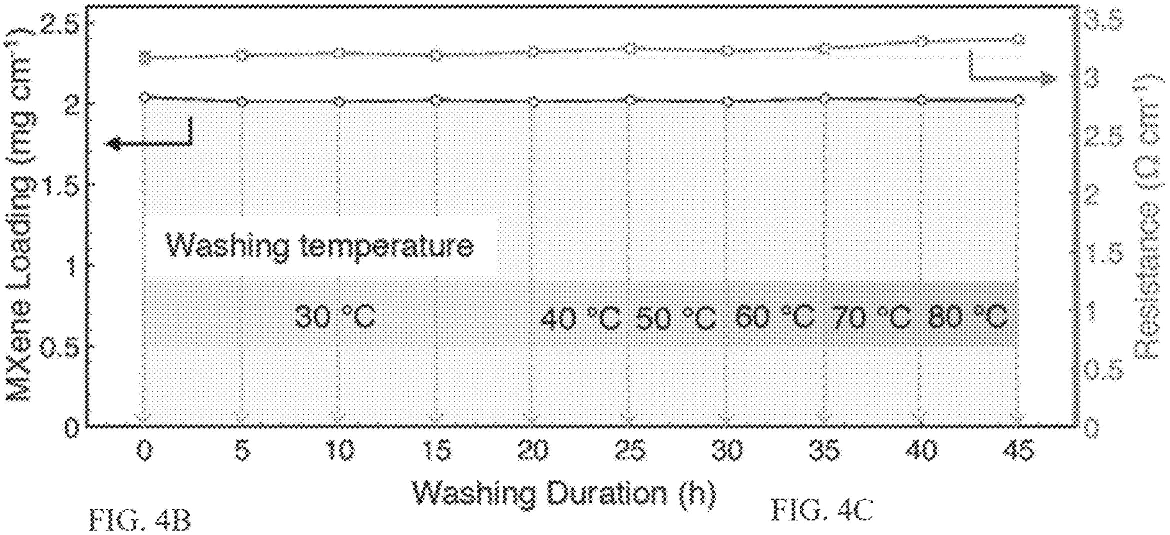
FIGS. 4A-4C. Washing durability performance of MXene-coated cotton yarns (~2 mg/cm MXene loading) under various washing temperatures and times.

The ability of conducting fibers to withstand prolonged exposure to aqueous environments is critical for use in wearable applications. The impact of washing was studied using $Ti_3C_2$-coated cotton yarns produced by the two-step dip-coating process. S—$Ti_3C_2$ MXene was used to coat the individual fibers in the internal yarn structure, then L—$Ti_3C_2$ MXene was used to coat the external yarn surface. The outer MXene coating thickness on the yarn surface was 15.2±0.8 μm based on the cross-sectional SEM images. The MXene loading remained relatively unchanged (<1% decrease) after 45 hours of washing cycles at temperatures ranging from 30° C. to 80° C., as shown in FIG. 4A. This is due to the strong interactions between MXene flakes so that even vigorous shaking did not redisperse the flakes as shown in free-standing films.

MXene-coated cotton yarns showed minimal change in linear electrical resistance after 20 washing cycles at 30° C. As the washing temperature increased from 30° C. to 80° C., the linear resistance increased only by ~3%. SEM images of the unwashed (FIG. 10A) and washed (FIG. 10B) MXene-coated cotton yarns after 45 washing cycles revealed very little material loss even after 45 h at elevated temperature in water. The washed MXene-coated cotton yarns demonstrated similar mechanical properties to the unwashed MXene-coated yarns with tensile strength of 460.1±25.2 MPa, Young's modulus of 4.8±0.2 GPa, and failure at strain value of 0.0844±0.004. This result is the first to demonstrate the negligible detrimental effect of washing MXene-coated yarns on their mechanical properties.

Figure 4B:
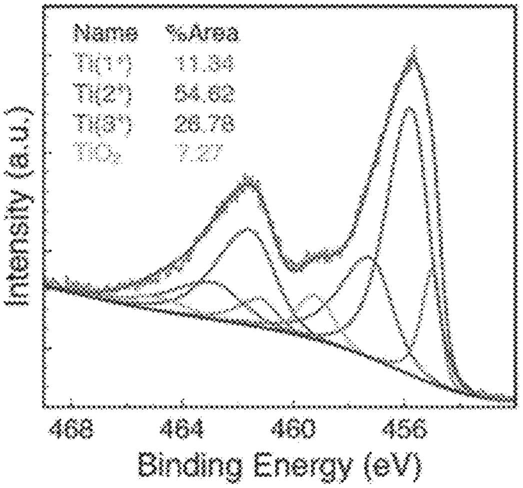
Figure 4C:
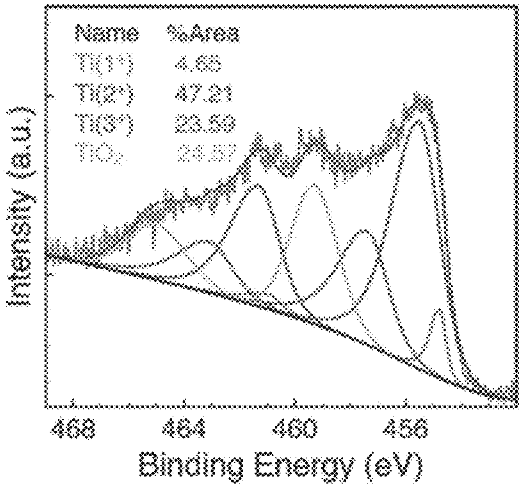

X-ray photoelectron spectroscopy (XPS) was used to investigate if the washing process resulted in oxidation or degradation of MXene. XPS is inherently a surface sensitive technique due to the shallow escape depth of the photoelectrons generated from the material, therefore, the spectra gathered are indicative of only the outer <15 nm surface layer. FIG. 4B showed that the MXene in the unwashed fibers exhibited very low degree of oxidation whereby ~7.3 at % of Ti in MXene was in the form of $Ti^{4+}$ (indicative of $TiO_2$) which is the product of $Ti_3C_2$ MXene oxidation. After washing the yarns at 30° C. for 20 washing cycles followed by 25 washing cycles from 40 to 80° C., the MXene in the thin outer surface layer was oxidized with the $Ti^{4+}$ comprising ~43.6 at % (FIG. 10C). After sputtering for just 3 mins, the measured degree of oxidation decreased to ~24.6 at % (FIG. 4C). Bulk properties, such as electrical conductivity, are often governed by the overall state of the material. The resistance of the MXene-coated cotton yarn increased by less than 5% after washing at temperatures ranging from 30° C. to 80° C. for 45 washing cycles, as shown in FIG. 4A. Partial surface oxidation (<1 μm in thickness compared to ~15.2 μm in thickness of the external MXene layer) does not seem to significantly affect the overall conductivity of the yarns. The remaining MXene flakes in both the fiber and the yarn levels are able to provide similar conductivity values to unwashed MXene-coated cotton yarn. The summary of the high-resolution $Ti_2p$ XPS region is provided in Table 1 herein for unwashed and washed MXene-coated cotton yarns before and after sputtering. These results further support our findings of the stability of MXene-coated cotton yarns under harsh environments. Unlike the colloidal MXene dispersions, once the MXene flakes are assembled and dried, there are no more reactive pathways for oxidation because additional water cannot easily rehydrate the structure. As a result, the exposure to water and temperature does not seem to affect the overall electrical conductivity of the MXene-coated cotton yarns as observed in case of assembled MXene flakes in films.

Electrochemical Properties of MXene-Coated Cotton Yarns

Figure 5A:
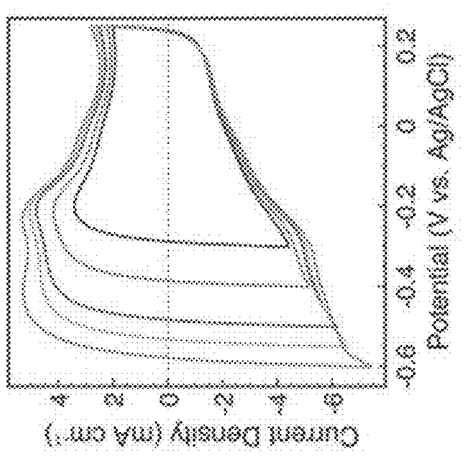
FIGS. 5A-5F. Electrochemical performance of MXene-coated cotton yarns with 78 wt. % (2.5 mg/cm) MXene loading using a three-electrode cell in 1 M $H_2SO_4$.
Figure 5B:
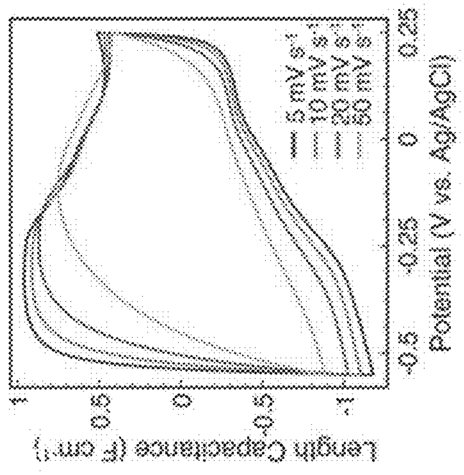
Figure 5C:
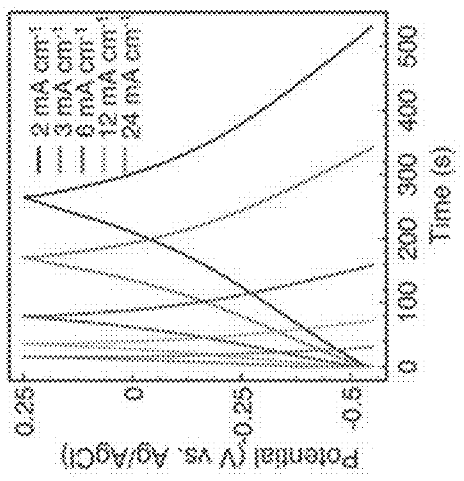
Figure 5D:
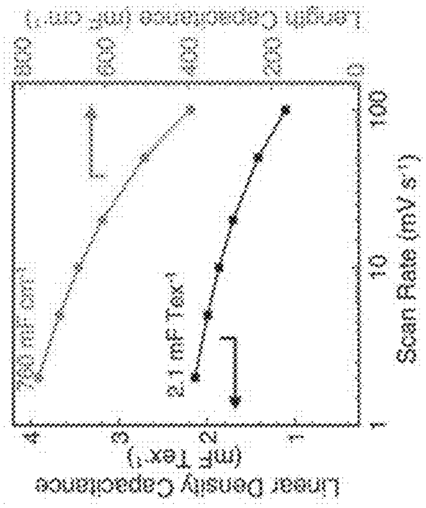

Electrochemical performance of MXene-coated cotton yarns was evaluated using a standard three-electrode set-up with 1 M $H_2SO_4$ electrolyte to assess the feasibility of using these yarns for energy storage applications. Cotton yarn with 78 wt. % (2.5 mg/cm) of MXene loading was used as the working electrode without any current collector during the test. Using cyclic voltammetry (CV), the stable potential range for the MXene-coated cotton yarns was identified to be between-0.55 and 0.25 V versus Ag/AgCl (FIG. 5A). The representative CV and galvanostatic charge-discharge (GCD) curves of the MXene-coated cotton yarns at different scan rates and current densities were shown in FIGS. 5B and 5C, respectively. The CV curves demonstrated a quasi-rectangular shape with close to ~100% Coulombic efficiency under anodic potential at all scan rates indicating the capacitive behavior of MXene-coated cotton yarns. An increased capacitance under high cathodic potentials is due to $H^+$ induced redox behavior of $Ti_3C_2$ (pseudo-capacitance). The GCD curves at different current densities, are highly symmetrical even at high discharge current density of 24 mA/cm. The specific capacitances as a function of scan rates were determined using CV curves as shown in FIG. 5D. The specific capacitance decay as a function of scan rate was most likely to be due to the diffusion limitations of the ionic transport. Similar intercalation/deintercalation rate limitation was also observed in case of thick planar MXene electrodes. The MXene-coated cotton yarn displayed a length capacitance ($C_L$) of ~759.5 mF/cm at 2 mV/s. The areal capacitance ($C_A$) and volumetric capacitance ($C_V$) values were also calculated from CV curves at 2 mV/s as ~3965.0 $mF/cm^2$ and ~260.0 $mF/cm^3$, respectively. Gravimetric capacitance ($C_G$) is dependent on the thickness and density of the electrodes as well as weight of the other components, which results in unreliable comparison between different supercapacitors. However, mass is an important parameter and cannot be neglected. Both the gravimetric (mass) and the linear, areal, or volumetric capacitances need to be considered when evaluating the capacitance performance. Tex, mass of the yarn in grams per 1,000 meter, is a common metric used in the textile industry. It takes into consideration both the mass and the length of the yarns to avoid the faulty assumption of yarns being perfect cylinders with fixed diameters. The linear density of the cotton yarns at 2.5 mg/cm MXene loading (mass of the pristine cotton yarn ~0.7 mg/cm) was measured as 320 Tex. Thus, the linear density capacitance of the electrode ($C_{Tex}$) was 2.1 mF/Tex at 2 mV/s. To the best of authors' knowledge, the cotton yarns with 78 wt. % MXene loading exhibited the highest specific length capacitance among the cellulose-based yarn-shaped supercapacitors reported to date.

Figure 5E:
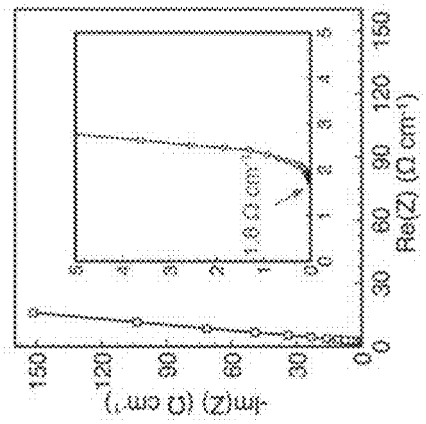
Figure 5F:
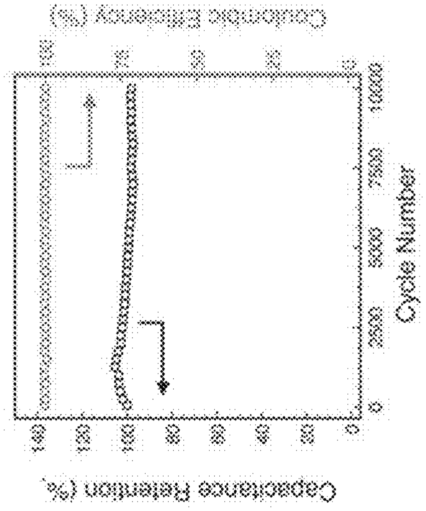
Figure 11A:
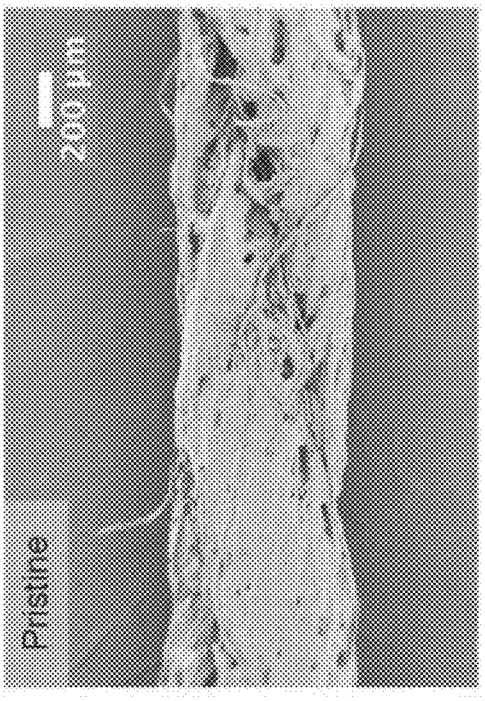
FIGS. 11A and 11B. SEM images of the FIG. 11A pristine cotton yarn FIG. 11B after 10,000 cycles in 1 M $H_2SO_4$.
Figure 11B:
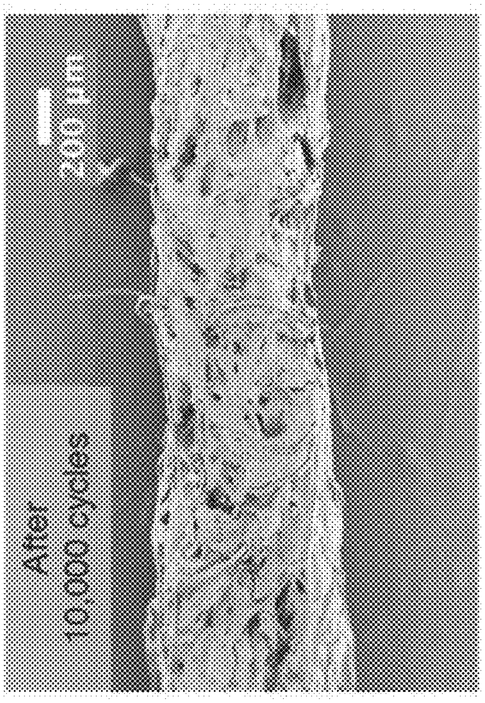

Electrochemical impedance spectroscopy (EIS) was conducted to understand the charge transfer and ion transport properties of the MXene-coated cotton yarns. As shown in FIG. 5E, the equivalent series resistance (ESR) was calculated as 1.8 Ω/cm from the high frequency intercept of the Nyquist plot. MXene-coated cotton yarns showed a short Warburg region with a 45° angle, which indicated good ion diffusion efficiency, and a linear behavior in the low-frequency region, demonstrating close to the ideal capacitive behavior. As shown in FIG. 5F, MXene-coated cotton yarns exhibited excellent cyclic stability with 100% Coulombic efficiency after 10,000 cycles at a current density of 30 mA/cm. It should be noted that the MXene coated cotton yarn electrode has not been precycled prior to the cyclability test and the ~5% increase in capacitance stabilized back to 100% retention after ~2,000 cycles. This result shows that for practical applications, the textile supercapacitors built using MXene-coated cotton electrodes need to be preconditioned prior to use. SEM images (FIG. 11A and FIG. 11B) of the MXene-coated cotton yarns before and after 10,000 cycles show that the morphology of the yarns as well as the MXene coating remained almost unchanged.

Figure 12A:
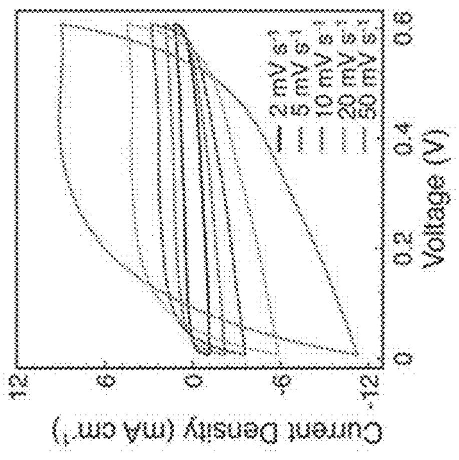
FIGS. 12A-12F. Electrochemical performance of a symmetric MXene cotton yarn supercapacitor device using a cotton yarn with 2.2 mg/cm of MXene loading in 1 M PVA—$H_2SO_4$ gel electrolyte.
Figure 12B:
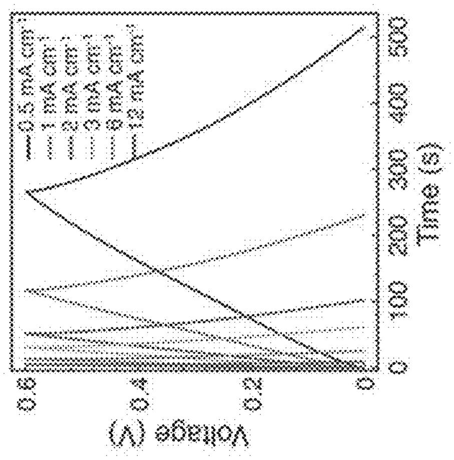
Figure 12C:
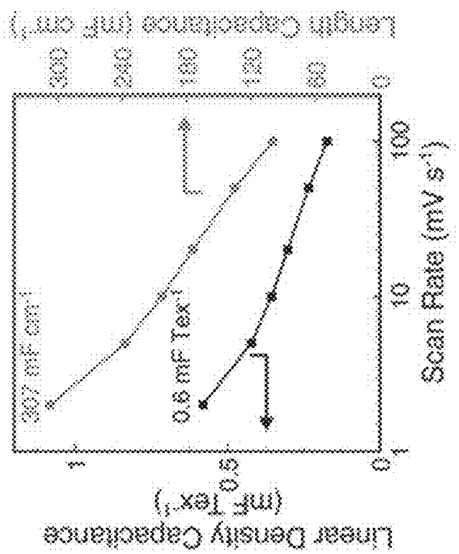
Figure 12D:
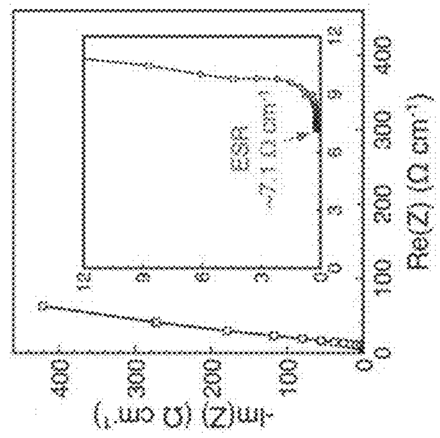
Figure 12E:
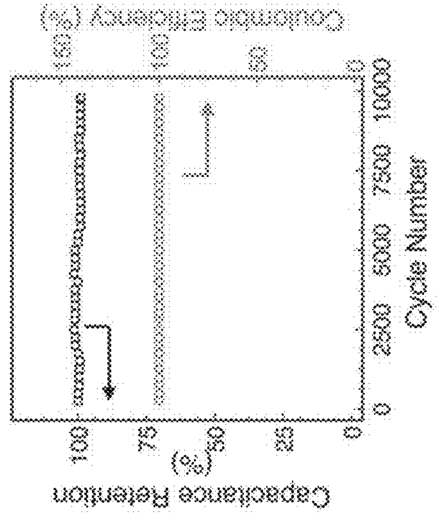
Figure 12F:
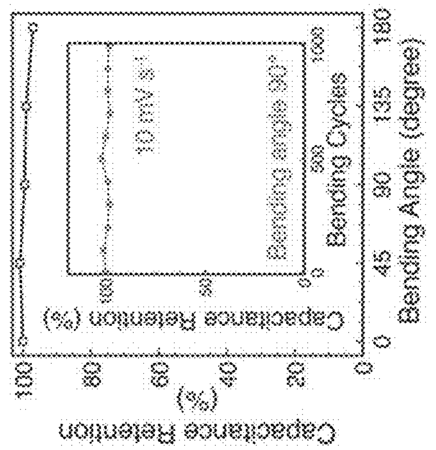

The electrochemical results indicate that MXene-coated cotton yarns can be a potential candidate in powering wearable electronics. They can be incorporated into symmetric yarn supercapacitors to offer sufficient energy and power for a variety of applications. To demonstrate this, yarn supercapacitors were fabricated using a symmetric device configuration where both of the electrodes had the same amount of MXene loading. The electrodes were separated by a polyvinyl alcohol (PVA)—$H_2SO_4$ gel electrolyte. The voltage window was kept at 0.6 V to prevent the oxidation of $Ti_3C_2$ MXene as suggested by previous studies. From the CV curves shown in FIG. 12A, the specific capacitance values of the device (at 2 mV/s) were calculated as $C_L$ of ~306.9 mF/cm (0.6 mF/Tex), $C_A$ of ~1865.3 $mF/cm^2$, and $C_V$ of ~142.4 $mF/cm^3$. The GCD curves (FIG. 12B) are highly symmetric at all current densities investigated with negligible iR drop. The rate handling of the symmetric yarn supercapacitor device, as shown in FIG. 12C, can be adjusted by using a yarn electrode with smaller diameter, which would reduce the overall thickness of the device and improve the ion diffusion at higher scan rates. The Nyquist plot (FIG. 12D) showed nearly vertical behavior at all frequencies, suggesting fast ion diffusion with an estimated ESR value of 7.1 Ω/cm. The yarn supercapacitor device showed a long-term capacitance retention of ~100% after 10,000 charge-discharge cycles while maintaining 100% Coulombic efficiency (FIG. 12E) when tested with GCD cycles at 5 mA/cm. Further increase in the voltage window and energy storage can be achieved by using organic electrolyte. The stability and performance of free-standing yarn supercapacitor devices (5 cm long) were also tested under bending cycles at various bending angles as shown in FIG. 12F. The device demonstrated stable response with a ~100% capacitance retention after 1,000 cycles when bent at 90°. The performance of the device remained stable when repeated deformations were applied during the test.

Knitted Capacitive Pressure Sensor Device

Figure 6A:
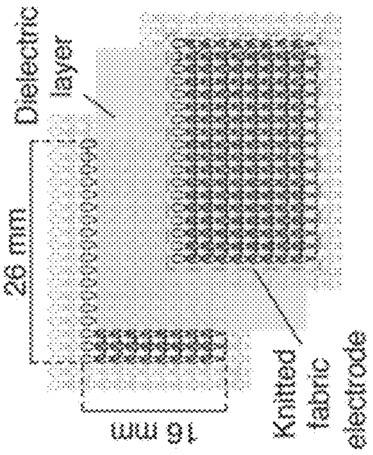
FIGS. 6A-6F. Evaluation of sensing performance of the capacitive knitted pressure sensor device.
Figure 6B:
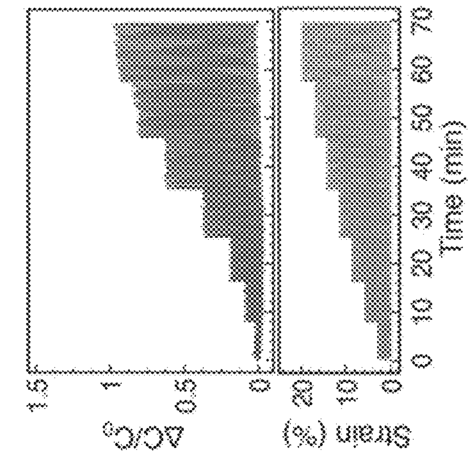
Figure 6C:
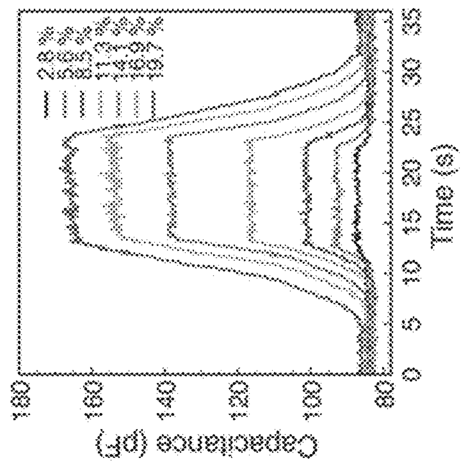
Figure 6F:
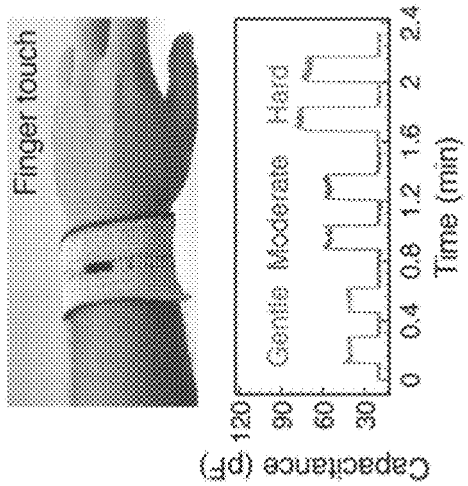
Figure 6E:
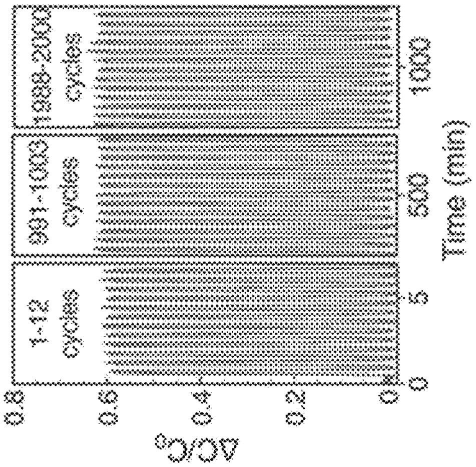
Figure 6D:
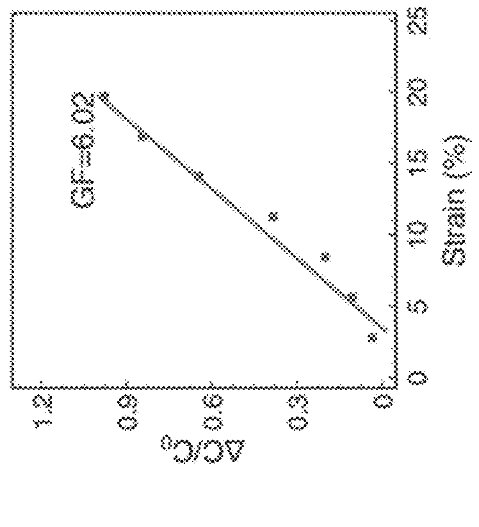
Figure 13A:
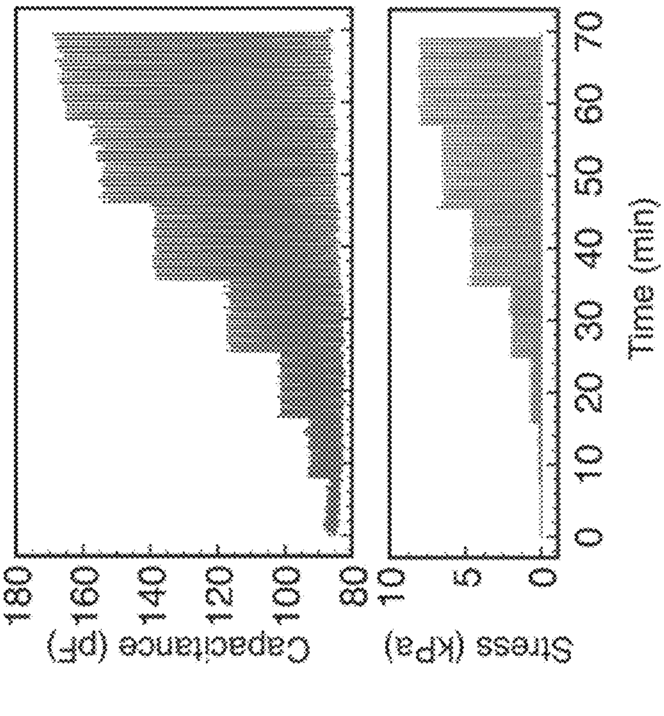
FIGS. 13A and 13B provide exemplary data, showing that capacitance (C) increased with applied stress (FIG. 13A), and that 20% and 50% increases in the capacitance response were observed when 5 g and 20 g weights were placed on the textile device, respectively (FIG. 13B).

To demonstrate multifunctionality of MXene-coated yarns, we also used them to make a textile pressure sensor device. Since MXene-coated cotton yarns were used to demonstrate the feasibility of energy storage applications, MXene-coated bamboo yarns have been chosen for the pressure sensor device assembly. We knitted MXene-coated bamboo yarns (MXene loading 0.6 mg/cm) into a rectangular swatch (16 mm by 26 mm) surrounded by a knitted viscose yarn using interlock stitch (FIG. 6A). The capacitive textile sensor device was then prepared by carefully placing two identical knitted swatches on top of each other with a dielectric layer of thin nitrile rubber sandwiched in between. The electromechanical measurement of the textile sensor showed that the capacitance (C) increased with compression strain (FIG. 6B) and applied stress (FIG. 13A), and returned to initial value (Co) when released. The capacitance response of the sensor as a function of various magnitudes of cyclic compression strains (FIG. 6C) showed that the textile sensor was able to respond to a wide range of compression strains (¿) from 2.8% to 19.7%, equivalent to pressures of 0.002 and 66 kPa (per whole sensor area, not considering textile porosity), respectively. Notably, the relative change in capacitance ($\Delta C/C_0$) showed a linear relationship with the magnitude of compression strain, indicating the linearity of the sensing response (FIG. 6D). Fitting a linear line to $\Delta C/C_0$ vs. $\varepsilon$ data, revealed a slope of 6.02. This slope corresponds to the gauge factor (GF) of the sensor, defined as $\Delta C/\varepsilon C_0$. GF is an important sensing metric as it determines the sensitivity of the sensor device. This GF is comparable to other capacitive textile-based pressure sensors, indicating the high sensitivity of the knitted MXene-coated yarn pressure sensor device. When repeatedly compressed and relaxed for 2,000 cycles at 14.1% strain, the capacitive response of the textile device remained constant (FIG. 6E), indicating excellent cyclic stability. This long-term sensing stability demonstrates that the sensor's response is reproducible.

Figure 13B:
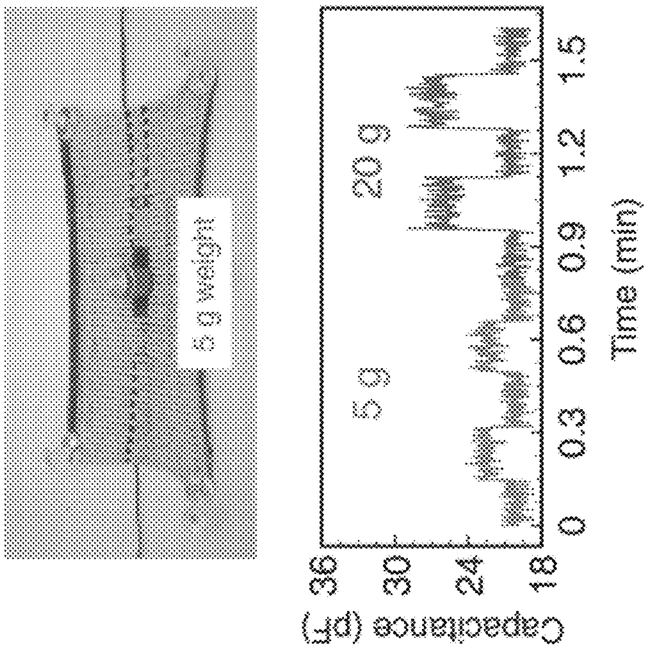

We also prepared a capacitive pressure sensor button (FIG. 6F) by knitting the MXene-coated yarn into fully functional device, i.e. two textile electrodes and a sandwiched dielectric layer, in one step using an industrial-scale knitting machine. The knitted pressure sensor button was capable of sensing various levels of finger pressures and weights. For instance, the capacitance response of the sensor increased approximately two, three, and four times its initial value when gentle, moderate, and hard pressures were applied, respectively (FIG. 6F). Moreover, 20% and 50% increases in the capacitance response were observed when 5 g and 20 g weights were placed on the textile device, respectively (FIG. 13B). These examples show that the knitted fabric sensor is capable of distinguishing various levels of applied pressures and can may be used in practical applications. The performance of the knitted pressure sensor can be further improved in the future by changing the yarn type, stitch pattern, active material loading, and the dielectric layer to result in higher capacitance changes under applied pressure to achieve more reliable devices for wearable applications.

This work introduced a simple two-step dip-coating process using colloidal solutions of small- and large-size $Ti_3C_2$ MXene flakes, which transformed traditional cellulose-based yarns into highly conductive, electrochemically and electromechanically active yarns. MXene loadings of up to 77 wt. % (2.2 mg/cm) were achieved, which resulted in yarns with a remarkable electrical conductivity of up to 440.3±0.9 S/cm. By adjusting the stitch pattern between single jersey, half-gauge and interlock, MXene-coated cellulose-based yarns were successfully knitted into full fabrics using an industrial knitting machine. When washed at temperatures ranging from 30° C. to 80° C., the MXene loading remained almost unchanged with negligible change in the yarn resistance and conductivity. The MXene-coated cotton yarn exhibited a high length capacitance ($C_L$) of up to 759.5 mF/cm (2.1 mF/Tex). The $C_L$ of 306.9 mF/cm (0.5 mF/Tex) at 2 mV/s was achieved when two MXene-coated cotton yarns were assembled into free-standing, symmetric yarn supercapacitor. By using the knitted MXene-coated bamboo yarns as electrodes, we achieved a textile-based capacitive pressure sensor that demonstrated a high sensitivity (GF ~6.02), a sensing range of 20% compression, and excellent cycling stability at ~14.1% strain for 2,000 cycles. The MXene-coated yarns offer suitable properties that can meet the performance requirements of applications other than energy storage and sensing, such as triboelectric energy harvesting, EMI shielding, and heated fabrics. The established approach in this study, which combines the versatile chemistry and promising electrical and electrochemical properties of MXenes with the existing cellulose-based yarns, offers a platform technology for various textile-based devices by allowing tunability in performance for the building blocks of textiles.

Experimental Section

Synthesis of $Ti_3C_2T_x$ MXene: $Ti_3AlC_2$ MAX phase powder was synthesized according to the method described previously. $Ti_3C_2$ was synthesized by selective etching of Al atomic layers from $Ti_3AlC_2$ MAX phase. To prepare the MXene dispersion, 3 g of $Ti_3AlC_2$ was added slowly to a 60 mL of chemical etchant (6:3:1 ratio) consisting of 36 mL of 12 M hydrochloric acid (HCl, Alfa Aesar, 98.5%), 18 mL of deionized (DI) water, and 6 mL of hydrofluoric acid (HF, Acros Organics, 49.5 wt. %). The mixture was stirred at 500 rpm for 24 h at room temperature. After etching, the solution was washed by repeated centrifugation at 3,500 rpm for 5 min cycles. The acidic supernatant was decanted after centrifuging and DI water was then added to wash the MXene powder several times until its pH reached ~5-6.

Delamination and preparation of MXene: For delamination, 2 g of lithium chloride (LiCl, Chem-Impex Int., 99.3%) dissolved in 100 mL of DI water was added to the sediment after washing. The lithium-ions intercalate between the interlayer spacings of multilayered MXene to facilitate subsequent delamination into few layered sheets. The mixture was first dispersed by manual shaking and then stirred at room temperature for 4 hours. The MXene solution was then washed four times by centrifugation until the supernatant was dark, indicating delamination. To separate unreacted $Ti_3AlC_2$ MAX and multi-layer $Ti_3C_2$ MXene flakes, centrifugation at 3,500 rpm for 5 min was repeated. The supernatant was collected, and the sediment was redispersed with more water before beginning the next centrifuge cycle. The concentration of the MXene dispersion was measured by vacuum filtration of a known volume of solution and measuring the mass of the resulting free-standing film. To increase the concentration, the MXene dispersion was centrifuged at 9,000 rpm for 2 hours, the clear supernatant was decanted, and the sediment was redispersed in a known volume of DI water. The new concentration of the MXene dispersion, also called as-synthesized MXene, was measured again before being used for dip-coating. Half of the as-synthesized MXene dispersion was probe sonicated (Fisher Scientific model 505 Sonic Dismembrator, 500 W) for 20 min under a pulse setting (8 s on pulse and 2 s off pulse) at an amplitude of 50%. The MXene dispersion in a 50 mL glass bottle was inserted in an ice bath to keep the dispersion cool during sonication.

Characterization: The flake size distributions and the zeta potential measurements of the MXene dispersions were conducted using dynamic light scattering (DLS). Diluted MXene dispersion was transferred into a polystyrene cuvette (Zetasizer Nano ZS, Malvern Instruments, USA), and a total of five measurements from each sample were taken for the DLS average. The weight of the yarn was measured using a scale (Mettler Toledo, Columbus, OH) before and after dip-coating to determine the MXene loading. Scanning electron microscopy (SEM) images were taken on a Zeiss Supra 50 VP with an accelerating voltage of 3 kV to observe the MXene coating on the individual fibers and the yarn surface. Yarn cross-sections were obtained by submerging the yarn in liquid nitrogen and then manually breaking the frozen yarn. X-ray diffraction (XRD) was conducted to study the structure of the precursor $Ti_3AlC_2$ MAX, $Ti_3C_2$ MXene film, pristine cotton and MXene-coated cotton yarn. A Rigaku Miniflex II—Gen. 6 (Rigaku Co. Ltd. USA) with Cu $K_\alpha$ ($\lambda$=0.1542 nm) source and graphite $K_\beta$ filter was used for measurements and the spectra were acquired at 40 kV voltage and 15 mA current for 2-theta values from 2 to 65 degrees. AFM measurements were done using a NX-10 (Park Systems, Korea) in a standard tapping mode in air. The drive frequency was 272 kHz. The image was collected at 15 by 15 μm scan size at a scan rate of 0.3 Hz. AFM samples were prepared by spin-coated MXene solutions on $Si/SiO_2$ (300 nm) at 3000 rpm for 60 s. The substrates were then dried at 7000 rpm for 15 s. X-ray photoelectron spectroscopy (XPS) was conducted using PHI VersaProbe 5,000 instrument (Physical Electronics, USA) with a 200 μm and 50 W monochromatic Al—$K_\alpha$ (1486.6 eV) X-ray source. Charge neutralization was accomplished through a dual beam setup using low energy $Ar^+$ ions and low energy electrons at 1 eV/200 μA. Sputtering on 2×2 $mm^2$ area was conducted using Art-ion source at 4 kV accelerating voltage and 5 mA $cm^{-2}$ current density for up to 3 minutes. High-resolution Ti-2p region spectra were collected using pass energy and energy resolution of 23.5 eV and 0.05 eV, respectively. No binding energy scale correction was applied as the samples were conducting, charge neutralization was adequate, and no irregular shifts in the spectra were observed even after sputtering. Quantification and peak fitting were conducted using CasaXPS V2.3.19. Mixed Gaussian-Lorentzian, GL (30), peak shape was used for oxygen related moieties ($TiO_2$), and asymmetric Lorentzian, LA(2,4,6), was used for metal related moieties (Ti—C, Ti—O, Ti—F).

The electrical resistance of the MXene-coated yarns was measured using a two-point probe with Keysight 2400 multimeter by repeating the test on at least ten different positions. The diameter of the yarns was measured using an Olympus PMG 3 (Olympus, Center Valley, PA) optical microscope from an average of ten different locations along the yarn length. Conductivity (o) was calculated by $\sigma$=I/$RA_C$, where l, R, and Ac are the length, resistance, and the cross-sectional area of the yarn, respectively. The mechanical properties of the MXene-coated cellulose-based yarns were analyzed using a DHR-3 (TA Instruments, DE) rheometer with a 50 N load cell and crosshead speed of 1.5 mm/min. Samples were prepared by attaching the yarn vertically onto a rectangular paper frame with 25 mm gauge length. After mounting the frame on the grips, the paper was cut in the middle and the yarn was stretched at a strain rate of 0.001/s (6%/min) until failure.

Knitting: The MXene-coated cellulose-based yarns were knitted using a 15-gauge, SWG041N Shima Seiki computerized knitting machine. The Apex-3 Design software was used to program knitted devices and samples. Rectangular swatches were knitted using interlock and half-gauge stitch patterns. The pressure sensor button was fully knitted from start to finish using MXene-coated bamboo yarns (0.6 mg/cm MXene loading) as the electrode material. The sensor consists of two electrodes that were independently knitted on two separate planes (front surface and back surface). Two individual feeders, each carrying a MXene-coated bamboo yarn, were used to simultaneously knit the two independent fabric electrodes with reflective symmetry. A key consideration was to avoid contact between the two electrodes to prevent short circuiting. This was achieved by carefully designing the knitting program. After knitting of active material was completed, the machine signalled a programmed stop. The dielectric layer (nitrile rubber) was then carefully placed between the fabric electrodes and the pocket was closed by knitting a commercial viscose yarn on the subsequent row, securing the dielectric layer.

Washability: MXene-coated cotton yarns were washed with 1 mg/mL Synthrapol solution, where they were loosely secured onto a mesh to prevent tangling during the washing process. Synthrapol is a mild detergent commonly used in yarn and fabric dyeing, which facilitates removing loose dye particles from the substrate. The MXene-coated cotton yarns fixed to the mesh were placed into a vial with the Synthrapol and stirred at 500 rpm, where the mesh was free to move during stirring. Two sets of 100 cm long MXene-coated cotton yarns were washed for 20 washing cycles (60 min stirring for each cycle at 500 rpm) at 30° C. Then, the same yarns (washed at 30° C. for 20 washing cycles) were further washed 5 more cycles at each listed temperature consecutively: 40° C., 50° C., 60° C., 70° C., and 80° C. As a result, the yarns were washed 45 washing cycles in total. For each set of yarns, the MXene loading and the linear resistance along ten ~1 cm long yarn segments were measured and compared. Next, the yarns were rinsed with deionized water (DI) and air dried at room temperature for at least 6 h and then dried in a vacuum desiccator for 4 h prior to measuring the mass loss and linear resistance.

Fabrication of yarn electrodes: The electrochemical properties of the MXene-coated cotton yarns were studied in a three-electrode configuration. The counter and the reference electrodes were graphite rod and Ag/AgCl (3 M KCl), respectively and 1 M $H_2SO_4$ was used as the electrolyte. The working electrode was prepared by attaching a ~25-30 mm long MXene-coated cotton yarn (2.5 mg/cm of MXene loading) to the end of a fine silver wire using conductive silver paste. The connection and the silver wire were sealed using epoxy glue to avoid contact of silver paste with the electrolyte.

Fabrication of yarn supercapacitor devices (YSC): For the yarn supercapacitor (YSC) device, PVA-$H_2SO_4$ gel electrolyte was prepared by dissolving 3 g of PVA powder (Sigma-Aldrich, MW=89,000-98,000) in 30 mL of water at 85° C. under vigorous stirring. 3 g of sulfuric acid (98 wt. %, $H_2SO_4$, Fisher Chemical) was added to the PVA solution after it cooled down to room temperature and a homogenous gel was achieved. For preparation of YSCs, MXene-coated cotton yarns (length of each yarn ~60 mm) were immersed in the PVA-$H_2SO_4$ gel electrolyte for ~10 mins and dried in air overnight. The YSC device was prepared in parallel configuration by placing two MXene-coated cotton yarn electrodes next to each other and coating twice with PVA-$H_2SO_4$ gel electrolyte to ensure a complete coating.

Characterization of yarn electrodes and YSC: Cyclic voltammetry (CV), galvanostatic charge-discharge (GCD), and electrochemical impedance spectroscopy (EIS) were performed using an electrochemical workstation (VMP 3, BioLogic, France) at room temperature. Yarn electrodes and devices were pre-cycled using CV at 100 mV/s for 20 cycles prior to recording the electrochemical data. The current density values extracted in the CV and GCD curves were normalized to the length of the yarn electrode. For the three-electrode setup, CV and GCD curves were recorded at a potential window of 0.25 to −0.55 V (vs. Ag/AgCl) at the scan rates ranging from 2 to 100 mV/s and at the specific current per length of 2 to 24 mA/cm, respectively. For the two-electrode setup, CV and GCD curves were recorded in a voltage window of 0 to 0.6 V at the scan rates ranging from 2 to 100 mV/s and at the specific current per length of 0.5 to 12 mA/cm. The electrochemical impedance spectroscopy (EIS) was performed at open-circuit potential within a frequency range from 1 mHz to 1 MHz at an alternating-current voltage with 10 mV amplitude. Cycling stability was measured by repeating the GCD test for 10,000 cycles at a current density of 30 mA/cm and 5 mA/cm for three-electrode and two-electrode setups, respectively.

The capacitance was calculated by integrating the discharge portion of the CV data using the following equation:

$$C_D = \frac{\int_0^v i dV}{v \Delta V} \tag{1}$$

where i is the instantaneous current at the potential of V, v is the scan rate (V/s), and ΔV is the potential/voltage window (V). The numerator of the equation is the integral of the discharge portion of the CV curve. The length ($C_L$, mF/cm), areal ($C_A$, mF/cm$^2$), volumetric ($C_v$, F/cm$^3$), and linear density ($C_{Tex}$, mF/Tex) specific capacitances of the electrode were obtained by normalizing the capacitance to the length, outer surface area, volume, and the linear density (Tex) of the yarn electrode respectively (for three-electrode configuration). The specific capacitances of the supercapacitor device were calculated by normalizing the capacitance to the length of the whole device, total area, total volume, and the total linear density of the device, respectively (including both electrodes with same length).

The outer surface area (A) and volume (V) of the yarn electrode were calculated using the following equations:

$$\text{Area: } A = 2\pi r l, \tag{2}$$

$$\text{Volume: } V = \pi r^2 l, \tag{3}$$

where l denotes the length of the electrode, r is the radius of the yarn electrode. The capacitance retention ($C_{Ret}$) of the electrode and the YSC device were calculated from the specific capacitance in the first cycle ($C_1$) and the specific capacitance after the cycle number i, using the following equation:

$$C_{Ret} = \frac{C_i}{C_1} x\ 100\% \tag{4}$$

Characterization of the pressure sensor: The pressure sensing properties of the knitted samples were measured by real-time monitoring of the capacitance response during the cyclic compression-relaxation tests. Synchronized mechanical and electrical (electromechanical) data were collected using an Instron 3300 (Model 3365, Norwood, MA) with a 100 N load cell at a crosshead speed of 5 mm/min and a multimeter (Model 34461A, Keysight, Santa Rosa, CA). Dimensions of each electrode used for the electromechanical test were 60 mm×65 mm in total area and 16 mm×26 mm in active area with a dielectric thickness of ~72 μm and a total sensor thickness of ~2.5 mm. The active area of the pressure sensor was knitted using MXene-coated bamboo yarns with 0.6 mg/cm MXene loading. The surrounding textile was knitted using a commercial viscose yarn (70 Tex). Relative capacitance change ($\Delta C/C_0$) was calculated, which represents capacitance (C) at each point normalized in respect to the initial capacitance ($C_0$).

Additional Disclosure

Knittable and Washable Multifunctional MXene-Coated Cellulose Yarns

The XRD pattern of the $Ti_3C_2$ MXene film is characterized by the (001) family of planes, defined by the interlayer spacing, where l=2, 4, 6, 8, 10, . . . . These reflections correspond to the out-of-plane stacking of single layer MXene flakes. The asterisk (*) indicates a second layer of intercalated water within the structure. XRD pattern of pristine cotton yarn demonstrates the cellulose peak at 2θ=23.2° corresponds to (002) reflection.[59] Because of the relatively good in-plane alignment of flakes in the vacuum filtered $Ti_3C_2$ film, peaks corresponding to the basal direction are broad, but well resolved. However, in the MXene-coated cotton yarn, the flakes are randomly oriented hence new peaks appear, including those for vertically aligned flakes. According to Ghidiu et al. the peaks at 2θ=61° and 2θ=35°/37° correspond to (110) and (011)/(010) reflections, respectively, while the broad peak at 20=41.5° corresponds to the (016) $Ti_3C_2$ reflection.[60] In general, the high intensity between 3° and 10° indicates that MXene is homogenously dispersed throughout the cotton material as there is a wide distribution of the interlayer spacings.

TABLE 1

Summary of the high-resolution Ti2p XPS region fittings of unwashed and washed MXene-coated cotton yarns before sputtering and after 3 min sputtering, shown in FIG. 4b, FIG. 10c, and FIG. 4c, respectively.

| | Unwashed | | | Washed No Sputtering | | | Washed 3 min Sputtering | | |
|---|---|---|---|---|---|---|---|---|---|
| Name | Pos. | FWHM | % Area | Pos. | FWHM | % Area | Pos. | FWHM | % Area |
| Ti(1+) 3/2 | 454.96 | 0.69 | 7.56 | 454.96 | 0.64 | 4.58 | 454.79 | 0.58 | 3.10 |
| Ti(1+) 1/2 | 461.16 | 1.39 | 3.78 | 461.16 | 1.41 | 2.29 | 460.99 | 1.32 | 1.55 |
| Ti(2+) 3/2 | 455.75 | 1.51 | 36.42 | 455.86 | 1.52 | 26.79 | 455.50 | 1.74 | 31.48 |
| Ti(2+) 1/2 | 461.55 | 2.10 | 18.20 | 461.66 | 2.09 | 13.39 | 461.30 | 1.78 | 15.73 |
| Ti(3+) 3/2 | 457.20 | 1.86 | 17.86 | 457.23 | 1.17 | 6.25 | 457.38 | 1.78 | 15.73 |
| Ti(3+) 1/2 | 462.90 | 2.50 | 8.92 | 462.93 | 2.50 | 3.12 | 463.08 | 1.98 | 7.86 |
| $TiO_2$ 3/2 | 459.20 | 1.50 | 4.85 | 459.30 | 1.45 | 29.07 | 459.30 | 2.00 | 16.38 |
| $TiO_2$ 1/2 | 464.90 | 2.50 | 2.42 | 465.00 | 2.50 | 14.52 | 465.00 | 2.50 | 8.19 |

EXAMPLE EMBODIMENTS

The following embodiments are exemplary only and do not serve to limit the scope of the present disclosure or of the appended claims.

Embodiment 1. A conductive fiber, comprising: a substrate fiber, the substrate fiber defining an outer surface coated with a first plurality of MXene particulates.

Embodiment 2. The conductive fiber of Embodiment 1, wherein the substrate fiber comprises a naturally occurring material. Cotton, linen, silk, wool, cashmere, hemp, jute, angora, and blends are examples of natural fibers; cotton, linen, and silk are considered especially suitable.

Embodiment 3. The conductive fiber of Embodiment 1, wherein the substrate fiber comprises a synthetic material. Nylon, polyester, acrylic, aramid, modal, carbon, glass, rayon, elastomer fibers (e.g., polyurethane, olefin fibers such as polypropylene and polyethylene, and blends) are all exemplary synthetic fibers. Nylon, polyester, carbon, and glass fibers are considered especially suitable.

Embodiment 4. The conductive fiber of Embodiment 1, wherein the first plurality of MXene particulates has an average particle size in the range of from about 100 to about 1000 nm, e.g., from about 100 to about 1000 nm, from about 200 to about 900 nm, from about 300 to about 800 nm, from about 400 to about 700 nm, or even from about 500 to about 600 nm. The average particle size of the MXenes can be selected such that it is smaller than the diameter of the fibers onto which the MXenes are coated. As an example, the MXene particles used with cotton fibers having an average diameter of 20 micron can be smaller than the fibers with an average diameter of 50 micron.

As another example, in the case of cotton, bamboo, and linen fibers, the average flake size was around 300 nm to coat the fibers, which is the most likely size range for MXene particles to coat fibers in the commercial embodiment.

Embodiment 5. The conductive fiber of any one of Embodiments 1-4, wherein the first plurality of MXene particulates comprises two different MXene materials. The different MXene materials can differ in terms of their size, in terms of their composition, or in terms of their size and composition.

Embodiment 6. The conductive fiber of any one of Embodiments 1-5, wherein the first plurality of MXene particulates defines a unimodal particle size distribution.

Embodiment 7. The conductive fiber of any one of Embodiments 1-5, wherein the first plurality of MXene particulates defines a multimodal particle size distribution.

Embodiment 8. The conductive fiber of any one of Embodiments 1-5, wherein the first plurality of MXene particulates are attached to the substrate fiber by electrostatic interaction. In the case of synthetic yarns, the fiber surface can be functionalized using plasma cleaner or chemical etchants to ensure the MXene adhesion to the fiber surface. For natural fibers, there is no need for any processing prior to the coating, it is purely due to electrostatic interactions.

Embodiment 9. A yarn, comprising: a plurality of conductive fibers according to any one of Embodiments 1-8. It should be understood that a yarn can comprise fibers that differ from one another in size, composition, or both. A yarn can, for example, comprise natural fibers and synthetic fibers.

Embodiment 10. The yarn of Embodiment 9, the yarn defining an outer surface coated with a second plurality of MXene particulates.

Embodiment 11. The yarn of Embodiment 10, wherein the second plurality of MXene particulates has an average particle size in the range of from about 500 to about 15,000 nm, e.g., from about 700 to about 12,000 nm, or from about 1,000 to about 10,000 nm, or from about 1,500 to about 7,500 nm, or even from about 2,500 to about 6,500 nm. MXene particulates (which can be, e.g., flakes in configuration) can have an average particle size of from about 1000 to about 3000 nm.

Embodiment 12. The yarn of any one of Embodiments 9-11, wherein the second plurality of MXene particulates comprises two different MXene materials. The MXene materials can differ in terms of size, in terms of composition, or both.

Embodiment 13. The yarn of any one of Embodiments 9-12, wherein the second plurality of MXene particulates defines a unimodal particle size distribution.

Embodiment 14. The yarn of any one of Embodiments 9-12, wherein the first plurality of MXene particulates defines a multimodal particle size distribution.

Embodiment 15. The yarn of any one of Embodiments 9-14, wherein the second plurality of MXene particulates are attached to the outer surface of the yarn by electrostatic interaction.

Embodiment 16. The yarn of Embodiment 9, wherein the yarn is characterized as having a MXene loading of from about 0.1 to about 2.0 mg/cm.

MXene loading at the level of fibers can depend on the number of dips used to coat the fibers. (Single- or multi-dip processes can be used.) The loading can depend on the requirements of the application. For example, sensor applications may not in all cases require highly conductive yarns, and can thus MXene loading of 0.6-1.0 mg/cm would be sufficient. On the other hand, for supercapacitor applications, capacitance is directly correlated to MXene loading, so higher the MXene loading (e.g. >2.0 mg/cm), the higher the specific capacitance of the device.

Embodiment 17. The yarn of Embodiment 9, wherein the yarn is characterized as having a MXene mass loading of from about 10 to about 75 wt %, or from about 15 to about 70 wt %, or from about 20 to about 65 wt %, or from about 30 to about 55 wt %, or even about 40 wt %.

Embodiment 18. The yarn of Embodiment 9, wherein the yarn is characterized as having a conductivity of from about 30 to about 150 S/cm.

Embodiment 19. The yarn of any one of Embodiments 10-15, wherein the yarn is characterized as having a MXene loading of from about 2.0 to about 3.0 mg/cm.

Embodiment 20. The yarn of any one of Embodiments 10-15 or 19, wherein the yarn is characterized as having a MXene mass loading of from about 75 to about 85 wt %

Embodiment 21. The yarn of any one of Embodiments 10-15 or 19, wherein the yarn is characterized as having a conductivity of from about 200 to about 440 S/cm.

Embodiment 22. A yarn, comprising: a plurality of conductive fibers, the yarn defining an outer surface coated with a plurality of MXene particulates.

Embodiment 23. A method, comprising: forming a fiber according to any one of Embodiments 1-8.

Embodiment 24. A method, comprising: forming a yarn according to any one of Embodiments 9-22.

Embodiment 25. A knitted, woven, or non-woven fabric comprising a fiber according to any one of Embodiments 1-8, the knitted, woven, or non-woven fabric optionally being characterized as having a MXene loading level that changes by less than about 1% following washing for 20 h at 30 deg. C., 5 h at 40 deg. C., 5 h at 50 deg. C., 5 h at 60 deg. C., 5 h at 70 deg. C., and 5 h at 80 deg. C.

Embodiment 26. A knitted, woven, or non-woven fabric comprising a yarn according to any one of Embodiments 9-22, the knitted, woven, or non-woven fabric optionally being characterized as having a MXene loading level that changes by less than about 1% following washing for 20 h at 30 deg. C., 5 h at 40 deg. C., 5 h at 50 deg. C., 5 h at 60 deg. C., 5 h at 70 deg. C., and 5 h at 80 deg. C.).

Embodiment 27. A method, comprising: coating a plurality of substrate fibers with a first plurality of MXene particulates so as to form coated substrate fibers.

Embodiment 28. The method of Embodiment 27, wherein coating the plurality of substrate fibers comprises dip coating, inking, spraying, or any combination thereof. One can perform a single- or multiple-dip process. One can also apply a MXene ink to fibers or to yarn, e.g., by brushing, jetting, and other methods of application.

Embodiment 29. The method of any one of Embodiments 27-28, further comprising forming a yarn from the plurality of coated substrate fibers.

Embodiment 30. The method of Embodiment 29, further comprising coating the yarn with a second plurality of MXene particulates.

Embodiment 31. The method of Embodiment 30, wherein coating the yarn comprises dip coating, inking, spraying, or any combination thereof.

Embodiment 32. A device, the device comprising a fiber according to any one of Embodiments 1-8 or a yarn according to any one of Embodiments 9-22.

Embodiment 33. The device of Embodiment 32, wherein the device comprises a capacitor, an energy harvesting device, an antenna, a heater, an electromagnetic interference shield, or any combination thereof.

Embodiment 34. The device of Embodiment 32, wherein the device comprises an electrolyte contacting a fiber according to any one of Embodiments 1-8 or a yarn according to any one of Embodiments 9-22.

Embodiment 35. A pressure sensor, comprising: a first electrode; a second electrode; and a dielectric material disposed so as to place the first electrode into electrical isolation from the second electrode, at least one of the first electrode and the second electrode comprising (a) a substrate fiber, the substrate fiber defining an outer surface coated with a first plurality of MXene particulates, (b) a yarn comprising a plurality of coating fibers, each coating fiber comprising a substrate fiber defining an outer surface coated with a first plurality of MXene particulates, (c) a yarn comprising a plurality of coating fibers, each coating fiber comprising a substrate fiber defining an outer surface coated with a first plurality of MXene particulates and the yarn defining an outer surface coated with a second plurality of MXene particulates, or (d) a yarn comprising a plurality of fibers, the yarn defining an outer surface coated with a second plurality of MXene particulates.

The disclosed pressure sensors can be used in a variety of devices, e.g., touchscreen sensors, switches, capacitors, and the like. Touchscreen applications are especially suitable for the disclosed devices.

Embodiment 36. The pressure sensor of Embodiment 35, wherein at least one of the first electrode and the second electrode is characterized as being a woven fabric, a knitted fabric, or a nonwoven fabric.

Embodiment 37. The pressure sensor of any one of Embodiments 35-36, wherein a substrate fiber comprises a synthetic material. Suitable synthetic materials include, e.g., nylon, polyester, acrylic, aramid, modal, carbon, glass, rayon, elastomer fibers such as polyurethane, olefin fibers such as polypropylene and polyethylene, and blends thereof. Nylon, polyester, carbon, and glass fibers are especially suitable.

A substrate fiber can also comprise a natural fiber. Suitable natural fibers include, e.g., cotton, linen, silk, wool, cashmere, hemp, jute, angora, and blends thereof. Cotton, linen, and silk are especially suitable.

Embodiment 38. The pressure sensor of Embodiment 37, wherein the first plurality of MXene particulates has an average particle size in the range of from about 100 to about 1000 nm, e.g., from about 200 to about 800 nm, from about 300 to about 700 nm, or from about 400 to about 600 nm.

MXene particulate size can depend on the average fiber diameter that will be infiltrated with MXene. For example, the MXene particulates for fibers with an average diameter of 20 microns can be smaller than MXene particulates used with fibers having an average diameter of 50 micron.

In case of cotton, bamboo, and linen fibers, MXene particles can be around 300 nm in size, which size can coat fibers.

Embodiment 39. The pressure sensor of any one of Embodiments 35-38, wherein the first plurality of MXene particulates comprises two different MXene materials. The two MXene materials can differ in size, in composition, or both.

Embodiment 40. The pressure sensor of any one of Embodiments 35-39, wherein the first plurality of MXene particulates defines a unimodal particle size distribution.

Embodiment 41. The pressure sensor of any one of Embodiments 35-40, wherein the first plurality of MXene particulates defines a multimodal particle size distribution.

Embodiment 42. The pressure sensor of any one of Embodiments 35-41, wherein the first plurality of MXene particulates are attached to the substrate fiber by electrostatic interaction. In some embodiments, a fiber surface can be functionalized using plasma cleaner or chemical etchants to enhance MXene adhesion to the fiber surface. For natural fibers, it is not necessary to perform processing, as MXene particulates can secure to fibers due to electrostatic interactions.

Embodiment 43. The pressure sensor yarn of any one of Embodiment 35-42, wherein the second plurality of MXene particulates has an average particle size in the range of from about 500 to about 1500 nm, e.g., from about 500 to about 1500 nm, or from about 700 to about 1300 nm, or from about 900 to about 1100, or even about 1000 nm.

Embodiment 44. The pressure sensor of any one of Embodiments 35-43, wherein the second plurality of MXene particulates comprises two different MXene materials.

Embodiment 45. The pressure sensor of any one of Embodiments 35-44, wherein the second plurality of MXene particulates defines a unimodal particle size distribution.

Embodiment 46. The pressure sensor of any one of Embodiments 35-45, wherein the second plurality of MXene particulates are attached to the outer surface of the yarn by electrostatic interaction.

Embodiment 47. The pressure sensor of any one of Embodiments 35-46, wherein the yarn is characterized as having a MXene loading of from about 0.1 to about 2.0 mg/cm, or from about 0.3 to about 1.7 mg/cm, or even from about 0.7 to about 1.2 mg/cm.

The MXene loading can depend on the method by which the MXene is coated onto the fibers/yarn. As an example, MXene loading can depend on the number of dips in a dip coating process; the loading can be increased as the number of dips increases. A MXene loading of 0.6-1.2 mg/cm can be used, in some embodiments.

Embodiment 48. The pressure sensor of any one of Embodiments 35-47, wherein the yarn is characterized as having a MXene mass loading of from about 10 to about 75 wt %, or from about 15 to about 70 wt %, or from about 20 to about 65 wt %, or from about 25 to about 55 wt %, or from about 30 to about 45 wt %, or even about 40 wt %.

Embodiment 49. The pressure sensor of any one of Embodiments 35-48, wherein the yarn is characterized as having an electrical conductivity of from about 30 to about 150 S/cm, or from about 50 to about 120 S/cm, or from 70 to about 110 S/cm, or even from about 90 to about 100 S/cm. The conductivity of the yarns can depend on MXene loading and yarn diameter. As the MXene loading increases and the diameter of the yarn decreases, the overall electrical conductivity of the yarn will be increased. Electrical conductivity in the range of from about 80 to about 100 S/cm is considered especially suitable.

Embodiment 50. The pressure sensor of any one of Embodiments 35-49, wherein the pressure sensor is characterized as having a gauge factor of from about 0.1 to about 10, e.g., from about 0.1 to about 10, from about 1 to about 9, from about 2 to about 8, from about 3 to about 7, from about 4 to about 6, or even about 5.

Embodiment 51. A method, comprising operating a pressure sensor according to any one of Embodiments 35-50.

Embodiment 52. A strain sensor, comprising: a sensor region, the sensor region comprising (a) a substrate fiber, the substrate fiber defining an outer surface coated with a first plurality of MXene particulates, (b) a yarn comprising a plurality of coating fibers, each coating fiber comprising a substrate fiber defining an outer surface coated with a first plurality of MXene particulates, (c) a yarn comprising a plurality of coating fibers, each coating fiber comprising a substrate fiber defining an outer surface coated with a first plurality of MXene particulates and the yarn defining an outer surface coated with a second plurality of MXene particulates; and or (d) a yarn comprising a plurality of fibers, the yarn defining an outer surface coated with a second plurality of MXene particulates, and a charge collector configured to monitor a signal of the sensor region related to a strain experienced by the panel.

Embodiment 53. The strain sensor of Embodiment 52, wherein the sensor region is characterized as being a knitted fabric, a woven fabric, or a nonwoven fabric.

Embodiment 54. A method, comprising operating a strain sensor according to any one of Embodiments 52-53.

REFERENCES

D. Yu, K. Goh, H. Wang, L. Wei, W. Jiang, Q. Zhang, L. Dai, Y. Chen, *Nat. Nanotechnol.* 2014, 9, 555.
D. Yu, Q. Qian, L. Wei, W. Jiang, K. Goh, J. Wei, J. Zhang, Y. Chen, *Chem. Soc. Rev.* 2015, 44, 647.
K. Jost, G. Dion, Y. Gogotsi, *J. Mater. Chem.* A 2014, 2, 10776.
W. Weng, P. Chen, S. He, X. Sun, H. Peng, *Angew. Chem. Int. Ed.* 2016, 55, 6140.
Q. Xue, J. Sun, Y. Huang, M. Zhu, Z. Pei, H. Li, Y. Wang, N. Li, H. Zhang, C. Zhi, *Small* 2017, 13, 1701827.
A. K. Yetisen, H. Qu, A. Manbachi, H. Butt, M. R. Dokmeci, J. P. Hinestroza, M. Skorobogatiy, A. Khademhosseini, S. H. Yun, *ACS Nano* 2016, 10, 3042.
K. Jost, D. Stenger, C. R. Perez, J. K. McDonough, K. Lian, Y. Gogotsi, G. Dion, *Energy Environ. Sci.* 2013, 6, 2698.
K. Jost, C. R. Perez, J. K. McDonough, V. Presser, M. Heon, G. Dion, Y. Gogotsi, *Energy Environ. Sci.* 2011, 4, 5060.
M. Hu, Z. Li, G. Li, T. Hu, C. Zhang, X. Wang, *Adv. Mater. Technol.* 2017, 2, 1700143.
J. Zhang, S. Seyedin, Z. Gu, W. Yang, X. Wang, J. M. Razal, *Nanoscale* 2017, 9, 18604.
X. Xiao, T. Li, P. Yang, Y. Gao, H. Jin, W. Ni, W. Zhan, X. Zhang, Y. Cao, J. Zhong, L. Gong, W.-C. Yen, W. Mai, J. Chen, K. Huo, Y.-L. Chueh, Z. L. Wang, J. Zhou, *ACS Nano* 2012, 6, 9200.
H. Yang, H. Xu, M. Li, L. Zhang, Y. Huang, X. Hu, *ACS Appl. Mater. Interfaces* 2016, 8, 1774.
V. T. Le, H. Kim, A. Ghosh, J. Kim, J. Chang, Q. A. Vu, D. T. Pham, J.-H. Lee, S.-W. Kim, Y. H. Lee, *ACS Nano* 2013, 7, 5940.
K. Jost, D. P. Durkin, L. M. Haverhals, E. K. Brown, M. Langenstein, H. C. De Long, P. C. Trulove, Y. Gogotsi, G. Dion, *Adv. Energy Mater.* 2015, 5, 1401286.
M. Tebyetekerwa, I. Marriam, Z. Xu, S. Yang, H. Zhang, F. Zabihi, R. Jose, S. Peng, M. Zhu, S. Ramakrishna, *Energy & Environmental Science* 2019.
R. Jalili, J. M. Razal, P. C. Innis, G. G. Wallace, *Adv. Funct. Mater.* 2011, 21, 3363.
J. Zhang, S. Seyedin, S. Qin, Z. Wang, S. Moradi, F. Yang, P. A. Lynch, W. Yang, J. Liu, X. Wang, J. M. Razal, *Small* 2019, 15, 1804732.
J. Zhang, S. Seyedin, S. Qin, P. A. Lynch, Z. Wang, W. Yang, X. Wang, Joselito M. Razal, *J. Mater. Chem.* A 2019, 7, 6401.
N. He, Q. Pan, Y. Liu, W. Gao, *ACS Appl. Mater. Interfaces* 2017, 9, 24568.
X. Zhao, B. Zheng, T. Huang, C. Gao, *Nanoscale* 2015, 7, 9399.
T. Xu, X. Ding, Y. Liang, Y. Zhao, N. Chen, L. Qu, *Nanoscale* 2016, 8, 12113.
V. A. Davis, A. N. G. Parra-Vasquez, M. J. Green, P. K. Rai, N. Behabtu, V. Prieto, R. D. Booker, J. Schmidt, E. Kesselman, W. Zhou, H. Fan, W. W. Adams, R. H. Hauge, J. E. Fischer, Y. Cohen, Y. Talmon, R. E. Smalley, M. Pasquali, *Nat. Nanotechnol.* 2009, 4, 830.
N. Behabtu, C. C. Young, D. E. Tsentalovich, O. Kleinerman, X. Wang, A. W. K. Ma, E. A. Bengio, R. F. ter Waarbeek, J. J. de Jong, R. E. Hoogerwerf, S. B. Fairchild, J. B. Ferguson, B. Maruyama, J. Kono, Y. Talmon, Y. Cohen, M. J. Otto, M. Pasquali, *Science* 2013, 339, 182.
Q. Meng, H. Wu, Y. Meng, K. Xie, Z. Wei, Z. Guo, *Adv. Mater.* 2014, 26, 4100.
M.-Q. Zhao, C. E. Ren, Z. Ling, M. R. Lukatskaya, C. Zhang, K. L. Van Aken, M. W. Barsoum, Y. Gogotsi, *Adv. Mater.* 2015, 27, 339.
S. Seyedin, E. R. S. Yanza, Joselito M. Razal, *J. Mater. Chem.* A 2017, 5, 24076.
S. Seyedin, J. M. Razal, P. C. Innis, A. Jeiranikhameneh, S. Beirne, G. G. Wallace, *ACS Appl. Mater. Interfaces* 2015, 7, 21150.
T. Chen, L. Qiu, Z. Yang, Z. Cai, J. Ren, H. Li, H. Lin, X. Sun, H. Peng, *Angew. Chem. Int. Ed.* 2012, 51, 11977.
Z. Wang, S. Qin, S. Seyedin, J. Zhang, J. Wang, A. Levitt, N. Li, C. Haines, R. Ovalle-Robles, W. Lei, Y. Gogotsi, R. H. Baughman, J. M. Razal, *Small* 2018, 14, 1802225.
M. D. Lima, S. Fang, X. Lepró, C. Lewis, R. Ovalle-Robles, J. Carretero-González, E. Castillo-Martínez, M. E. Kozlov, J. Oh, N. Rawat, C. S. Haines, M. H. Haque, V. Aare, S. Stoughton, A. A. Zakhidov, R. H. Baughman, *Science* 2011, 331, 51.

C. Zhang, B. Anasori, A. Seral-Ascaso, S.-H. Park, N. McEvoy, A. Shmeliov, G. S. Duesberg, J. N. Coleman, Y. Gogotsi, V. Nicolosi, *Adv. Mater.* 2017, 29, 1702678.

M. R. Lukatskaya, S. Kota, Z. Lin, M.-Q. Zhao, N. Shpigel, M. D. Levi, J. Halim, P.-L. Taberna, M. W. Barsoum, P. Simon, Y. Gogotsi, *Nat. Energy* 2017, 2, 17105.

M. Alhabeb, K. Maleski, B. Anasori, P. Lelyukh, L. Clark, S. Sin, Y. Gogotsi, *Chem. Mater.* 2017, 29, 7633.

M. R. Lukatskaya, O. Mashtalir, C. E. Ren, Y. Dall'Agnese, P. Rozier, P. L. Taberna, M. Naguib, P. Simon, M. W. Barsoum, Y. Gogotsi, *Science* 2013, 341, 1502.

Z. Ling, C. E. Ren, M.-Q. Zhao, J. Yang, J. M. Giammarco, J. Qiu, M. W. Barsoum, Y. Gogotsi, *Proc. Natl. Acad. Sci.* 2014, 111, 16676.

M. D. Levi, M. R. Lukatskaya, S. Sigalov, M. Beidaghi, N. Shpigel, L. Daikhin, D. Aurbach, M. W. Barsoum, Y. Gogotsi, *Adv. Energy Mater.* 2015, 5, 1400815.

M. R. Lukatskaya, S.-M. Bak, X. Yu, X.-Q. Yang, M. W. Barsoum, Y. Gogotsi, *Adv. Energy Mater.* 2015, 5, 1500589.

H. Lin, X. Wang, L. Yu, Y. Chen, J. Shi, *Nano Lett.* 2017, 17, 384.

F. Meng, M. Seredych, C. Chen, V. Gura, S. Mikhalovsky, S. Sandeman, G. Ingavle, T. Ozulumba, L. Miao, B. Anasori, Y. Gogotsi, *ACS Nano* 2018, 12, 10518.

K. Maleski, C. E. Ren, M.-Q. Zhao, B. Anasori, Y. Gogotsi, *ACS Appl. Mater. Interfaces* 2018, 10, 24491-24498.

V. S. Smentkowski, Prog. *Surf. Sci.* 2000, 64, 1.

T. Habib, X. Zhao, S. A. Shah, Y. Chen, W. Sun, H. An, J. L. Lutkenhaus, M. Radovic, M. J. Green, *npj 2D Materials and Applications* 2019, 3, 8.

Y. Chae, S. J. Kim, S.-Y. Cho, J. Choi, K. Maleski, B.-J. Lee, H.-T. Jung, Y. Gogotsi, Y. Lee, C. W. Ahn, *Nanoscale* 2019, 11, 8387-8393.

C. J. Zhang, S. Pinilla, N. McEvoy, C. P. Cullen, B. Anasori, E. Long, S.-H. Park, A. Seral-Ascaso, A. Shmeliov, D. Krishnan, C. Morant, X. Liu, G. S. Duesberg, Y. Gogotsi, V. Nicolosi, *Chem. Mater.* 2017, 29, 4848-4856.

G.-M. Weng, J. Li, M. Alhabeb, C. Karpovich, H. Wang, J. Lipton, K. Maleski, J. Kong, E. Shaulsky, M. Elimelech, Y. Gogotsi, A. D. Taylor, *Adv. Funct. Mater.* 2018, 28, 1803360.

D. Xiong, X. Li, Z. Bai, S. Lu, *Small* 2018, 14, 1703419.

M. Ghidiu, M. R. Lukatskaya, M.-Q. Zhao, Y. Gogotsi, M. W. Barsoum, *Nature* 2014, 516, 78.

M. Beidaghi, Y. Gogotsi, *Energy Environ. Sci.* 2014, 7, 867.

M. D. Stoller, R. S. Ruoff, *Energy Environ. Sci.* 2010, 3, 1294.

A. W. Bayes, *J. Text. Inst. Proc.* 1957, 48, 255.

L. Liu, Y. Yu, C. Yan, K. Li, Z. Zheng, *Nat. Commun.* 2015, 6, 7260.

N. Liu, W. Ma, J. Tao, X. Zhang, J. Su, L. Li, C. Yang, Y. Gao, D. Golberg, Y. Bando, *Adv. Mater.* 2013, 25, 4925.

C. Jin, H.-T. Wang, Y.-N. Liu, X.-H. Kang, P. Liu, J.-N. Zhang, L.-N. Jin, S.-W. Bian, Q. Zhu, *Electrochim. Acta* 2018, 270, 205.

Y.-Y. Peng, B. Akuzum, N. Kurra, M.-Q. Zhao, M. Alhabeb, B. Anasori, E. C. Kumbur, H. N. Alshareef, M.-D. Ger, Y. Gogotsi, *Energy Environ. Sci.* 2016, 9, 2847.

N. Kurra, B. Ahmed, Y. Gogotsi, H. N. Alshareef, *Adv. Energy Mater.* 2016, 6, 1601372.

X. Wang, T. S. Mathis, K. Li, Z. Lin, L. Vlcek, T. Torita, N. C. Osti, C. Hatter, P. Urbankowski, A. Sarycheva, M. Tyagi, E. Mamontov, P. Simon, Y. Gogotsi, *Nat. Energy* 2019, 4, 241.

J. Lee, H. Kwon, J. Seo, S. Shin, J. H. Koo, C. Pang, S. Son, J. H. Kim, Y. H. Jang, D. E. Kim, T. Lee, *Adv. Mater.* 2015, 27, 2433-2439.

D. J. Lipomi, M. Vosgueritchian, B. C. K. Tee, S. L. Hellstrom, J. A. Lee, C. H. Fox, Z. Bao, *Nat. Nanotechnol.* 2011, 6, 788.

Liu, L.; Yu, Y.; Yan, C.; Li, K.; Zheng, Z., Wearable energy-dense and power-dense supercapacitor yarns enabled by scalable graphene-metallic textile composite electrodes. *Nature Communications* 2015, 6, 7260.

Jost, K.; Durkin, D. P.; Haverhals, L. M.; Brown, E. K.; Langenstein, M.; De Long, H. C.; Trulove, P. C.; Gogotsi, Y.; Dion, G., Natural Fiber Welded Electrode Yarns for Knittable Textile Supercapacitors. *Advanced Energy Materials* 2015, 5 (4), 1401286.

Wang, Z.; Qin, S.; Seyedin, S.; Zhang, J.; Wang, J.; Levitt, A.; Li, N.; Haines, C.; Ovalle-Robles, R.; Lei, W.; Gogotsi, Y.; Baughman, R. H.; Razal, J. M., High-Performance Biscrolled MXene/Carbon Nanotube Yarn Supercapacitors. *Small* 2018, 14 (37), 1802225.

Zhang, J.; Seyedin, S.; Gu, Z.; Yang, W.; Wang, X.; Razal, J. M., MXene: a potential candidate for yarn supercapacitors. *Nanoscale* 2017, 9 (47), 18604-18608.

Hu, M.; Li, Z.; Li, G.; Hu, T.; Zhang, C.; Wang, X., All-Solid-State Flexible Fiber-Based MXene Supercapacitors. *Advanced Materials Technologies* 2017, 2 (10), 1700143.

Seyedin, S.; Yanza, E. R. S.; Razal, Joselito M., Knittable energy storing fiber with high volumetric performance made from predominantly MXene nanosheets. *Journal of Materials Chemistry* A 2017, 5 (46), 24076-24082.

S. Park, J. O. Baker, M. E. Himmel, P. A. Parilla, D. K. Johnson, *Biotechnol.* Biofuels 2010, 3, 10.

M. Ghidiu, M. W. Barsoum, *J. Am. Ceram. Soc.* 2017, 100, 5395.

J. Halim, K. M. Cook, M. Naguib, P. Eklund, Y. Gogotsi, J. Rosen, M. W. Barsoum, *Appl. Surf. Sci.* 2016, 362, 406.

I. Persson, L.-Å. Näslund, J. Halim, M. W. Barsoum, V. Darakchieva, J. Palisaitis, J. Rosen, P. O. Å. Persson, *2D Materials* 2017, 5, 015002.

What is claimed:

1. A pressure sensor, comprising:

an assembly comprising:

a first fabric electrode;

a second fabric electrode; and a dielectric material disposed between the first fabric electrode and the second fabric electrode, at least one of the first fabric electrode and the second fabric electrode comprising (a) a substrate fiber, the substrate fiber defining an outer surface coated with a first plurality of MXene particulates, (b) a yarn comprising a plurality of coating fibers, each coating fiber comprising a substrate fiber defining an outer surface coated with a first plurality of MXene particulates, (c) a yarn comprising a plurality of coating fibers, each coating fiber comprising a substrate fiber defining an outer surface coated with a first plurality of MXene particulates and the yarn defining an outer surface coated with a second plurality of MXene particulates, or (d) a yarn comprising a plurality of fibers, the yarn defining an outer surface coated with a second plurality of MXene particulates, and wherein the first fabric electrode comprises a first yarn comprising a plurality of coating fibers, each coating fiber comprising a substrate fiber defining an outer surface coated with a first plurality of MXene particulates having a first average cross-sectional dimension, the first yarn further comprising a second plurality of MXene particulates having a second average cross-sectional dimension and being infiltrated between coating fibers, the first average cross-sectional dimension being larger than the second average cross-sectional dimension.

2. The pressure sensor of claim 1, further comprising a meter configured to monitor a capacitance response of the assembly to an applied force.

3. The pressure sensor of claim 2, wherein the first yarn comprises any one or more of cotton, linen, or bamboo.

4. The pressure sensor of claim 2, wherein the first yarn comprises any one or more of modal, regenerated cellulose, nylon, polyester, or viscose.

5. The pressure sensor of claim 2, wherein the first yarn has a conductivity of from 30 to 85 S/cm.

6. The pressure sensor of claim 1, wherein at least one of the first fabric electrode and the second fabric electrode comprises a single jersey pattern.

7. The pressure sensor of claim 1, wherein at least one of the first fabric electrode and the second fabric electrode comprises a half-gauge pattern.

8. The pressure sensor of claim 1, wherein at least one of the first fabric electrode and the second fabric electrode comprises an interlock pattern.

9. A pressure sensor, comprising:

an assembly comprising:

a first fabric electrode;

a second fabric electrode; and a dielectric material disposed between the first fabric electrode and the second fabric electrode, at least one of the first fabric electrode and the second fabric electrode comprising (a) a substrate fiber, the substrate fiber defining an outer surface coated with a first plurality of MXene particulates, (b) a yarn comprising a plurality of coating fibers, each coating fiber comprising a substrate fiber defining an outer surface coated with a first plurality of MXene particulates, (c) a yarn comprising a plurality of coating fibers, each coating fiber comprising a substrate fiber defining an outer surface coated with a first plurality of MXene particulates and the yarn defining an outer surface coated with a second plurality of MXene particulates, or (d) a yarn comprising a plurality of fibers, the yarn defining an outer surface coated with a second plurality of MXene particulates, wherein the second fabric electrode comprises a yarn comprising a plurality of coating fibers, each coating fiber comprising a substrate fiber defining an outer surface coated with coating MXene particulates having an average cross-sectional dimension, the yarn further comprising infiltrate MXene particulates having an average cross-sectional dimension and being infiltrated between coating fibers, the average cross-sectional dimension of the coating MXene particulates being larger than the average cross-sectional dimension of the infiltrate MXene particulates.

10. A method, comprising:

contacting a yarn with a population of MXene particulates having a first average cross-sectional dimension;

contacting the yarn with a population of MXene particulates having a second average cross-sectional dimension, the second average cross-sectional dimension being smaller than the first average cross-sectional dimension;

knitting the yarn into a first fabric electrode; and incorporating the first fabric electrode into an assembly of a pressure sensor.

11. The method of claim 10, further comprising incorporating a second fabric electrode into the assembly.

12. The method of claim 11, further comprising disposing a dielectric between the first fabric electrode and the second fabric electrode of the assembly.

13. The method of claim 12, further comprising placing the assembly into electronic communication with a meter configured to monitor a capacitance response of the assembly to an applied force.

14. A component, comprising:

a yarn comprising a plurality of coating fibers, each coating fiber comprising a substrate fiber defining an outer surface coated with a first plurality of MXene particulates having a first average cross-sectional dimension, the yarn further comprising a second plurality of MXene particulates having a second average cross-sectional dimension and being infiltrated between coating fibers, the first average cross-sectional dimension being larger than the second average cross-sectional dimension.

* * * * *